United States Patent
Nichols et al.

(10) Patent No.: US 10,066,713 B2
(45) Date of Patent: *Sep. 4, 2018

(54) CONTINUOUSLY VARIABLE TRANSMISSION

(71) Applicant: Fallbrook Intellectual Property Company LLC, Cedar Park, TX (US)

(72) Inventors: Jon M. Nichols, Georgetown, TX (US); Matthew P. Simister, Austin, TX (US); Daniel J. Dawe, Austin, TX (US); Charles B. Lohr, Austin, TX (US); Timothy M. Obrzut, Parma, OH (US)

(73) Assignee: Fallbrook Intellectual Property Company LLC, Cedar Park, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/387,131

(22) Filed: Dec. 21, 2016

(65) Prior Publication Data

US 2017/0102053 A1 Apr. 13, 2017

Related U.S. Application Data

(63) Continuation of application No. 14/790,475, filed on Jul. 2, 2015, now Pat. No. 9,528,561, which is a
(Continued)

(51) Int. Cl.
*F16H 15/52* (2006.01)
*B62M 11/16* (2006.01)
*F16H 63/18* (2006.01)

(52) U.S. Cl.
CPC ............ *F16H 15/52* (2013.01); *B62M 11/16* (2013.01); *F16H 63/18* (2013.01)

(58) Field of Classification Search
None
See application file for complete search history.

(56) References Cited

U.S. PATENT DOCUMENTS

| 4,963 A | 2/1847 | Armstrong et al. |
| 719,595 A | 2/1903 | Huss |

(Continued)

FOREIGN PATENT DOCUMENTS

| CH | 118064 | 12/1926 |
| CN | 1054340 | 9/1991 |

(Continued)

OTHER PUBLICATIONS

Office Action dated Nov. 8, 2016 in Chinese Patent Application No. 201410191666.x.

(Continued)

*Primary Examiner* — Dirk Wright
(74) *Attorney, Agent, or Firm* — Knobbe Martens Olson & Bear LLP

(57) ABSTRACT

Inventive embodiments are directed to components, subassemblies, systems, and/or methods for continuously variable transmissions (CVT). In one embodiment, a main axle is adapted to receive a carrier assembly to facilitate the support of components in a CVT. In another embodiment, a carrier includes a stator support member and a stator interfacial member. In some embodiments, the stator interfacial member is configured to interact with planet subassemblies of a CVT. Various inventive planet subassemblies and idler assemblies can be used to facilitate shifting the ratio of a CVT. In some embodiments, the planet subassemblies include legs configured to have a sliding interface with a carrier assembly. Embodiments of a hub shell, a hub cover are adapted to house components of a CVT and, in some embodiments, to cooperate with other components of the CVT to support operation and/or functionality of the CVT. Among other things, shift control interfaces and braking features for a CVT are disclosed.

13 Claims, 50 Drawing Sheets

Related U.S. Application Data continuation of application No. 14/171,025, filed on Feb. 3, 2014, now Pat. No. 9,074,674, which is a continuation of application No. 13/796,452, filed on Mar. 12, 2013, now Pat. No. 8,641,572, which is a continuation of application No. 12/999,586, filed as application No. PCT/US2008/067940 on Jun. 23, 2008, now Pat. No. 8,398,518.

(56) References Cited

U.S. PATENT DOCUMENTS

| | | |
|---|---|---|
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,902 A | 5/1927 | After et al. |
| 1,631,069 A | 5/1927 | Smith |
| 1,683,715 A | 9/1928 | Erban |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,230,398 A | 2/1941 | Benjafield |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,071,194 A | 1/1963 | Geske |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,374,009 A | 3/1968 | Jeunet |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | MacKs |
| 3,487,726 A | 1/1970 | Burnett |
| 3,487,727 A | 1/1970 | Gustafsson |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 5/1976 | Hege |
| 3,987,681 A | 10/1976 | Keithley et al. |
| 3,996,807 A | 12/1976 | Adams |
| 4,023,442 A | 5/1977 | Woods et al. |
| 4,053,173 A | 10/1977 | Chase, Sr. |
| 4,086,026 A | 4/1978 | Tamanini |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,493,677 A | 1/1985 | Ikenoya |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |
| 4,549,874 A | 10/1985 | Wen |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |

(56) References Cited

U.S. PATENT DOCUMENTS

| | | |
|---|---|---|
| 4,585,429 A | 4/1986 | Marier |
| 4,617,838 A | 10/1986 | Anderson |
| 4,628,766 A | 12/1986 | De Brie Perry |
| 4,630,839 A | 12/1986 | Seol |
| 4,631,469 A | 12/1986 | Tsuboi et al. |
| 4,647,060 A | 3/1987 | Tomkinson |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,725,258 A | 2/1988 | Joanis, Jr. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,806,066 A | 2/1989 | Rhodes et al. |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,961,477 A | 10/1990 | Sweeney |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,323,570 A | 6/1994 | Kuhlman et al. |
| 5,330,396 A | 7/1994 | Lohr et al. |
| 5,355,749 A | 10/1994 | Obara et al. |
| 5,356,348 A | 10/1994 | Bellio et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,758 A | 9/1997 | Williamson |
| 5,669,845 A | 9/1997 | Muramoto et al. |
| 5,690,346 A | 11/1997 | Keskitalo |
| 5,701,786 A | 12/1997 | Kawakami |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,050,854 A | 4/2000 | Fang et al. |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,155,132 A | 12/2000 | Yamane |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,201,315 B1 | 3/2001 | Larsson |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,293,575 B1 | 9/2001 | Burrows et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,340,067 B1 | 1/2002 | Fujiwara |
| 6,358,174 B1 | 3/2002 | Folsom et al. |
| 6,358,178 B1 | 3/2002 | Wittkopp |
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,459,978 B2 | 10/2002 | Tamiguchi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |

(56) References Cited

U.S. PATENT DOCUMENTS

| | | | |
|---|---|---|---|
| 6,499,373 B2 | 12/2002 | Van Cor |
| 6,514,175 B2 | 2/2003 | Taniguchi et al. |
| 6,523,223 B2 | 2/2003 | Wang |
| 6,532,890 B2 | 3/2003 | Chen |
| 6,551,210 B2 | 4/2003 | Miller |
| 6,558,285 B1 | 5/2003 | Sieber |
| 6,571,726 B2 | 6/2003 | Tsai et al. |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,000,496 B2 | 2/2006 | Wessel et al. |
| 7,011,600 B2 * | 3/2006 | Miller .................. B62M 9/08 476/36 |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| D546,741 S | 7/2007 | Iteya et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller |
| D548,655 S | 8/2007 | Barrow et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,383,749 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| D579,833 S | 11/2008 | Acenbrak |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,600,771 B2 | 10/2009 | Miller et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |

(56) References Cited

U.S. PATENT DOCUMENTS

| | | | |
|---|---|---|---|
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 * | 2/2013 | Pohl ................. F16H 15/28 476/37 |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 * | 3/2013 | Nichols ................. B62M 11/04 475/189 |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 * | 4/2014 | Miller ................. B62M 9/08 280/261 |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,961,363 B2 | 2/2015 | Shiina et al. |
| 8,992,376 B2 | 3/2015 | Ogawa et al. |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,074,674 B2 * | 7/2015 | Nichols ................. B62M 11/04 |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |
| 9,279,482 B2 | 3/2016 | Nichols et al. |
| 9,291,251 B2 | 3/2016 | Lohr et al. |
| 9,328,807 B2 | 5/2016 | Carter et al. |
| 9,341,246 B2 | 5/2016 | Miller et al. |
| 9,360,089 B2 | 6/2016 | Lohr et al. |
| 9,365,203 B2 | 6/2016 | Keilers et al. |
| 9,371,894 B2 | 6/2016 | Carter et al. |
| 9,506,562 B2 | 11/2016 | Miller et al. |
| 9,528,561 B2 | 12/2016 | Nichols et al. |
| 9,574,643 B2 * | 2/2017 | Pohl ................. F16H 15/52 |
| 9,656,672 B2 | 5/2017 | Schieffelin |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0153695 A1 | 10/2002 | Wang |
| 2002/0161503 A1 | 10/2002 | Joe et al. |
| 2002/0169051 A1 | 11/2002 | Oshidari |
| 2002/0179348 A1 | 12/2002 | Tamai et al. |
| 2002/0189524 A1 | 12/2002 | Chen |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0096674 A1 | 5/2003 | Uno |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0176247 A1 | 9/2003 | Gottschalk |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0237698 A1 | 12/2004 | Hilsky et al. |
| 2004/0254047 A1 | 12/2004 | Frank et al. |
| 2005/0037876 A1 | 2/2005 | Unno et al. |
| 2005/0064986 A1 | 3/2005 | Ginglas |
| 2005/0085979 A1 | 4/2005 | Carlson et al. |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |

(56) References Cited

U.S. PATENT DOCUMENTS

| | | |
|---|---|---|
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0041823 A1 | 2/2007 | Miller |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0070729 A1 | 3/2008 | Miller et al. |
| 2008/0073137 A1 | 3/2008 | Miller et al. |
| 2008/0073467 A1 | 3/2008 | Miller et al. |
| 2008/0079236 A1 | 4/2008 | Miller et al. |
| 2008/0081715 A1 | 4/2008 | Miller et al. |
| 2008/0081728 A1 | 4/2008 | Faulring et al. |
| 2008/0085795 A1 | 4/2008 | Miller et al. |
| 2008/0085796 A1 | 4/2008 | Miller et al. |
| 2008/0085797 A1 | 4/2008 | Miller et al. |
| 2008/0085798 A1 | 4/2008 | Miller et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1* | 4/2010 | Carter .................. F16H 15/28 475/159 |
| 2010/0145573 A1 | 6/2010 | Vasilescu |
| 2010/0181130 A1 | 7/2010 | Chou |
| 2011/0127096 A1 | 6/2011 | Schneidewind |
| 2011/0230297 A1 | 9/2011 | Shiina et al. |
| 2011/0237385 A1 | 9/2011 | Andre Parise |
| 2011/0291507 A1 | 12/2011 | Post |
| 2011/0319222 A1 | 12/2011 | Ogawa et al. |
| 2012/0035011 A1 | 2/2012 | Menachem et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0337971 A1 | 12/2013 | Kostrup |
| 2014/0148303 A1 | 5/2014 | Nichols et al. |
| 2014/0206499 A1 | 7/2014 | Lohr |
| 2014/0274536 A1 | 9/2014 | Versteyhe |
| 2014/0329637 A1 | 11/2014 | Thomassy et al. |
| 2014/0335991 A1 | 11/2014 | Lohr et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0080165 A1 | 3/2015 | Pohl et al. |
| 2015/0226323 A1 | 8/2015 | Pohl et al. |
| 2015/0260284 A1 | 9/2015 | Miller et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2016/0003349 A1 | 1/2016 | Kimura et al. |
| 2016/0031526 A1 | 2/2016 | Watarai |
| 2016/0040763 A1 | 2/2016 | Nichols et al. |
| 2016/0061301 A1 | 3/2016 | Bazyn et al. |
| 2016/0131231 A1 | 5/2016 | Carter et al. |
| 2016/0146342 A1 | 5/2016 | Vasiliotis et al. |
| 2016/0178037 A1 | 6/2016 | Pohl |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0281825 A1 | 9/2016 | Lohr et al. |
| 2016/0290451 A1 | 10/2016 | Lohr |
| 2016/0298740 A1 | 10/2016 | Carter et al. |
| 2016/0347411 A1 | 12/2016 | Yamamoto et al. |
| 2016/0362108 A1 | 12/2016 | Keilers et al. |
| 2017/0072782 A1 | 3/2017 | Miller et al. |
| 2017/0082049 A1 | 3/2017 | David et al. |
| 2017/0159812 A1 | 6/2017 | Pohl et al. |
| 2017/0163138 A1 | 6/2017 | Pohl |
| 2017/0204948 A1 | 7/2017 | Thomassy et al. |
| 2017/0204969 A1 | 7/2017 | Thomassy et al. |
| 2017/0211698 A1 | 7/2017 | Lohr |
| 2017/0268638 A1 | 9/2017 | Nichols et al. |
| 2017/0274903 A1 | 9/2017 | Carter et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 263566 | 1/1989 |
| DE | 39 40 919 A1 | 6/1991 |
| DE | 19851738 | 5/2000 |
| DE | 10155372 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 251 294 | 10/2002 |
| EP | 1 366 978 | 3/2003 |
| EP | 1 362 783 | 11/2003 |
| EP | 1 433 641 | 6/2004 |
| EP | 1 452 441 | 9/2004 |
| EP | 1 518 785 | 3/2005 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |

(56) References Cited

FOREIGN PATENT DOCUMENTS

| | | |
|---|---|---|
| GB | 14132 | 5/1910 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 47-000448 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 48-54371 | 7/1973 |
| JP | 49-012742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 55-135259 | 10/1980 |
| JP | 56-24251 | 3/1981 |
| JP | 56-047231 | 4/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-225053 | 8/1998 |
| JP | 10-511621 | 11/1998 |
| JP | 11-063130 | 3/1999 |
| JP | 11-091411 | 4/1999 |
| JP | 11-210850 | 8/1999 |
| JP | 11-240481 | 9/1999 |
| JP | 11-257479 | 9/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-234999 | 8/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 56-101448 | 1/2003 |
| JP | 2003-028257 | 1/2003 |
| JP | 2003-56662 | 2/2003 |
| JP | 2003-161357 | 6/2003 |
| JP | 2003-194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-133896 | 6/2008 |
| JP | 2010-069005 | 4/2010 |
| JP | 2012-225390 | 11/2012 |
| JP | 2015-227690 | 12/2015 |
| JP | 2015-227691 | 12/2015 |
| KR | 2002 0054126 | 7/2002 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200821218 | 5/2008 |
| WO | WO 99/08024 | 2/1999 |

(56) References Cited

FOREIGN PATENT DOCUMENTS

| WO | WO 99/20918 | 4/1999 |
|---|---|---|
| WO | WO 01/73319 | 10/2001 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 07/044128 | 4/2007 |
| WO | WO 07/077502 | 7/2007 |
| WO | WO 07/133538 | 11/2007 |
| WO | WO 08/078047 | 7/2008 |
| WO | WO 08/100792 | 8/2008 |
| WO | WO 10/135407 | 11/2010 |
| WO | WO 11/064572 | 6/2011 |
| WO | WO 11/101991 | 8/2011 |
| WO | WO 11/121743 | 10/2011 |
| WO | WO 12/030213 | 3/2012 |
| WO | WO 13/042226 | 3/2013 |
| WO | WO 14/186732 | 11/2014 |
| WO | WO 16/062461 | 4/2016 |

OTHER PUBLICATIONS

Office Action dated May 31, 2013 in U.S. Appl. No. 13/796,452.
Office Action dated Nov. 13, 2014 in U.S. Appl. No. 14/171,025.
Chinese Office Action dated Jan. 28, 2013 for Chinese Patent Application No. 200880129965.3.
Chinese Office Action dated Sep. 18, 2013 for Chinese Patent Application No. 200880129965.3.
Examination Report dated Dec. 20, 2013 in European Patent Application No. 08874837.1.
Examination Report dated Mar. 26, 2015 in European Patent Application No. 08874837.1.
International Preliminary Report on Patentability for Application No. PCT/US2008/067940 dated Jan. 13, 2011.
International Search Report for International Application No. PCT/2008/067940 dated Jun. 15, 2009.
Goi et al., Development of Traction Drive IDG (T-IDG), Proceedings of International Congress on Continuously Variable and Hybrid Transmissions, Sep. 2007, 6 pages.
Pohl, Brad, CVT Split Power Transmissions, A Configuration versus Performance Study with an Emphasis on the Hydromechanical Type, Society of Automotive Engineers, Mar. 4, 2002, 11 pages.
Pohl, et al., Configuration Analysis of a Spherical Traction Drive CVT/IVT, SAE International, 2004 International Continuously Variable and Hybrid Transmission Congress, Sep. 23, 2004, 6 pages.
Smithson et al., Scalability for an Alternative Rolling Traction CVT, Society of Automotive Engineers, Mar. 8, 2004, 6 pages.
Thomassy: An Engineering Approach to Simulating Traction EHL. CVT-Hybrid International Conference Mecc/Maastricht/The Netherlands, Nov. 17-19, 2010, p. 97.
Office Action dated Feb. 19, 2016 in Chinese Patent Application No. 201410191666.X.
Partial European Search Report in EP Patent Application No. 17159751.1, dated Dec. 11, 2017.

\* cited by examiner

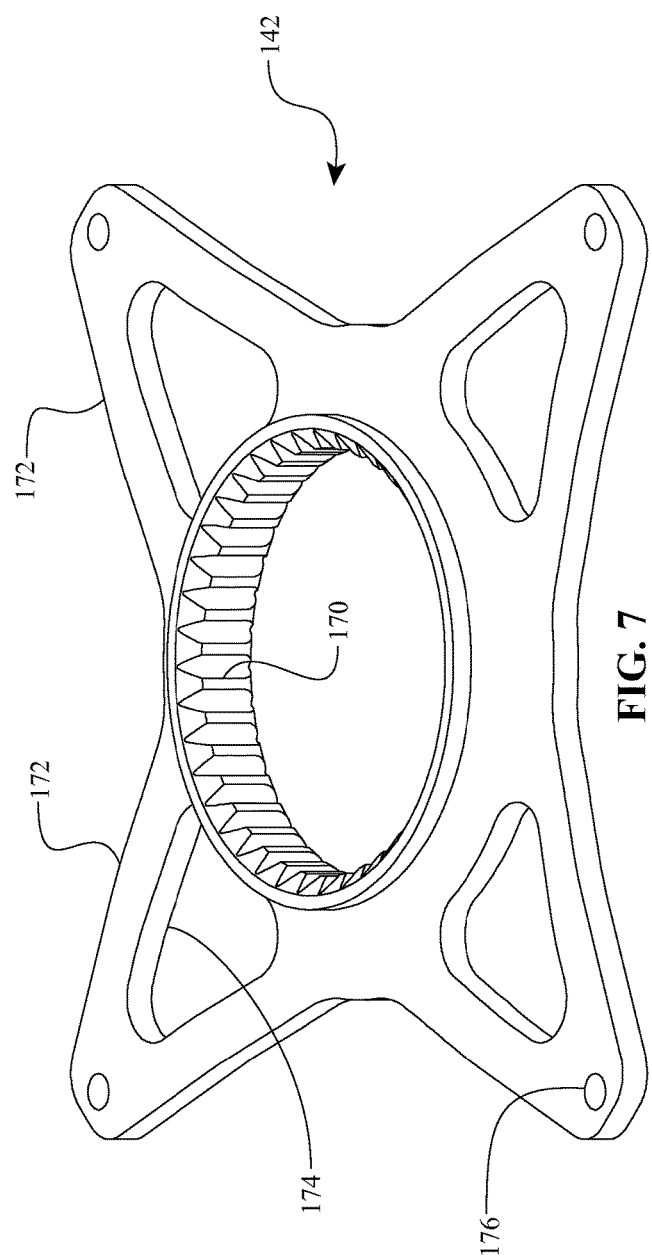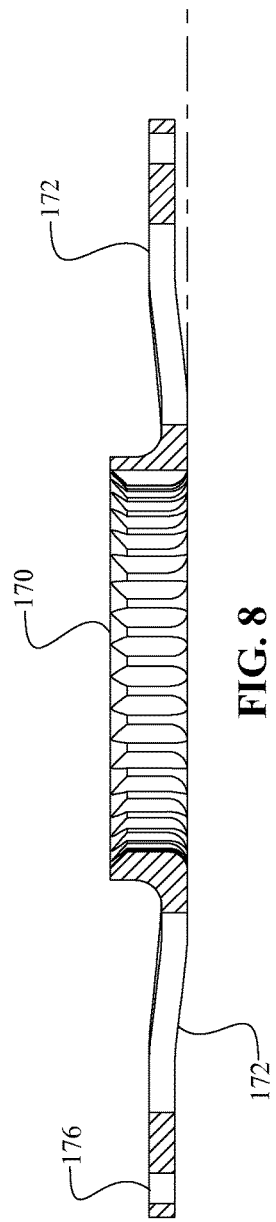
FIG. 7
FIG. 8

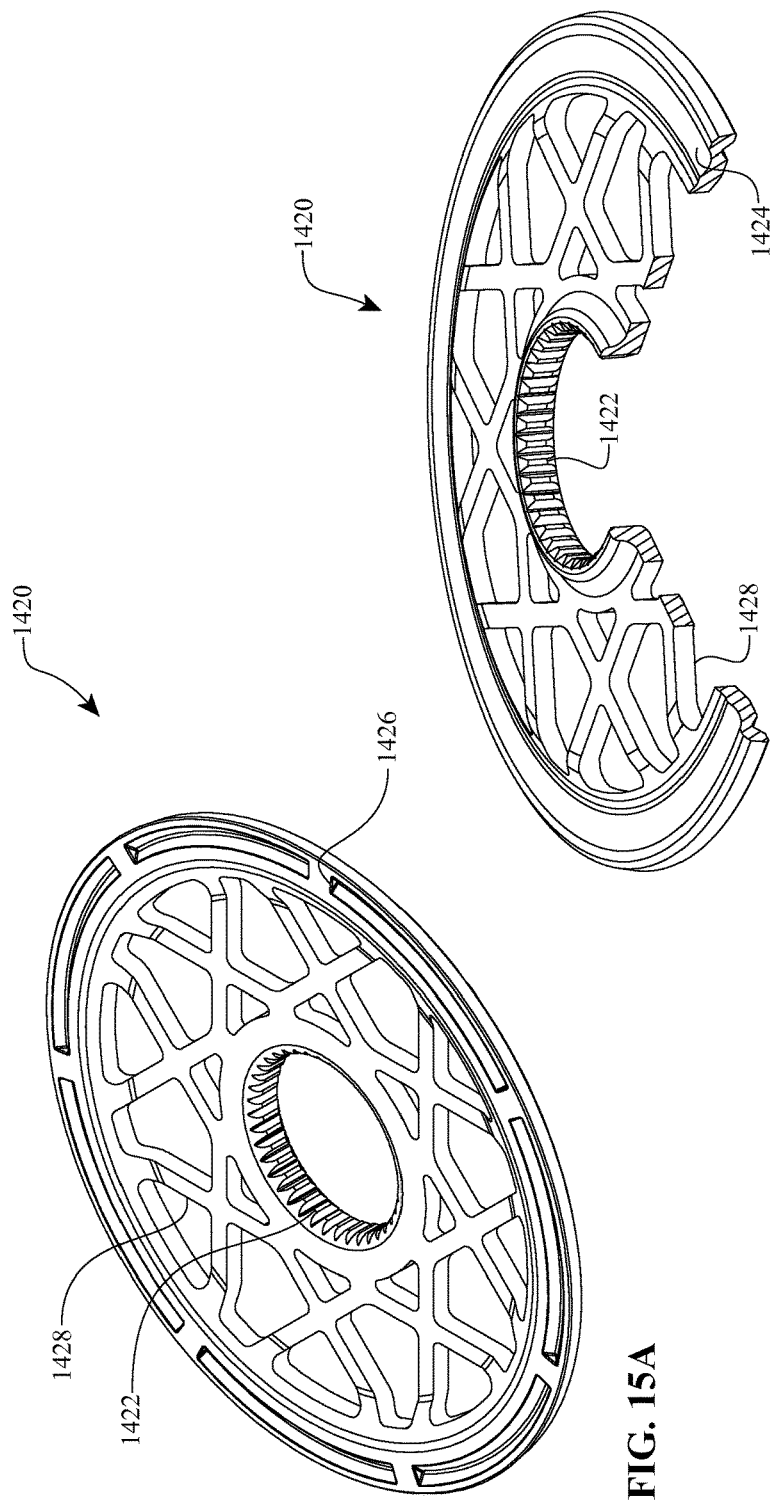

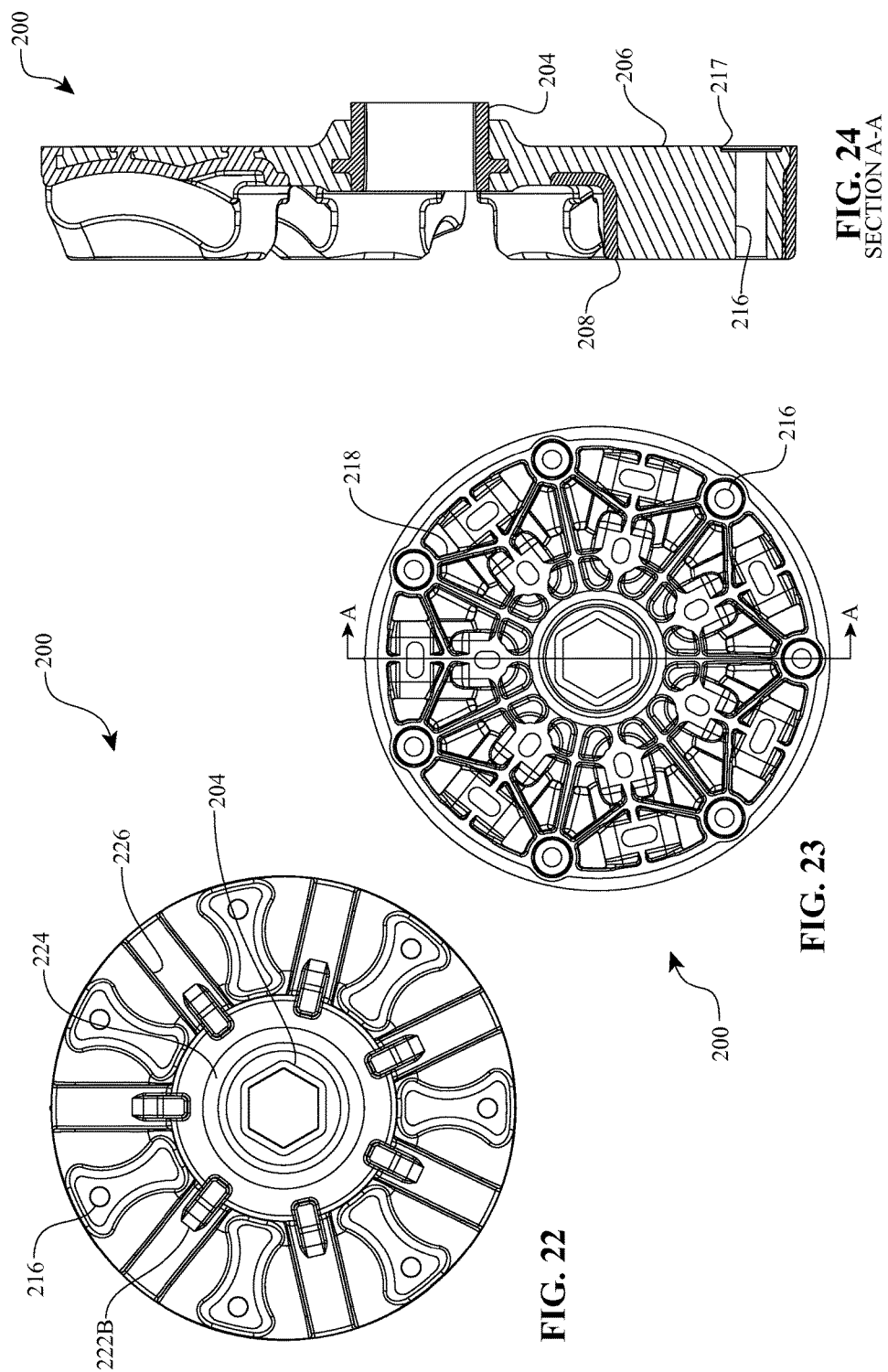

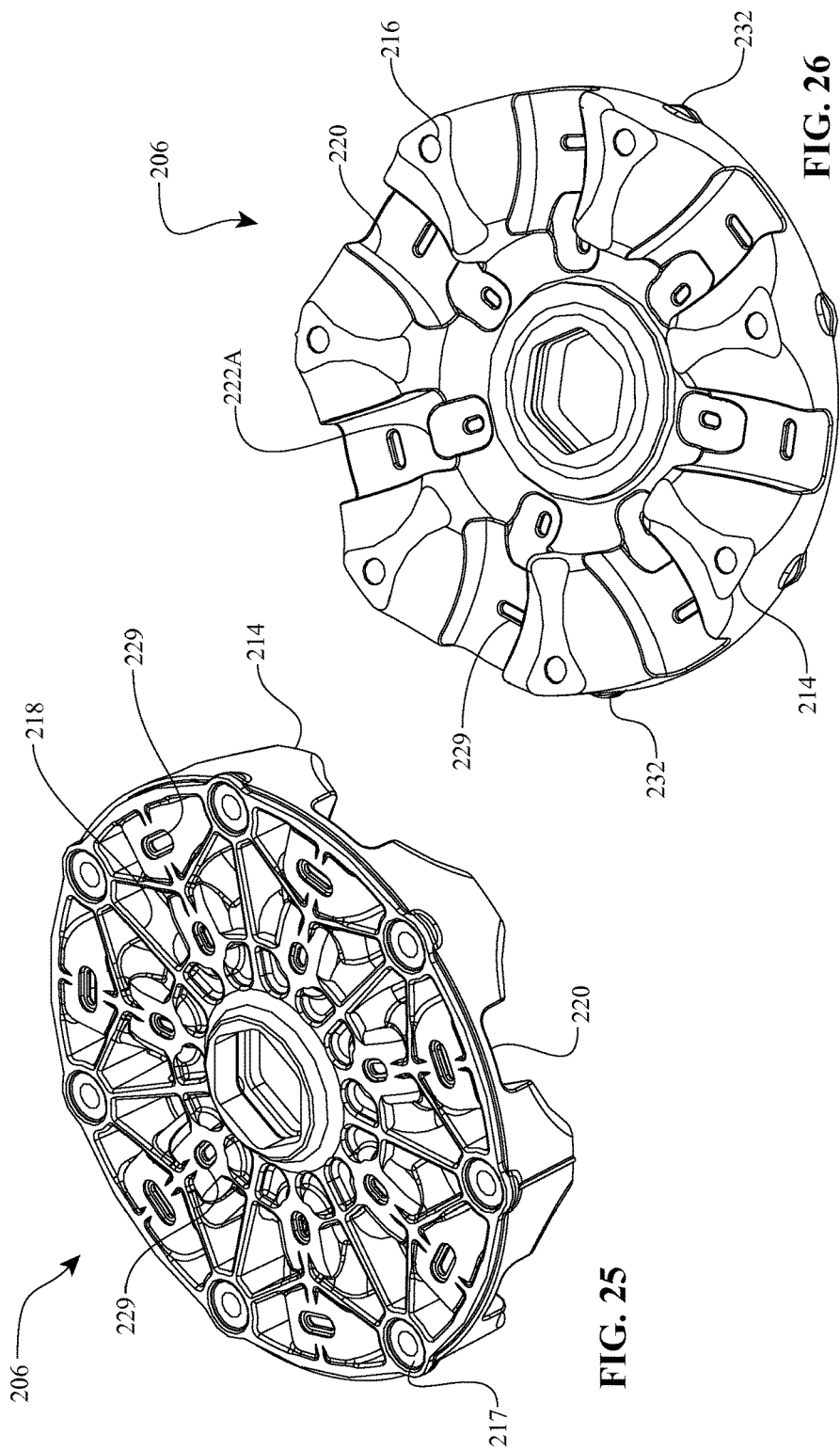

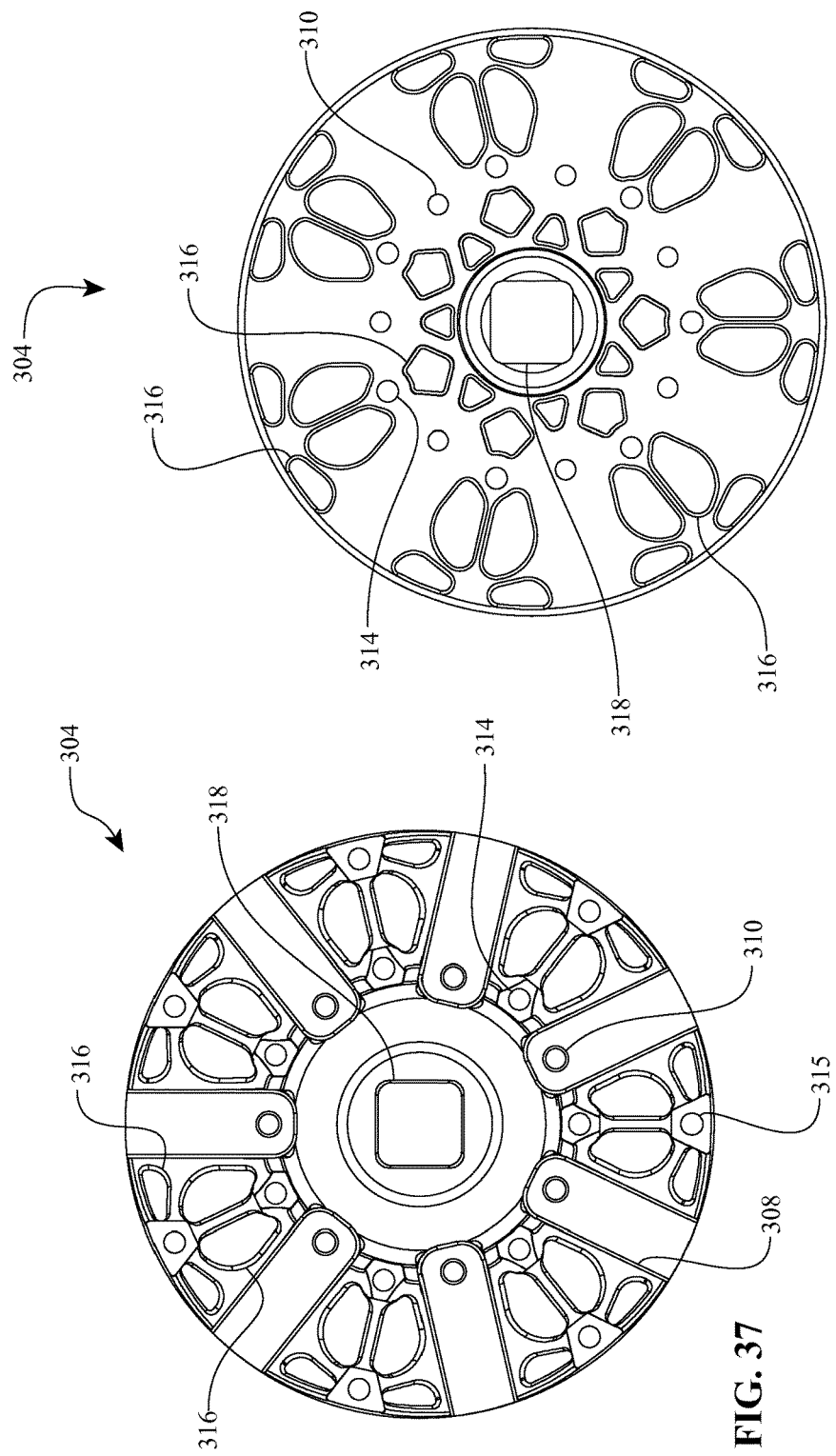

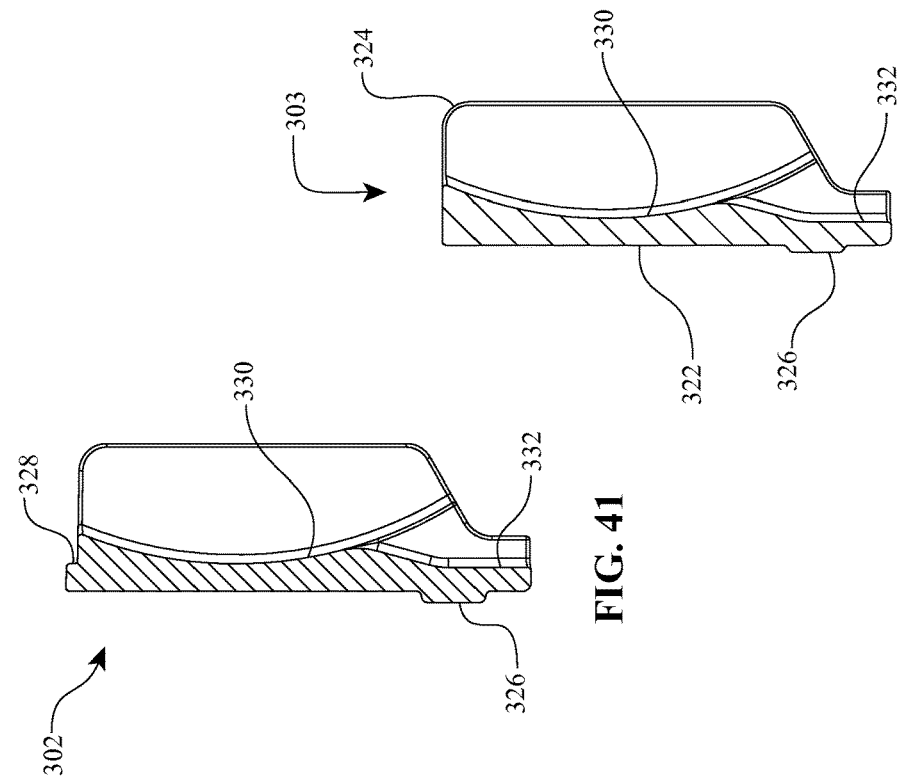
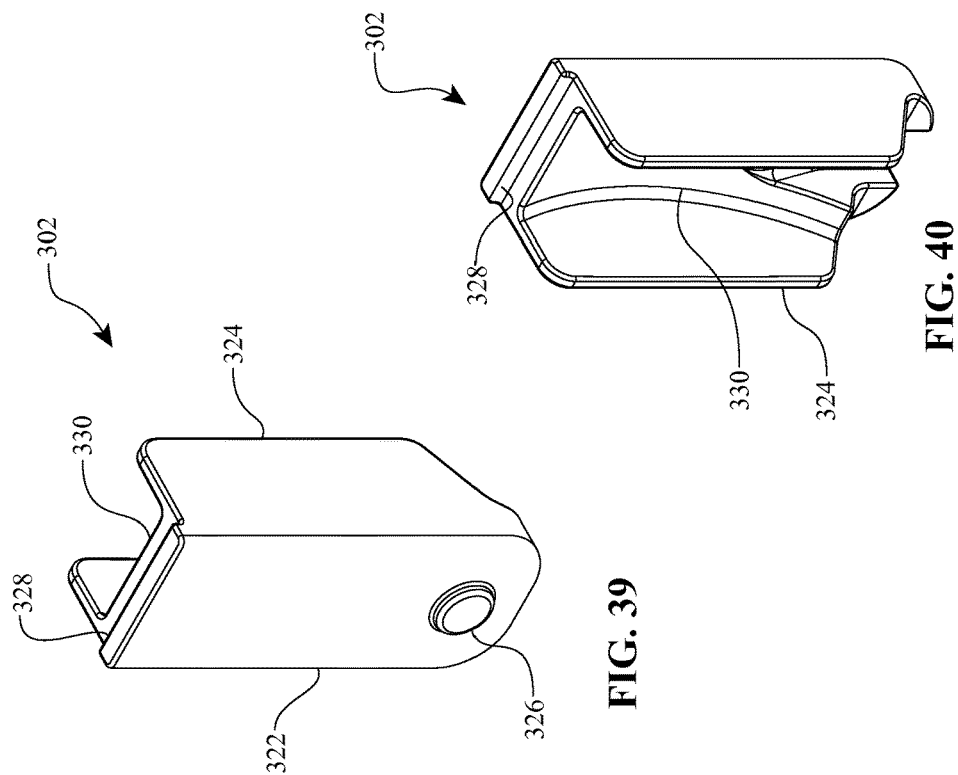
FIG. 42
FIG. 41
FIG. 40
FIG. 39

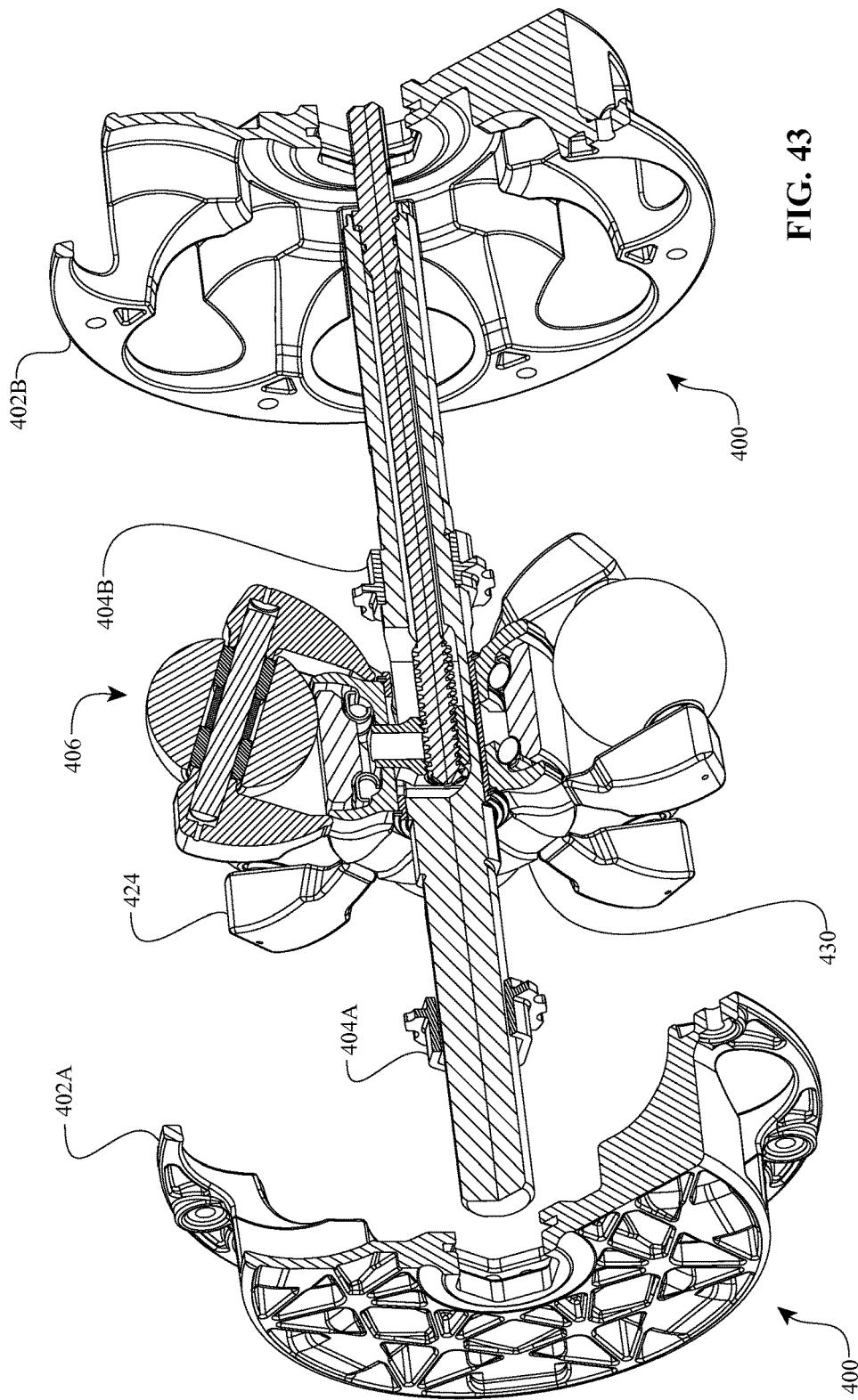

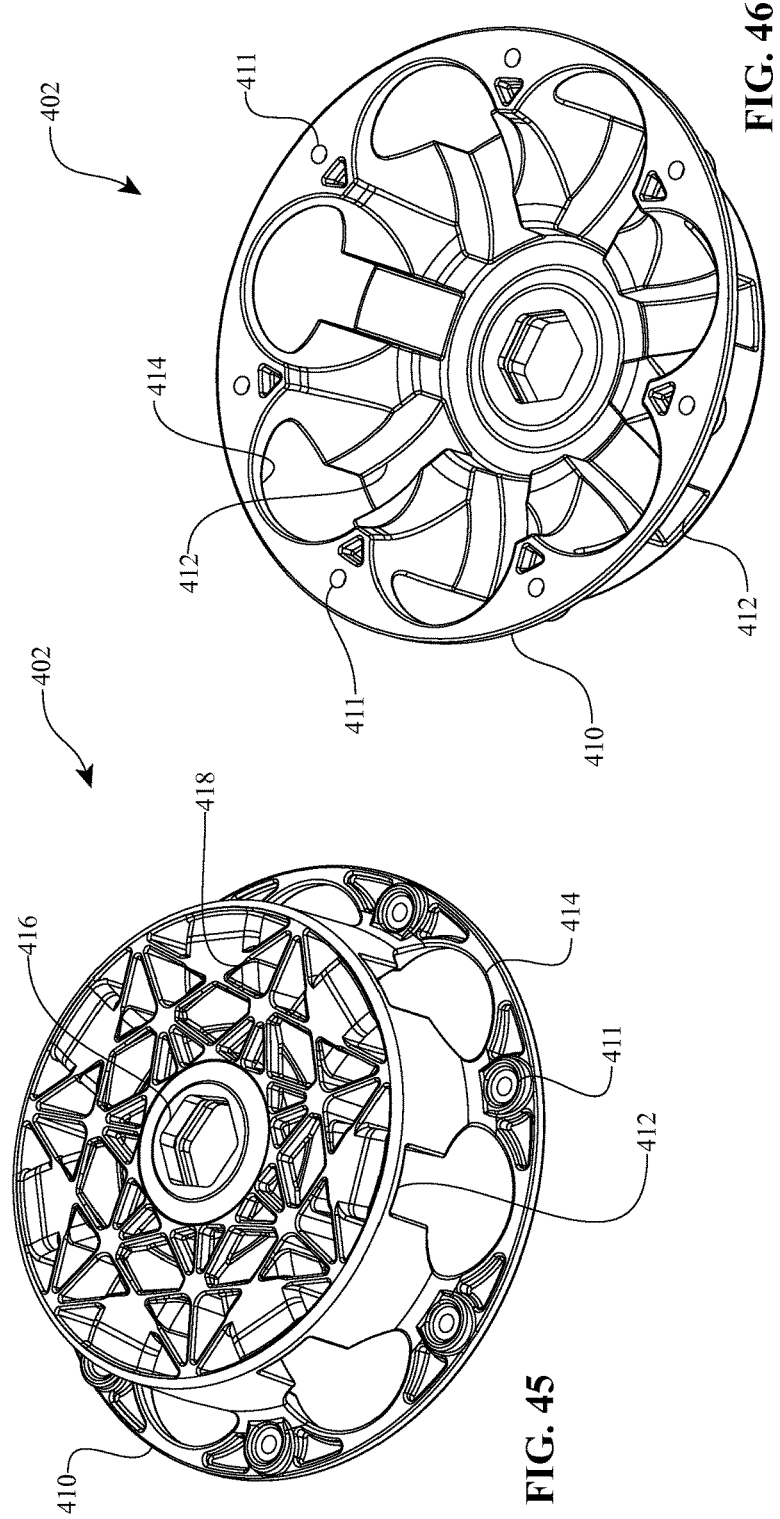

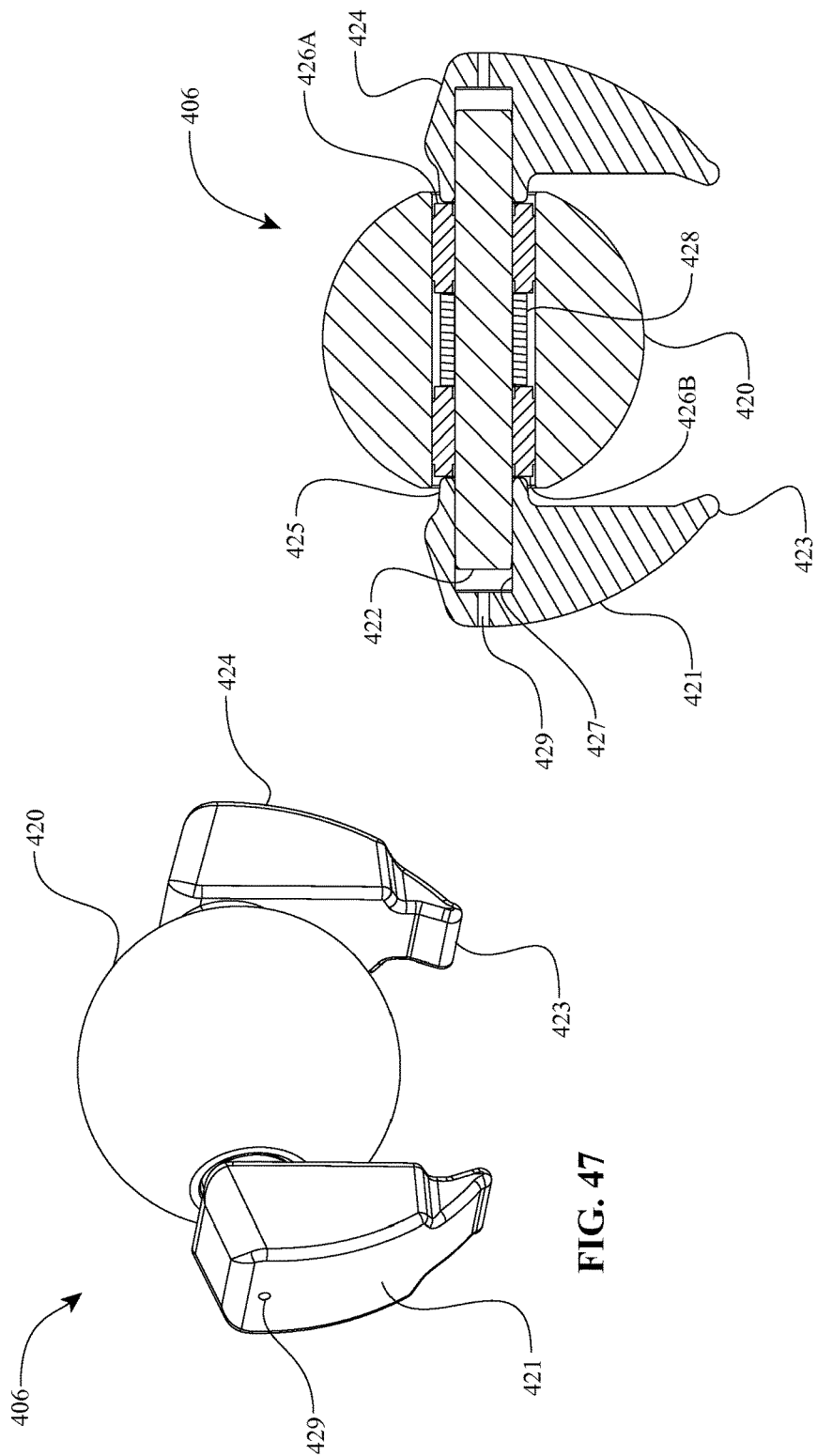

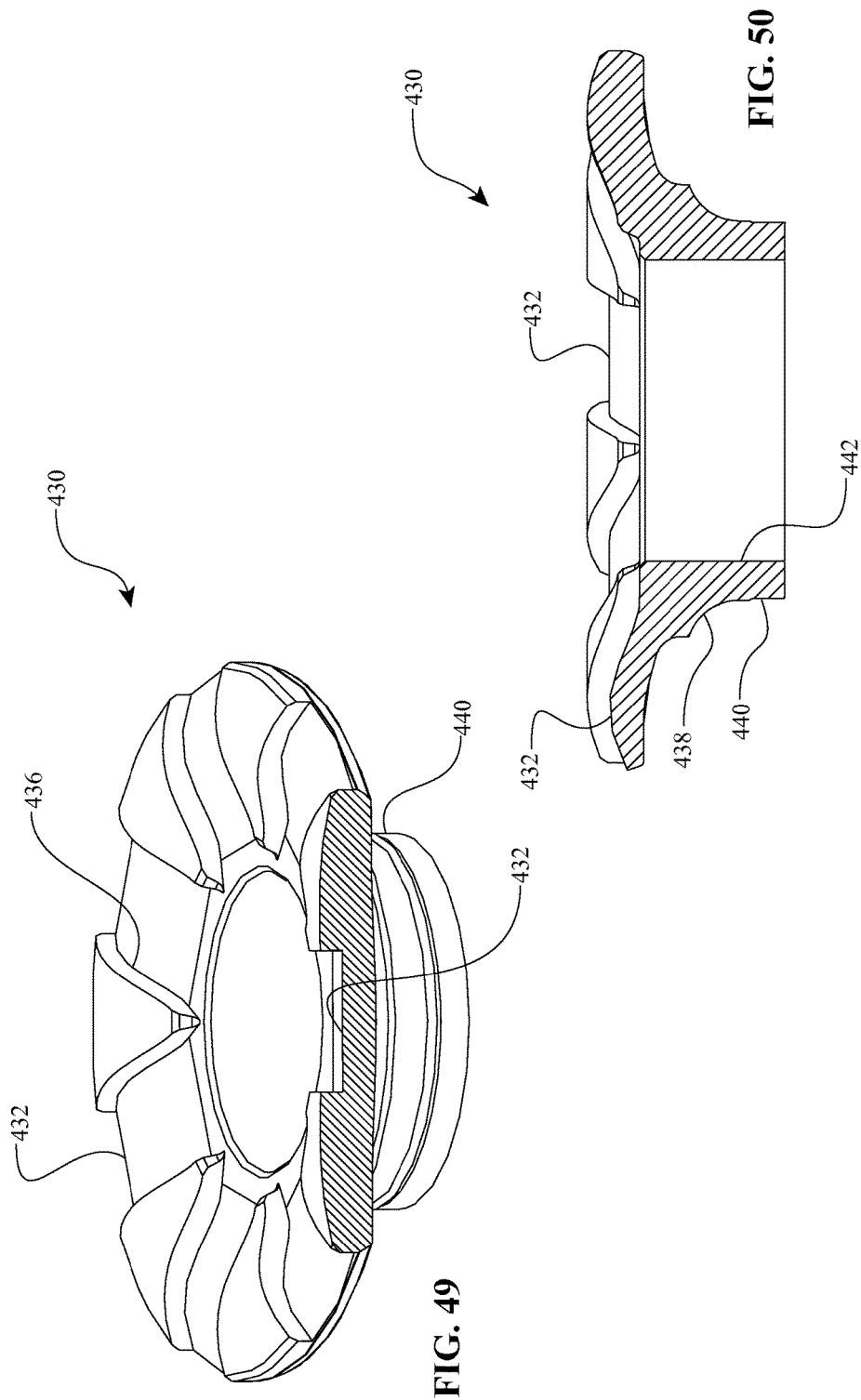

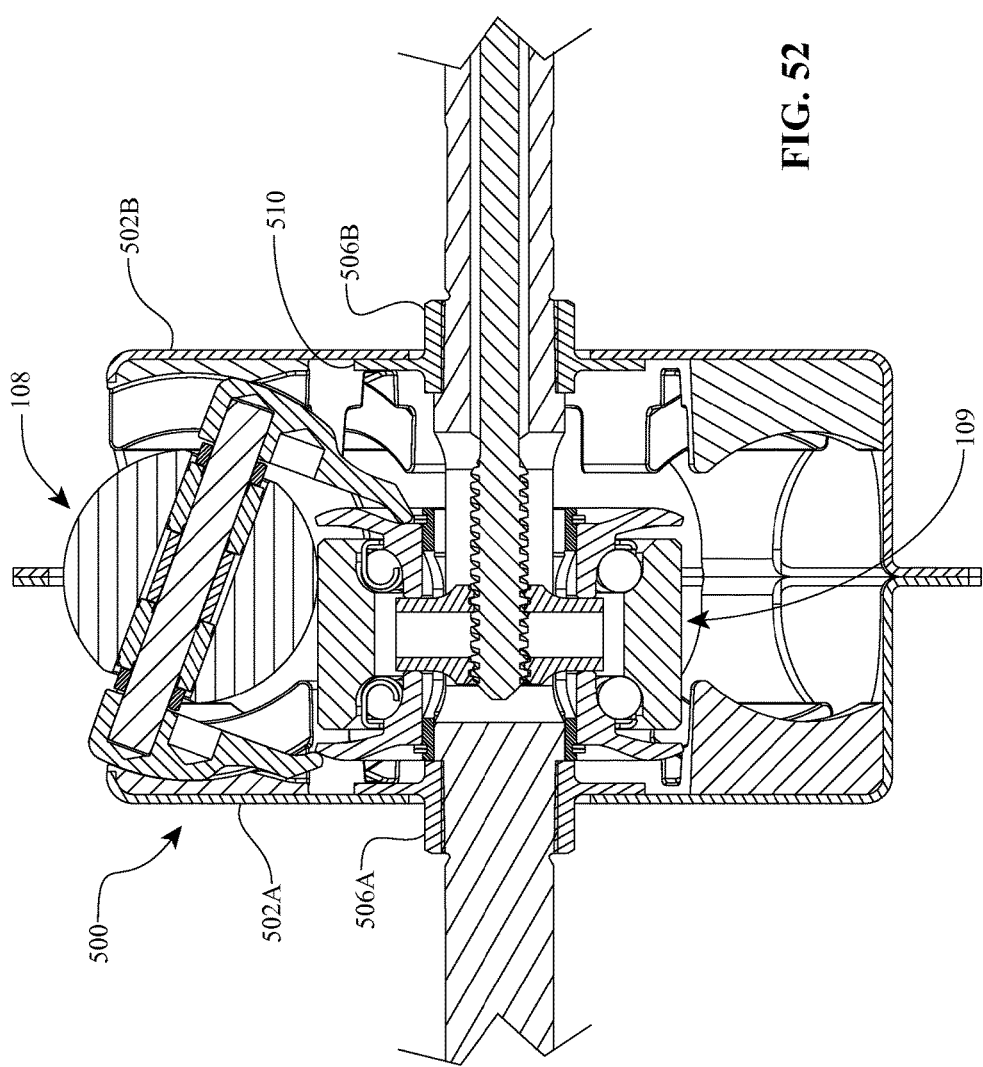

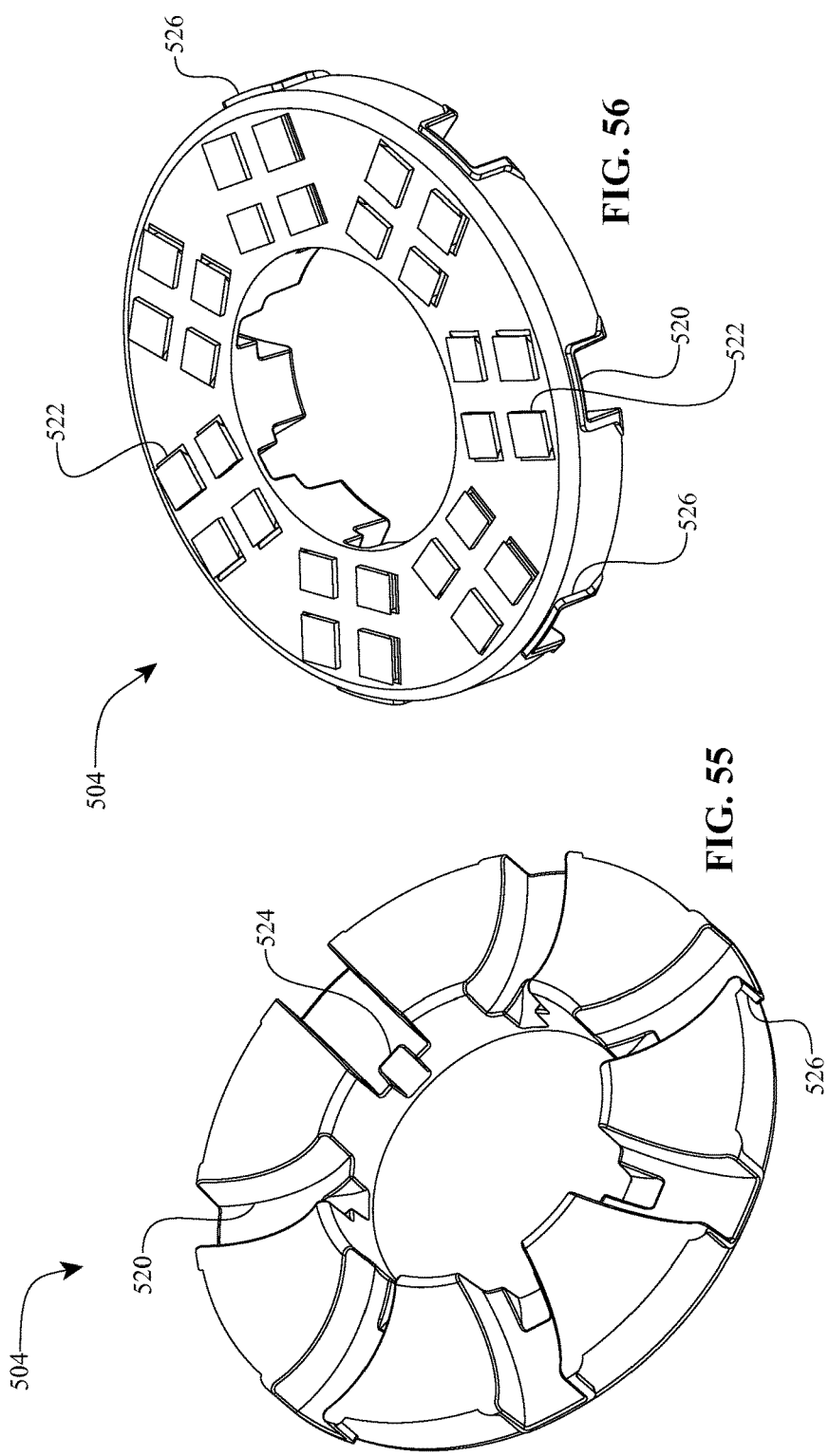

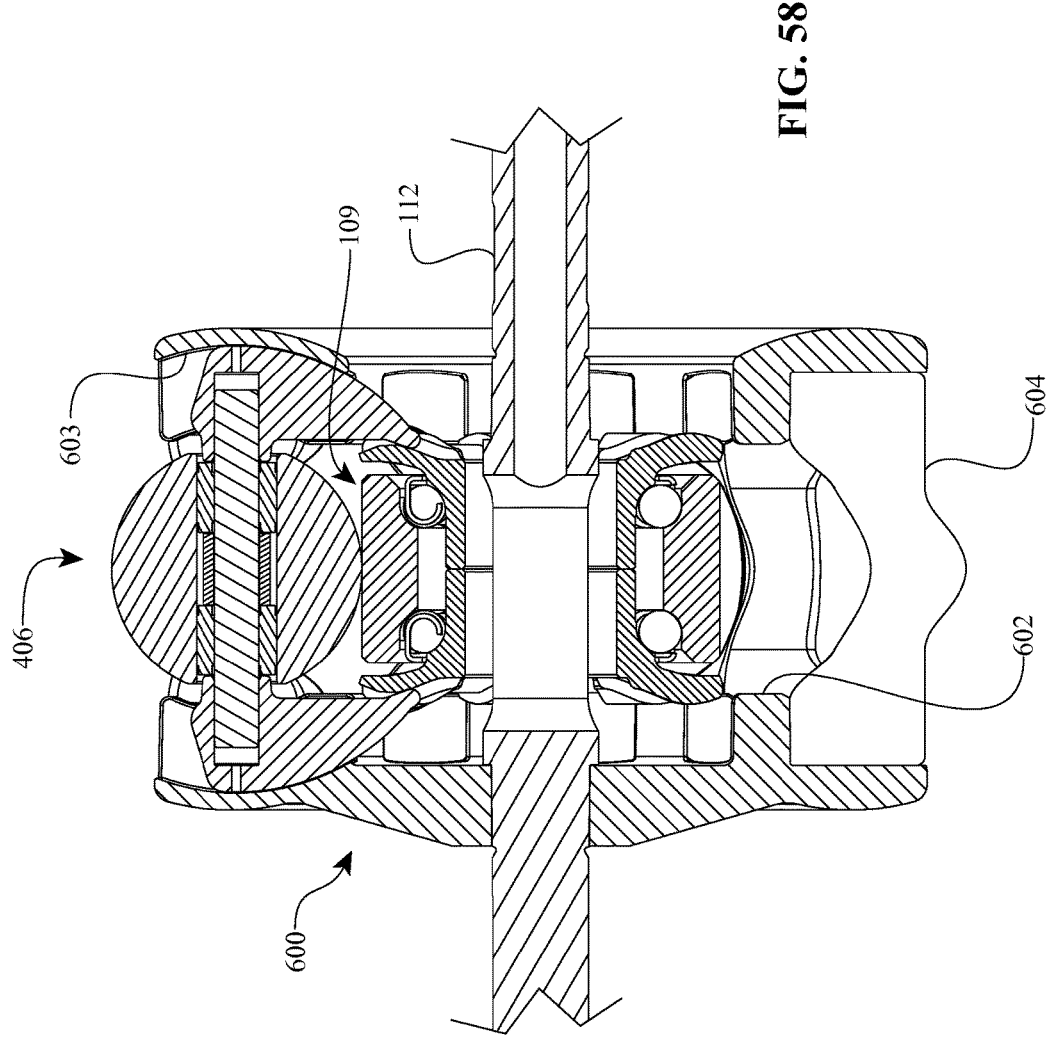

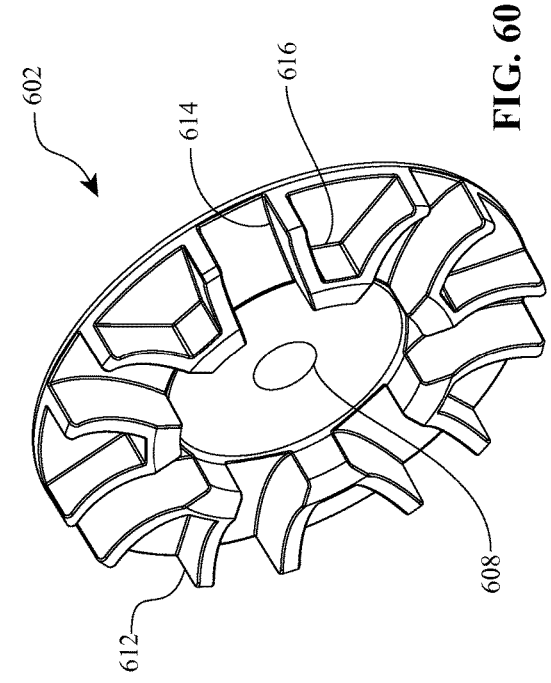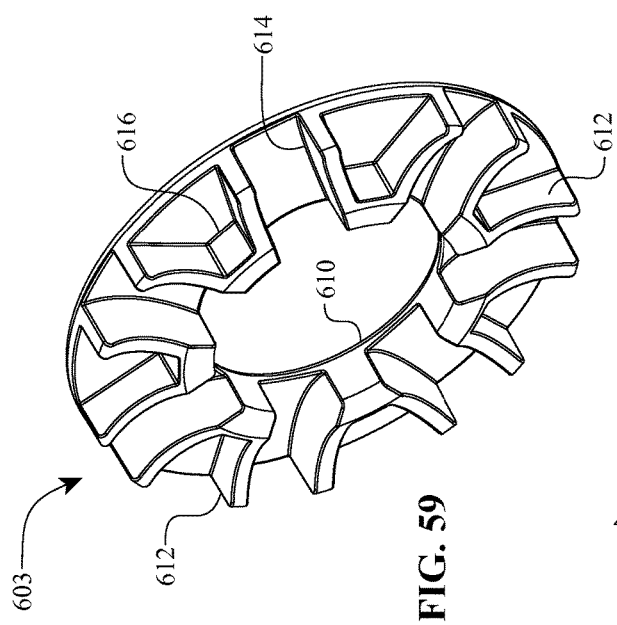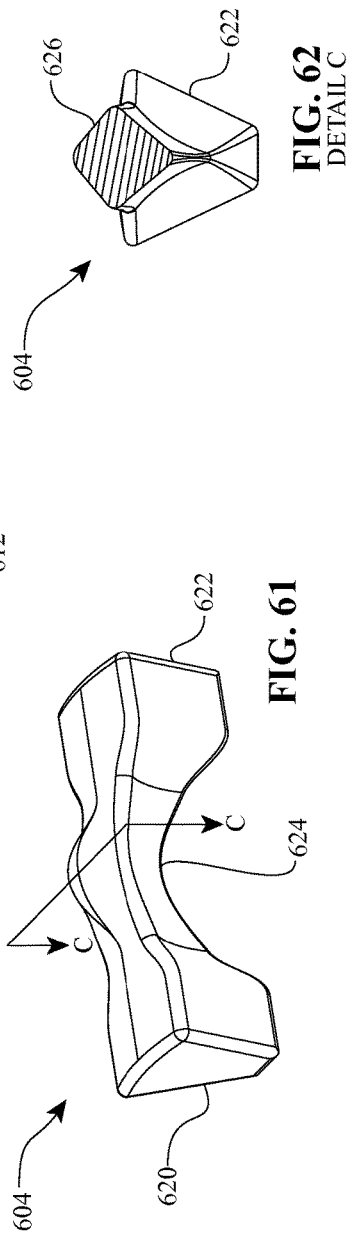

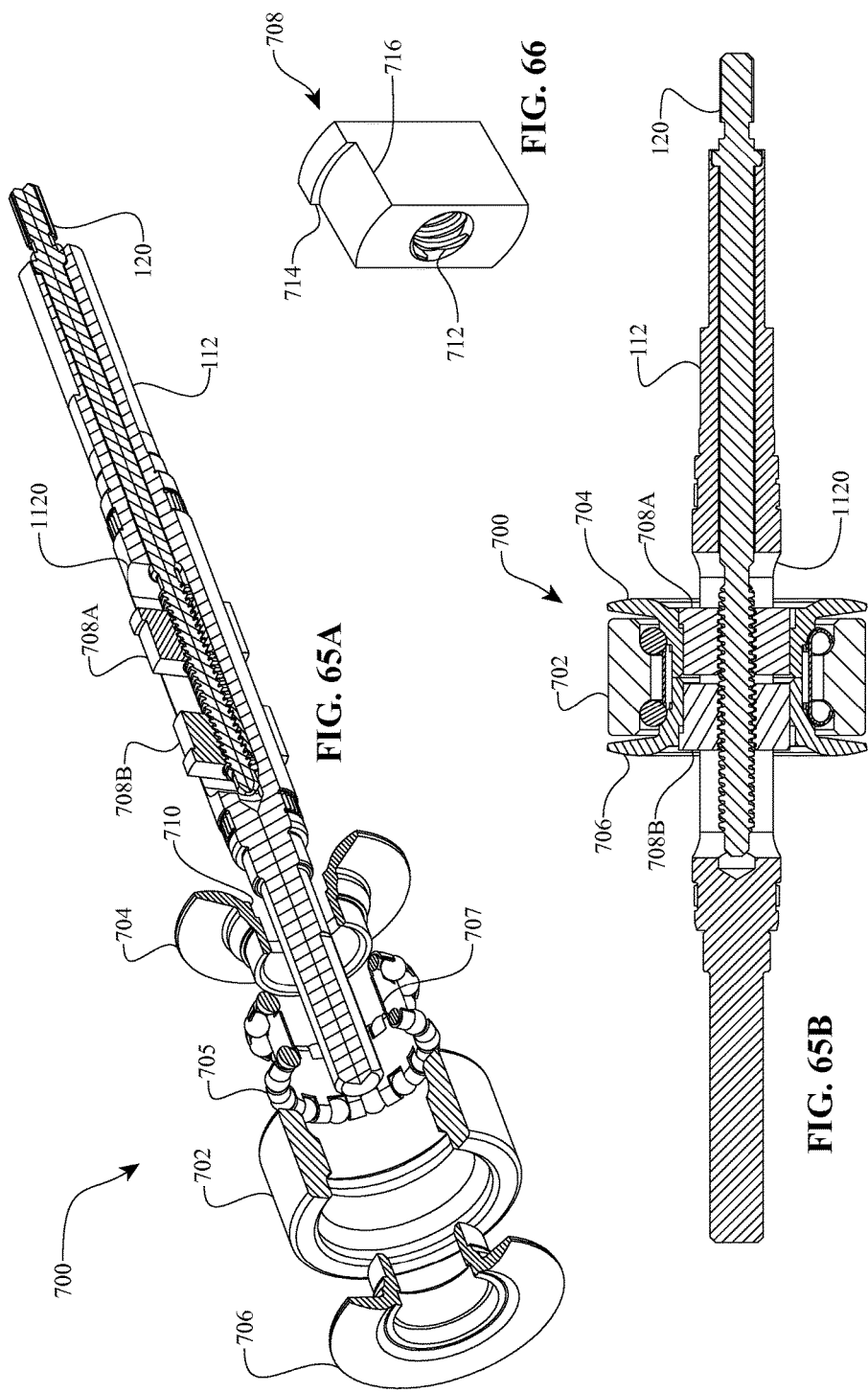

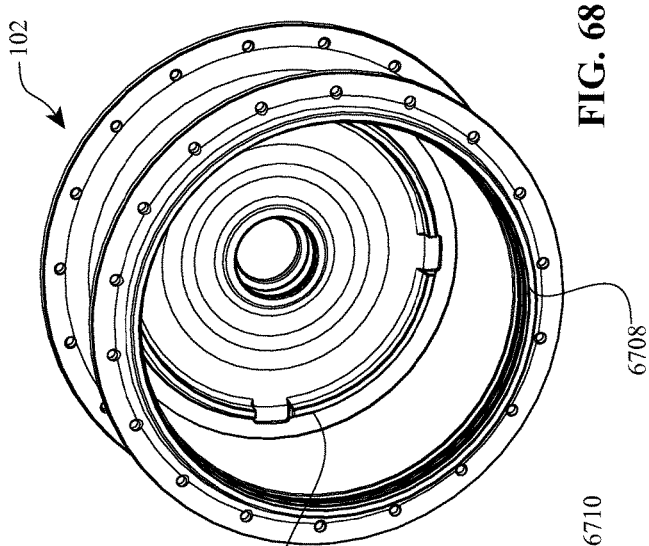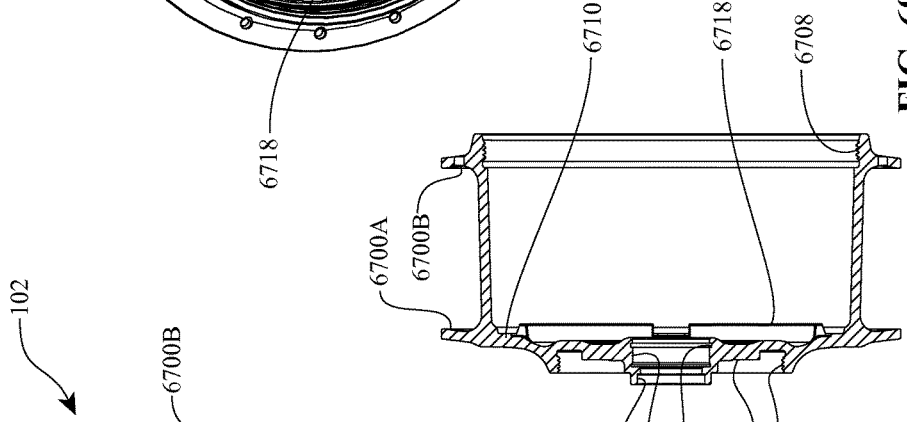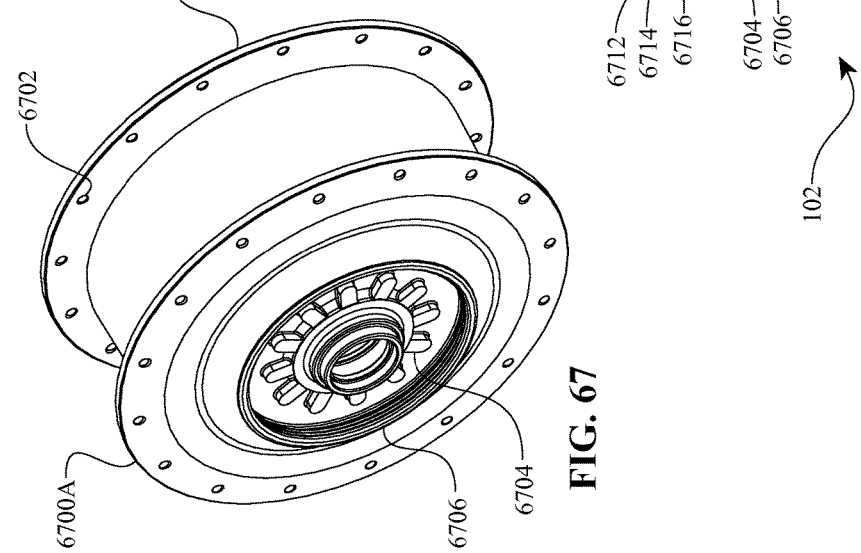

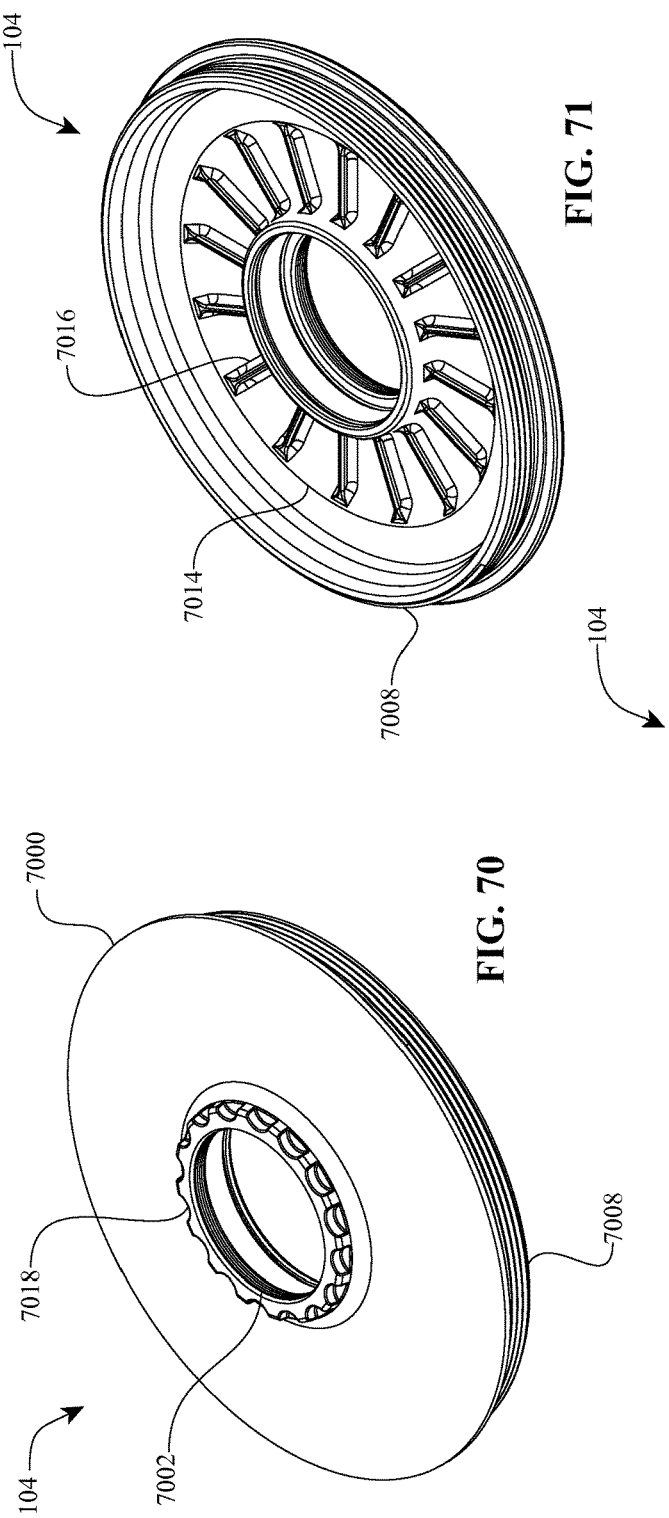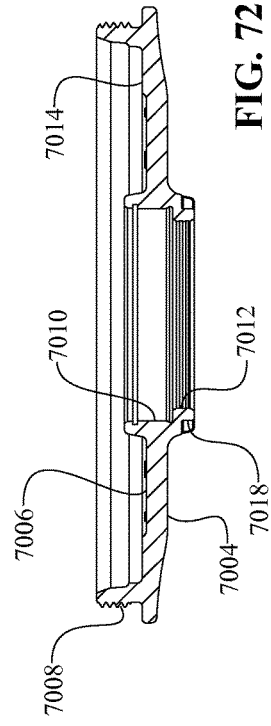

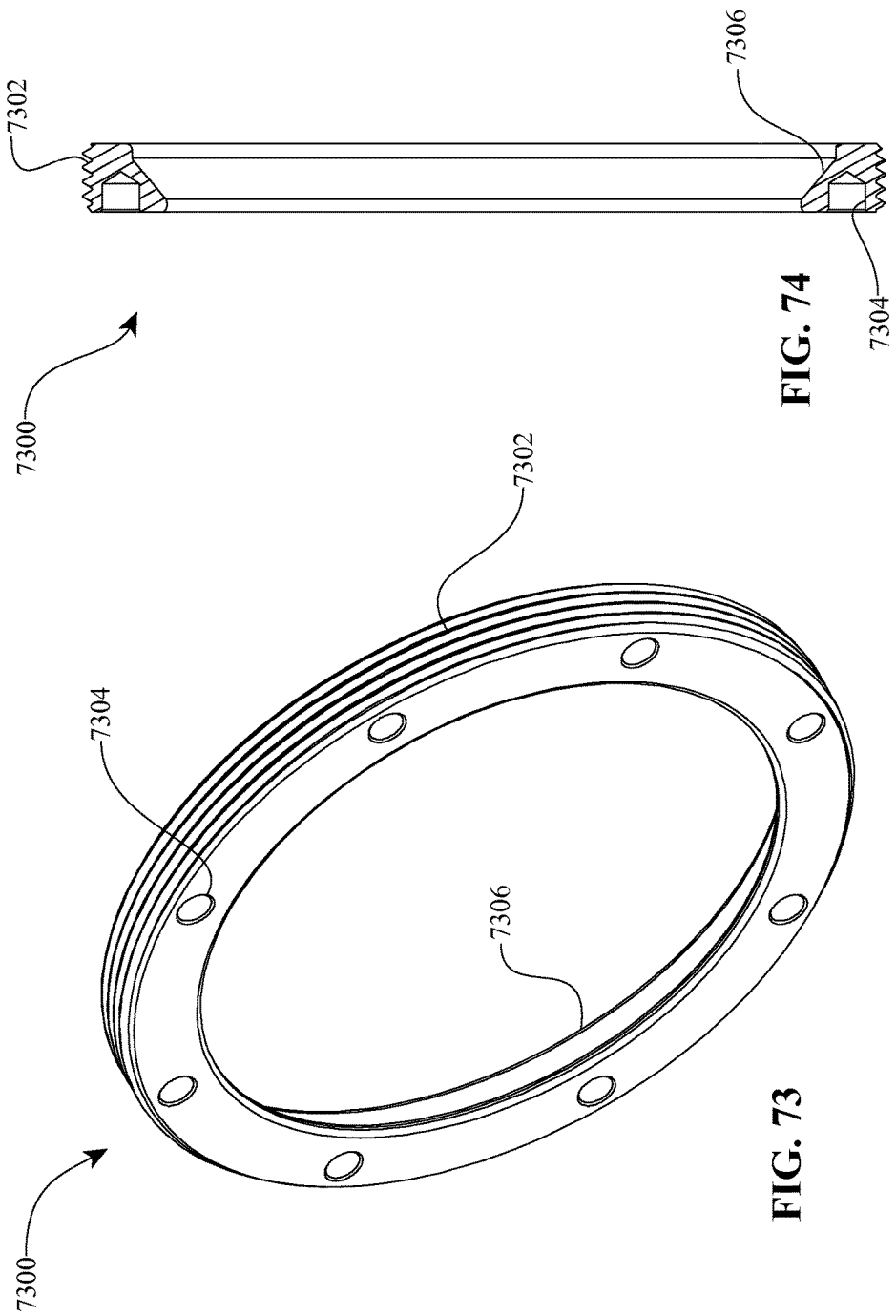

CONTINUOUSLY VARIABLE TRANSMISSION

CROSS REFERENCE TO RELATED APPLICATIONS

This application is a continuation of U.S. application Ser. No. 14/790,475, filed Jul. 2, 2015 and scheduled to issue on Dec. 27, 2016 as U.S. Pat. No. 9,528,561, which is a continuation of U.S. application Ser. No. 14/171,025, filed Feb. 3, 2014 and issued as U.S. Pat. No. 9,074,674 on Jul. 7, 2015, which is a continuation of U.S. patent application Ser. No. 13/796,452, filed Mar. 12, 2013 and issued as U.S. Pat. No. 8,641,572 on Feb. 4, 2014, which is a continuation of U.S. patent application Ser. No. 12/999,586, filed Mar. 23, 2011 and issued as U.S. Pat. No. 8,398,518 on Mar. 19, 2013, which is a national phase application of International Application No. PCT/US2008/067940, filed Jun. 23, 2008. The disclosures of all of the above-referenced prior applications, publications, and patents are considered part of the disclosure of this application, and are incorporated by reference herein in their entirety.

BACKGROUND OF THE INVENTION

Field of the Invention

The field of the invention relates generally to transmissions, and more particularly to continuously variable transmissions (CVTs).

Description of the Related Art

There are well-known ways to achieve continuously variable ratios of input speed to output speed. The mechanism for adjusting an input speed from an output speed in a CVT is known as a variator. In a belt-type CVT, the variator consists of two adjustable pulleys having a belt between them. The variator in a single cavity toroidal-type CVT has two partially toroidal transmission discs rotating about an axle and two or more disc-shaped power rollers rotating on respective axes that are perpendicular to the axle and clamped between the input and output transmission discs.

Embodiments of the invention disclosed here are of the spherical-type variator utilizing spherical speed adjusters (also known as power adjusters, balls, sphere gears or rollers) that each has a tiltable axis of rotation; the speed adjusters are distributed in a plane about a longitudinal axis of a CVT. The speed adjusters are contacted on one side by an input disc and on the other side by an output disc, one or both of which apply a clamping contact force to the rollers for transmission of torque. The input disc applies input torque at an input rotational speed to the speed adjusters. As the speed adjusters rotate about their own axes, the speed adjusters transmit the torque to the output disc. The input speed to output speed ratio is a function of the radii of the contact points of the input and output discs to the axes of the speed adjusters. Tilting the axes of the speed adjusters with respect to the axis of the variator adjusts the speed ratio.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a continuously variable transmission having a group of balls that are arranged radially about a longitudinal axis. Each ball is configured to have a tiltable axis of rotation. In one embodiment, a leg is operably coupled to each of the balls. The leg can be configured to tilt the axis of rotation of the ball. The transmission can include a stator interfacial member slidingly coupled to the leg. The transmission can also include a stator support member coupled to the stator interfacial member.

Another aspect of the invention concerns a transmission having a torque driver rotatable about a longitudinal axis. The torque driver can be configured to receive a power input. The transmission can include a torsion plate operably coupled to the torque driver. The torsion plate can have a splined inner bore and a group of triangular extensions extending radially from the splined inner bore. In one embodiment, the transmission includes a load cam ring operably coupled to the torsion plate. The transmission can include a load cam roller retainer assembly operably coupled to the load cam ring. The transmission includes a traction ring operably coupled to the load cam roller retainer assembly. The transmission also includes a group of balls arranged radially about a longitudinal axis. Each ball has a tiltable axis of rotation. Each ball can be operably coupled to the traction ring.

Yet another aspect of the invention involves a power input device that includes a torque driver rotatable about a longitudinal axis. The torque driver can be configured to receive a power input. In one embodiment, the power input device includes a torsion plate coupled to the torque driver. The torsion plate can have a splined inner bore and a number of triangular extensions extending radially from the splined inner bore. The power input device can include a load cam ring coupled to the torsion plate. In one embodiment, the power input device includes a load cam roller retainer subassembly coupled to the load cam ring. The power input device can also include a traction ring coupled to the load cam roller retainer subassembly.

One aspect of the invention concerns an assembly for an axial force generator that includes a first slotted ring configured to receive a number of load cam rollers. In one embodiment, the assembly includes a second slotted ring configured to receive the load cam rollers. The assembly can also include a spring configured to be retained in the first and/or second slotted ring.

Another aspect of the invention relates to a torsion plate having a substantially disc-shaped body with a splined inner bore. In one embodiment, the torsion plate has a number of structural ribs coupled to the disc-shaped body. The structural ribs extend radially from the spline inner bore. The torsion plate can also have a set of splines coupled to the outer periphery of the disc shaped body.

Yet one more aspect of the invention addresses a carrier for a continuously variable transmission having a group of planet subassemblies. Each planet subassembly has a ball configured to rotate about a tiltable axis. In one embodiment, the carrier includes a stator interfacial member configured to be operably coupled to a planet subassembly. The carrier can include a stator support member operably coupled to the stator interfacial member. The carrier can also include a stator torque reaction member operably coupled to the stator support member.

In another aspect, the invention concerns a transmission having a group of balls. Each ball is operably coupled to at least one leg. The transmission includes a stator interfacial member coupled to each leg. In one embodiment, the transmission includes a stator support member coupled to the stator interfacial member. The transmission also includes a stator torque reaction member coupled to the stator support member.

Another aspect of the invention relates to a transmission having a group of planet assemblies arranged angularly about a longitudinal axis of the transmission. Each planet assembly has a leg. In one embodiment, the transmission includes a stator interfacial member coaxial with the longitudinal axis. The stator interfacial member has a number of radial grooves configured to slidingly support the leg. The transmission also includes a stator support member coupled to the stator interfacial member. The stator support member is coaxial with the longitudinal axis.

One aspect of the invention relates to a stator assembly for a continuously variable transmission. The stator assembly includes a stator torque reaction insert having a number of torque reaction shoulders. In one embodiment, the stator assembly has a stator support member coupled to the stator torque reaction insert. The stator support member extends radially outward from the stator torque reaction insert. The stator support member can have a first face and a second face. The stator assembly can also include a stator interfacial member coupled to the stator support member. The stator interfacial member is substantially supported by the first face of the stator support member. The stator interfacial member has a number of radial grooves.

Another aspect of the invention addresses a stator support member for a continuously variable transmission (CVT). The stator support member can include a substantially disc-shaped body having an inner bore, a first face and a second face. The stator support member can also have a group of spacer support extensions arranged angularly on the first face. In one embodiment, the stator support member includes a number of guide support slots. Each guide support slot is arranged substantially between each of the spacer support extensions. The stator support member has a number of interlocking holes formed in each of the guide support slots. The stator support member also has a number of capture extensions formed on the outer periphery of the disc-shaped body.

One more aspect of the invention concerns a stator interfacial member for a continuously variable transmission. The stator interfacial member includes a substantially disc-shaped body having a central bore, a first face, and a second face. In one embodiment, the stator interfacial member includes a number of sliding guide slots that extend radially from the central bore. The guide slots can be arranged substantially on the first face. The stator interfacial member can include a set of interlocking tabs extending from the second face. The stator interfacial member has a capture ring formed around the outer circumference of the disc-shaped body. The stator interfacial member also has a group of capture cavities formed on the capture ring.

Yet another aspect of the invention involves a planet assembly for a continuously variable transmission (CVT) having a shift cam and a carrier assembly. The planet assembly has a ball with a through bore. In one embodiment, the planet assembly has a ball axle coupled to the through bore. The planet assembly also has a leg coupled to the ball axle. The leg has a first end configured to slidingly engage the shift cam. The leg further has a face configured to slidingly engage the carrier assembly.

Another aspect of the invention relates to a leg for a continuously variable transmission (CVT) having a carrier assembly. The leg includes an elongated body having a first end and a second end. In one embodiment, the leg has an axle bore formed on the first end. The leg can have a shift cam guide surface formed on the second end. The shift cam guide surface can be configured to slidingly engage a shift cam of the CVT. The leg can also have a sliding interface formed between the first end and the second end. The sliding interface can be configured to slidingly engage the carrier assembly.

Yet another aspect of the invention involves a transmission. In one embodiment, the transmission includes a group of planet assemblies arranged angularly about, and on a plane perpendicular to, a longitudinal axis of the transmission. Each planet assembly has a leg. The transmission can include a set of stator interfacial inserts arranged angularly about the longitudinal axis. Each leg is configured to slidingly couple to each of the stator interfacial inserts. The transmission can also include a stator support member mounted coaxially with the longitudinal axis. The stator support member can be configured to couple to each of the stator interfacial inserts.

In another aspect, the invention concerns a stator support member for a continuously variable transmission (CVT). The stator support member includes a generally cylindrical body having a central bore. In one embodiment, the stator support member has a number of insert support slots arranged angularly about, and extending radially from, the central bore. The stator support member can include a number of stator support extensions arranged coaxial with the insert support slots. The stator support extensions are arranged angularly about the central bore. Each of the stator support extensions has a fastening hole and a dowel pin hole.

Another aspect of the invention relates to a planet assembly for a continuously variable transmission (CVT) having a shift cam and a carrier assembly. The planet assembly includes a ball having a through bore. In one embodiment, the planet assembly includes a ball axle received in the through bore. The planet assembly can also include a leg coupled to the ball axle. The leg has a first end configured to slidingly engage the shift cam. The leg has a face configured to slidingly engage the carrier assembly. The leg has an axle bore formed on a second end. The leg has a bearing support extension extending from the axle bore.

One aspect of the invention relates to a shift cam for a continuously variable transmission (CVT). The shift cam has a number of leg contact surfaces arranged angularly about, and extending radially from, a longitudinal axis of the CVT. Each of the leg contact surfaces has a convex profile with respect to a first plane and a substantially flat profile with respect to a second plane. The shift cam also has a shift nut engagement shoulder formed radially inward of each of the leg contact surfaces.

Another aspect of the invention addresses a transmission having a group of planet assemblies arranged angularly about a longitudinal axis. Each planet assembly has a leg. The transmission can have a stator interfacial member operably coupled to each of the planet assemblies. The stator interfacial member can be coaxial with the group of planet assemblies. In one embodiment, the transmission has a stator support member coupled to the stator interfacial member. The stator support member includes a substantially bowl-shaped body having a central bore. The stator support member can have a fastening flange located on an outer periphery of the bowl-shaped body. The stator support member also includes a set of interlocking tabs located on an interior surface of the bowl-shaped body. The interlocking tabs are configured to couple to the stator interfacial member.

One more aspect of the invention concerns a stator support member for a continuously variable transmission having a stator interfacial member. In one embodiment, the stator support member has a substantially bowl-shaped body with a central bore. The stator support member includes a fastening flange located on an outer periphery of the bowl-shaped body. The stator support member also has a set of interlock tabs located on an interior surface of the bowl-shaped body.

Yet another aspect of the invention involves a stator interfacial member for a continuously variable transmission (CVT). The stator interfacial member includes a substantially disc-shaped body with an inner bore, a first face, and a second face. In one embodiment, the stator interfacial member has a number of guide slots arranged angularly about, and extending radially from the inner bore. The guide slots are formed on the first face. The stator interfacial member includes a set of interlock tabs substantially aligned with each of the guide slots. The interlock tabs are formed on the second face. The stator interfacial member can also include a number of stator support member extensions coupled to each of the guide slots. The stator support member extensions are located on an outer periphery of the disc-shaped body.

Another aspect of the invention relates to a transmission having a group of planet assemblies arranged angularly about a longitudinal axis of the transmission. Each planet assembly has a leg. In one embodiment, the transmission includes an axle arranged along the longitudinal axis. The transmission can include a first stator support member slidingly coupled to each of the planet assemblies. The first stator support member has a first central bore. The first central bore can be coupled to the axle. The transmission includes a second stator support member sliding coupled to each of the planet assemblies. The second stator support member has a second central bore. The second central bore has a diameter larger than a diameter of the first central bore. The transmission can also include a set of stator spacers coupled to the first and second stator support members. The stator spacers are arranged angularly about the longitudinal axis.

Yet one more aspect of the invention addresses a stator support member for a continuously variable transmission (CVT). The stator support member has a generally disc-shaped body having a central bore. In one embodiment, the stator support member has a group of support extensions arranged angularly about the central bore. Each of the support extensions has a substantially triangular shape. Each of the support extensions is located radially outward of the central bore. The stator support member includes a number of stator spacer cavities coupled to the support extensions. The stator spacer cavities have a substantially triangular shape. The stator support member can also include a number of guide slots formed on the disc-shaped body. Each guide slot extends radially from the central bore. Each guide slot is substantially angularly aligned with each of the support extensions.

In another aspect, the invention concerns a stator spacer for a continuously variable transmission. The stator spacer includes an elongated body having a first end and a second end. In one embodiment, the stator spacer has a clearance neck formed between the first end and the second end. Each of the first and second ends has a substantially triangular cross-section. At least a portion of the clearance neck has a substantially diamond-shaped cross-section.

Another aspect of the invention relates to an idler assembly for a continuously variable transmission (CVT). The idler assembly includes a substantially cylindrical idler having a central bore. The central bore defines a longitudinal axis. The idler is configured to rotate about the longitudinal axis. In one embodiment, the idler assembly includes first and second shift cams operably coupled respectively to a first and a second end of the idler. The first and second shift cams are configured to be substantially non-rotatable about the longitudinal axis. The idler assembly includes a first shift nut coupled to the first shift cam. The first shift nut has a threaded bore and a shift cam engagement shoulder extending radially from the threaded bore. The idler assembly also includes a second shift nut coupled to the second shift cam, the second shift nut comprising a second threaded bore and a second shift cam engagement shoulder extending radially from the second threaded bore.

One aspect of the invention relates to a method of manufacturing an idler assembly for a continuously variable transmission (CVT) having an axle arranged along a longitudinal axis. In one embodiment, the method includes providing a shift nut clearance slot in the axle. The method can include providing a substantially cylindrical idler having a central bore. The method includes operably coupling the idler to a first shift cam on a first end of the idler and to a second shift cam on a second end of the idler thereby yielding a subassembly including the idler, the first shift cam, and the second shift cam. The method includes placing a shift nut in the shift nut clearance slot. The shift nut has a shift cam engagement shoulder extending radially from a threaded bore. The method includes installing the subassembly of the idler, the first shift cam, and the second shift cam on the axle such that said subassembly substantially surrounds the shift nut. The method also includes coupling a shift rod to the threaded bore of the shift nut thereby coupling the shift nut engagement shoulder to the first or second shift cam.

Another aspect of the invention concerns a hub shell for a continuously variable transmission (CVT). The hub shell includes a generally hollow cylindrical body having a substantially closed end and a central bore. In one embodiment, the hub shell has first and a second spoke flanges coupled to an outer periphery of the hollow cylindrical body. The hub shell includes a set of brake splines coupled to the substantially closed end. The hub shell can have a locking chamfer coupled to the substantially closed end. The locking chamfer is located radially outward of, and coaxial with the brake splines. The hub shell can also include a set of splines coupled to the substantially closed end. The splines are located on an interior surface of the cylindrical body.

Yet another aspect of the invention involves a brake adapter kit for a continuously variable transmission (CVT) having a hub shell. The brake adapter kit includes a brake adapter ring having a brake alignment surface. The brake adapter ring has a locking chamfer configure to engage the hub shell. The brake adapter kit can include a roller brake adapter configured to couple to the brake adapter ring and to the hub shell. Once assembled the roller brake adapter is rigidly coupled to the hub shell.

One aspect of the invention concerns a brake adapter kit for a continuously variable transmission (CVT) having a hub shell. The brake adapter kit includes a brake adapter ring having a brake alignment surface. The brake adapter ring has a locking chamfer configure to engage the hub shell. In one embodiment, the brake adapter kit includes a disc brake adapter configured to couple to the brake adapter ring and to the hub shell. Once assembled the disc brake adapter is rigidly coupled to the hub shell.

Another aspect of the invention relates to a transmission having a group of planet assemblies arranged angularly about a longitudinal axis of the transmission. Each planet assembly has a leg. In one embodiment, the transmission includes a stator interfacial cap coupled to each leg. The transmission includes a stator support member coaxial with the planet assemblies. The stator support member has a number of guide grooves arranged angularly about, and extending radially from, the longitudinal axis. Each of the stator interfacial caps is configured to engage slidingly to the stator support member.

Yet one more aspect of the invention addresses a planet assembly for a continuously variable transmission. The planet assembly can include a ball with a through bore. The planet assembly includes an axle operably received in the through bore. The axle can be configured to provide a tiltable axis of rotation for the ball. In one embodiment, the planet assembly includes a leg coupled to the axle. The leg has an elongated body with a first end and a second end. The leg couples to the axle in proximity to the first end. The planet assembly also includes a stator interfacial cap coupled to the leg. The stator interfacial cap has a sliding interfacial surface.

BRIEF DESCRIPTION OF THE FIGURES

FIG. 7 is a perspective view of a torsion plate that can be used in the input subassembly of FIG. 4.

FIG. 8 is a cross-sectional view of the torsion plate of FIG. 7.

FIG. 15A is a perspective view of one embodiment of a torsion plate that can be used in the input subassembly of FIG. 4.

FIG. 15B is a partially cross-sectioned perspective view of the torsion plate of FIG. 15A.

FIG. 22 is a plan view of the stator subassembly of FIG. 21.

FIG. 23 is a second plan view of the stator subassembly of FIG. 21.

FIG. 24 is a cross-section of the stator subassembly of FIG. 21.

FIG. 25 is a perspective view of one embodiment of a stator support member that can be used with the stator subassembly of FIG. 21.

FIG. 26 is a second perspective view of the stator support member of FIG. 26.

FIG. 37 is a plan view of the stator support member of FIG. 35.

FIG. 38 is a second plan view of the stator support member of FIG. 35.

FIG. 39 is a perspective view of one embodiment of a stator interfacial insert that can be used with the carrier assembly of FIG. 33.

FIG. 40 is a second perspective view of the stator interfacial insert of FIG. 39.

FIG. 41 is a cross-sectional view of the stator interfacial insert of FIG. 39.

FIG. 42 is a cross-sectional view of an embodiment of a stator interfacial insert that can be used with the carrier assembly of FIG. 33.

FIG. 43 is a partially cross-sectioned, exploded, perspective view of an embodiment of a carrier assembly that can be used with the CVT of FIG. 2.

FIG. 45 is a perspective view of one embodiment of a stator support member that can be used in the carrier assembly of FIG. 43.

FIG. 46 is a second perspective view of the stator support member of FIG. 45.

FIG. 47 is a perspective view of one embodiment of a planet subassembly that can be used with the carrier assembly of FIG. 43.

FIG. 48 is a cross-sectional view of the planet subassembly of FIG. 47.

FIG. 49 is a partially cross-sectioned, perspective view of one embodiment of a shift cam that can be used in the CVT of FIG. 2.

FIG. 50 is a cross-sectional view of the shift cam of FIG. 49.

FIG. 52 is a cross-sectional view of the carrier assembly of FIG. 51.

FIG. 55 is a perspective view of one embodiment of a stator interfacial member that can be used in the carrier assembly of FIG. 51.

FIG. 56 is a second perspective view of the stator interfacial member of FIG. 55.

FIG. 58 is a cross-sectional view of the carrier assembly of FIG. 57.

FIG. 59 is a perspective view of an embodiment of a stator support member that can be used in the carrier assembly of FIG. 57.

FIG. 60 is a perspective view of an embodiment of a stator support member that can be used in the carrier assembly of FIG. 57.

FIG. 61 is a perspective view of an embodiment of a stator spacer that can be used in the carrier assembly of FIG. 57.

FIG. 62 is a cross-sectional view of the stator spacer of FIG. 61.

FIG. 65A is a partially cross-sectioned, exploded, perspective view of an embodiment of an idler assembly that can be used in the CVT of FIG. 2.

FIG. 65B is a cross-section of the idler assembly of FIG. 65A.

FIG. 66 is a perspective view of an embodiment of a shift nut that can be used in the idler assembly of FIG. 65A.

FIG. 67 is a perspective view of an embodiment of a hub shell that can be used in the CVT of FIG. 2.

FIG. 68 is a second perspective view of the hub shell of FIG. 67.

FIG. 69 is a cross-sectional view of the hub shell of FIG. 67.

FIG. 70 is a perspective view of an embodiment of a hub cover that can be used in the CVT of FIG. 2.

FIG. 71 is a second perspective view of the hub cover of FIG. 70.

FIG. 72 is a cross-sectional view of the hub cover of FIG. 70.

FIG. 73 is a perspective view of an embodiment of a brake adapter ring that can be used with the CVT FIG. 2.

FIG. 74 is a cross-sectional view of the brake adapter ring of FIG. 73.

DETAILED DESCRIPTION OF CERTAIN INVENTIVE EMBODIMENTS

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the invention. Furthermore, embodiments of the invention can include several novel features, no single one of which is solely responsible for its desirable attributes or which is essential to practicing the inventions described. The CVT embodiments described here are generally of the type disclosed in U.S. Pat. Nos. 6,241,636; 6,419,608; 6,689,012; 7,011,600; 7,166,052; U.S. patent application Ser. Nos. 11/243,484; 11/543,311; 60/948,273; 60/864,941; and Patent Cooperation Treaty Patent Application PCT/US2007/023315. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, stator assembly 200A and stator assembly 200B) will be referred to collectively by a single label (for example, stator assembly 200).

Figure 1:
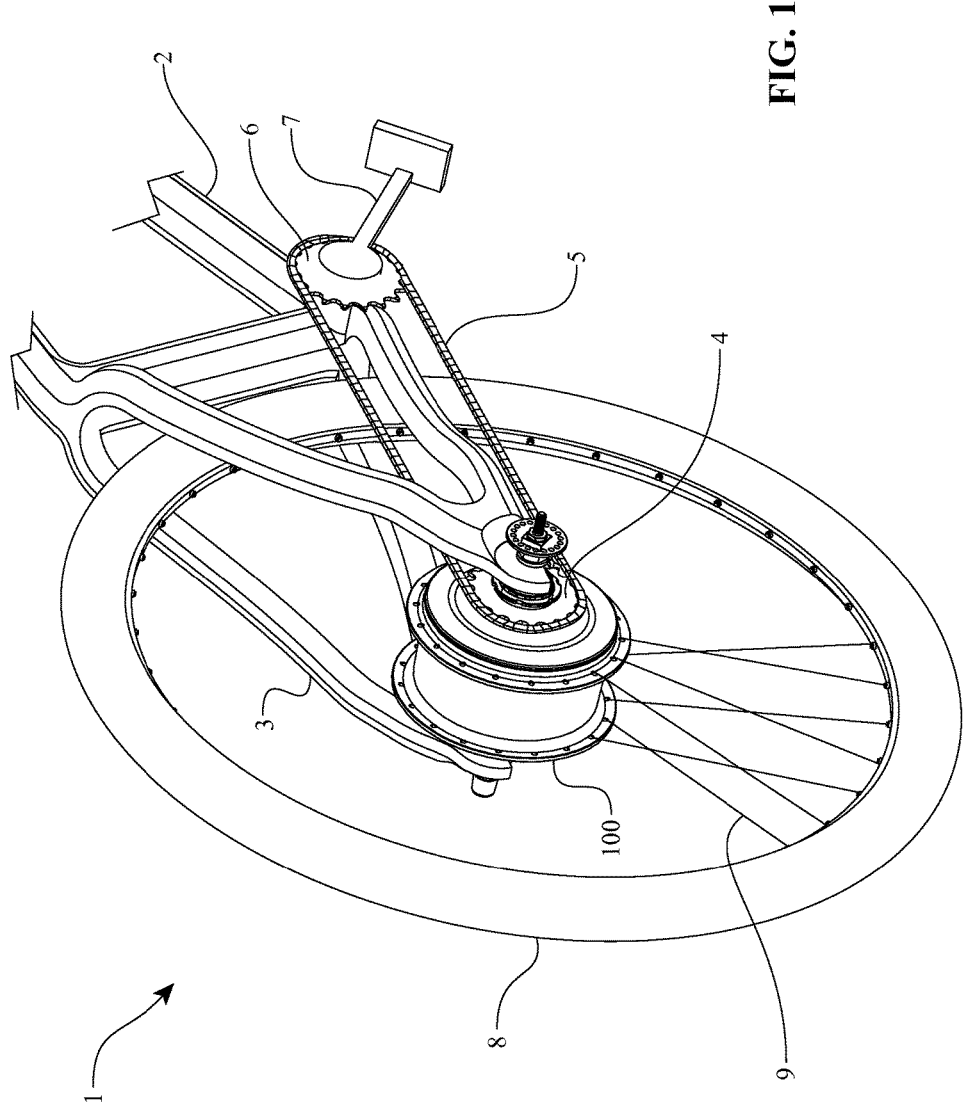
FIG. 1 is a perspective view of one embodiment of a bicycle having a continuously variable transmission (CVT) in accordance with inventive embodiments disclosed herein.

Embodiments of a continuously variable transmission (CVT), and components and subassemblies therefor, will be described now with reference to FIGS. 1-83. Referring now to FIG. 1, in one embodiment a bicycle 1 can include a continuously variable transmission (CVT) 100 supported in a frame 2. For simplification, only the rear portion of the bicycle 1 is shown FIG. 1. The frame 2 can include a set of dropouts 3 that are configured to support the CVT 100. A sprocket 4 can couple to the CVT 100, and the sprocket 4 further couples via a drive chain 5 to a crank sprocket 6. The crank sprocket 6 is typically coupled to a pedal and crank assembly 7. The CVT 100 can be coupled to a wheel 8 via a number of wheel spokes 9. For clarity, only a few of the wheel spokes 9 are shown in FIG. 1 as an illustrative example. In one embodiment, the transmission ratio of the CVT 100 can be adjusted via cables and a handle grip (not shown).

The CVT 100 can be used in many applications including, but not limited to, human powered vehicles, light electrical vehicles hybrid human-, electric-, or internal combustion powered vehicles, industrial equipment, wind turbines, etc. Any technical application that requires modulation of mechanical power transfer between a power input and a power sink (for example, a load) can implement embodiments of the CVT 100 in its power train.

Figure 2:
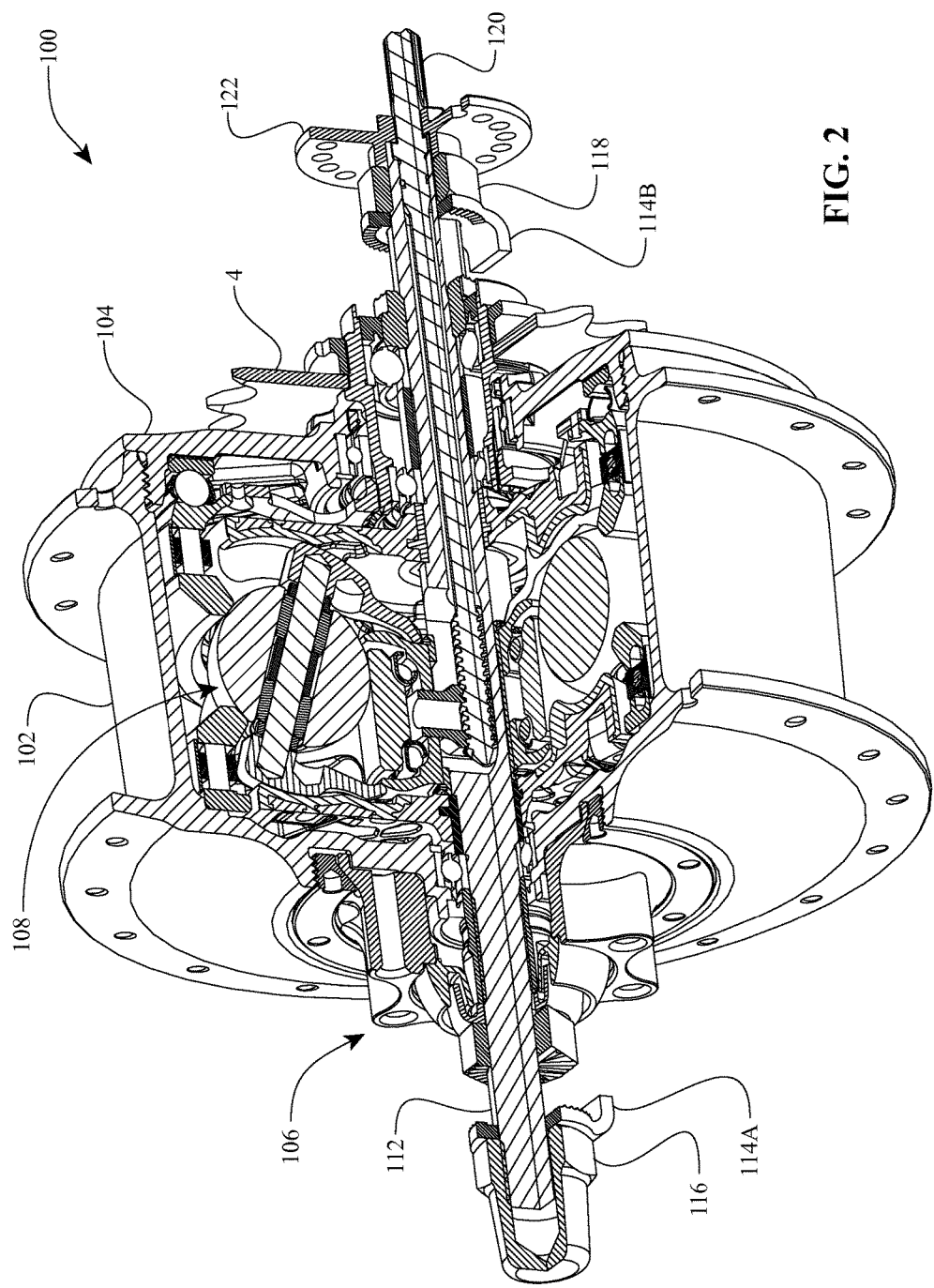
FIG. 2 is a partially cross-sectioned, perspective view of one embodiment of a (CVT).
Figure 3:
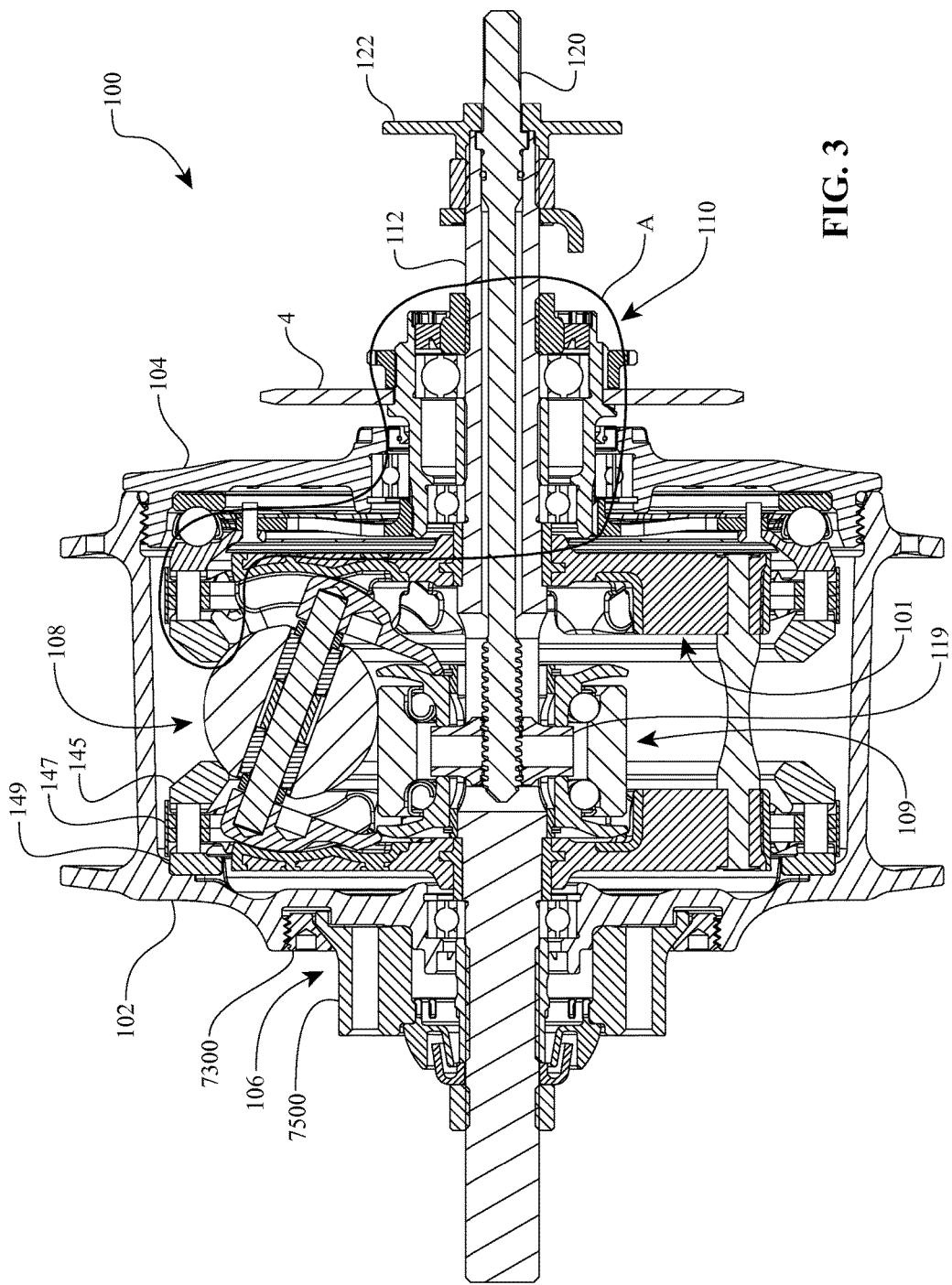
FIG. 3 is a cross-sectional view of the CVT of FIG. 2.

Turning now to FIGS. 2 and 3, in one embodiment the CVT 100 includes a hub shell 102 coupled to a hub cover 104. The hub shell 102 substantially surrounds the internal components of the CVT 100. A brake adapter kit 106 couples to the hub shell 102. The CVT 100 can include a number of planet subassemblies 108 supported in a carrier assembly 101. The planet subassemblies 108 couple to an input subassembly 110, which input subassembly 110 is generally depicted in detail view A). In some embodiments, the planet subassemblies 108 are operably coupled to the hub shell 102 via a traction ring 145. The traction ring 145 can be configured to engage a cam roller retainer assembly 147, which couples to an output cam ring 149. The hub shell 102 couples to the output cam ring 149 in one embodiment. A main axle 112 can be arranged along the longitudinal axis of the CVT 100 and can be coupled to, for example, the dropouts 3 with no-turn-washers 114, axle nut 116, and lock-nut 118. In one embodiment, a shift rod 120 can be arranged along a central bore of the main axle 112 and can be coupled to an idler subassembly 109 via a shift nut 119. The idler subassembly 109 is arranged radially inward of, and in contact with, the planet subassemblies 108. The shift rod 120 can be axially constrained in the main axle 112 via a shift-rod-lock nut 122. In one embodiment, the shift rod 120 couples to, for example, cables (not shown) that are operationally coupled to a handlegrip or user control interface (not shown). For descriptive purposes, the sprocket side of the CVT 100 can be referred to as the input side of the CVT 100, and the brake adapter kit 106 side of the CVT 100 can be referred to as the output side of the CVT 100.

During operation of CVT 100, an input power can be transferred to the input subassembly 110 via, for example, the sprocket 4. The input subassembly 110 can transfer power to the planet subassemblies 108 via a traction or friction interface between the input subassembly 110 and the planet subassemblies 108. The planet subassemblies 108 deliver the power to the hub shell 102 via the traction ring 145 and the output cam ring 149. A shift in the ratio of input speed to output speed, and consequently a shift in the ratio of input torque to output torque, is accomplished by tilting the rotational axis of the planet subassemblies 108. A shift in the transmission ratio involves actuating an axial or rotational movement of the shift rod 120 in the main axle 112, which facilitates the axial translation of the idler assembly 109 and thereby motivates the tilting of the rotational axis of the planet subassemblies 108.

Figure 4:
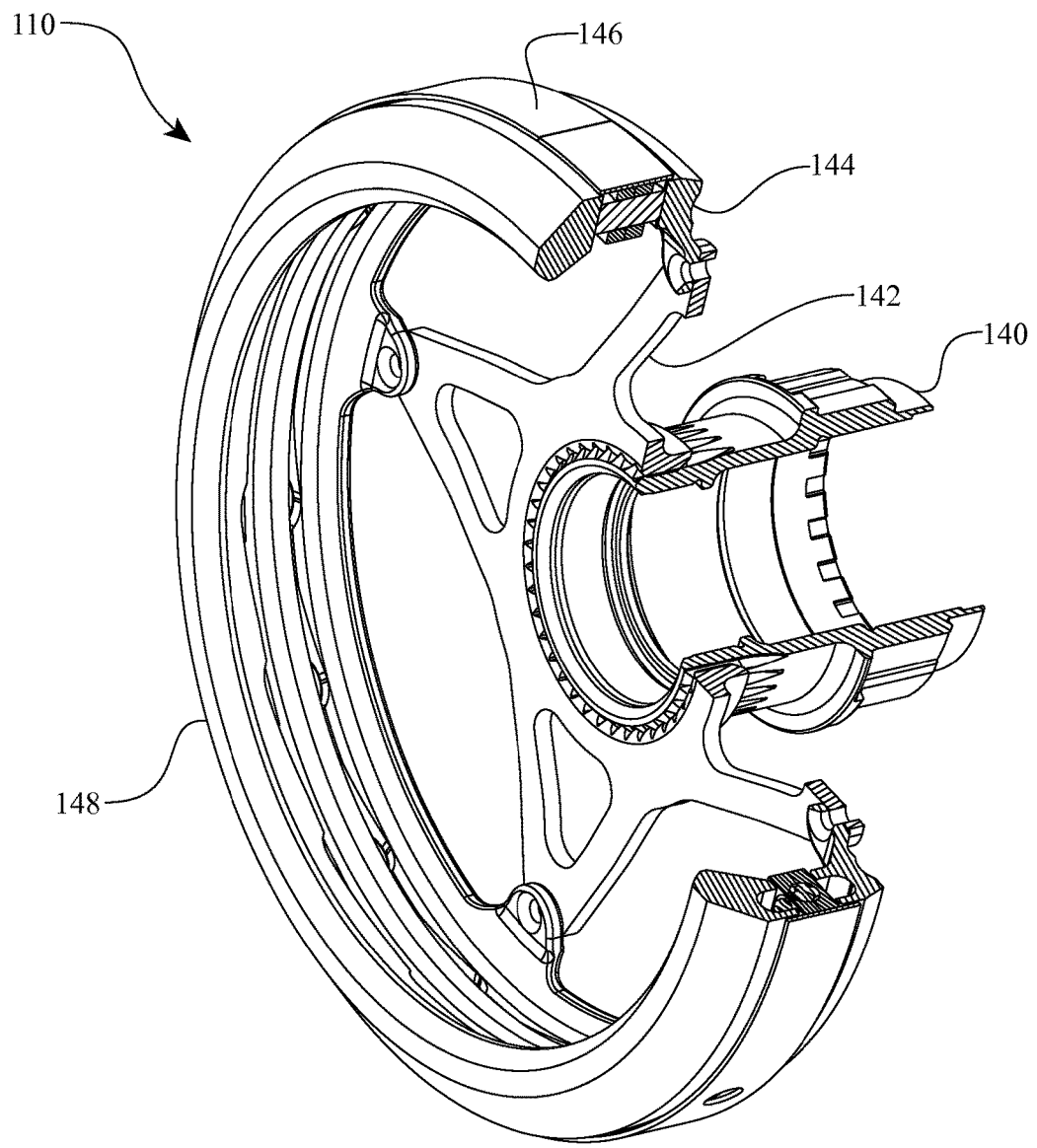
FIG. 4 is a perspective, cross-sectional view of one embodiment of an input subassembly that can be used in the CVT of FIG. 2.

Passing now to FIG. 4, in one embodiment the input subassembly 110 includes a torque driver 140 coupled to a torsion plate 142. The torsion plate 142 can be attached to a load cam ring 144 with, for example, screw fasteners or rivets. In some embodiments, the torsion plate 142 can be coupled to the load cam ring 144 with a spline. In one embodiment, the load cam ring 144 couples to a load cam roller retainer subassembly 146. The load cam roller retainer subassembly 146 further couples to a traction ring 148. The load cam ring 144, the load cam roller retainer subassembly 146, and the traction ring 148 are preferably configured to produce axial force during operation of the CVT 100. In other embodiments, the load cam ring 144, the load cam roller retainer subassembly 146, and the traction ring 148 are substantially similar in function to the traction ring 145, the load cam roller retainer 147, and the output cam ring 149 that are located on the output side of the CVT 100.

Figure 5:
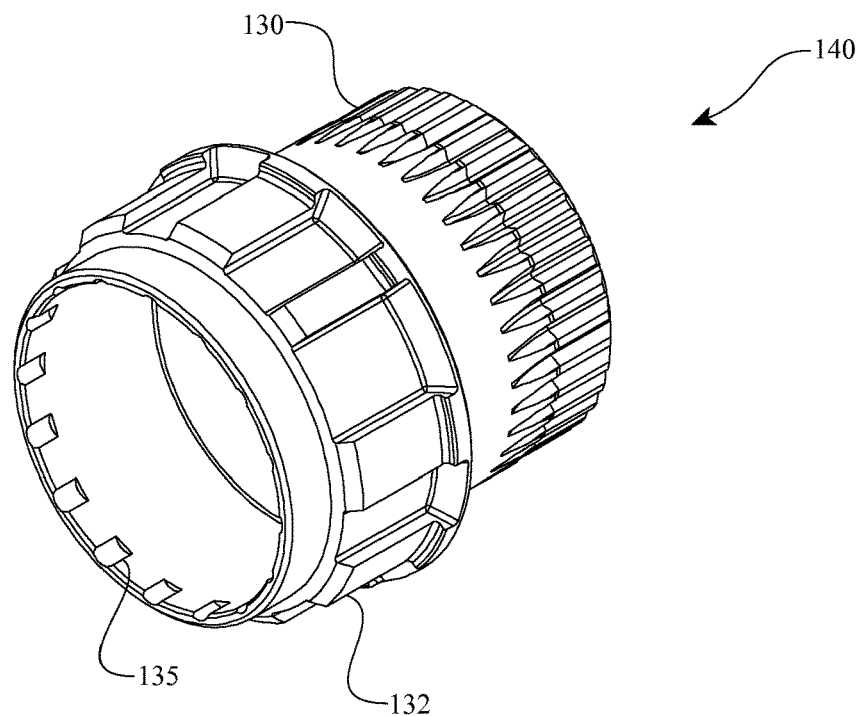
FIG. 5 is a perspective view of a torque driver that can be used in the input subassembly of FIG. 4.
Figure 6:
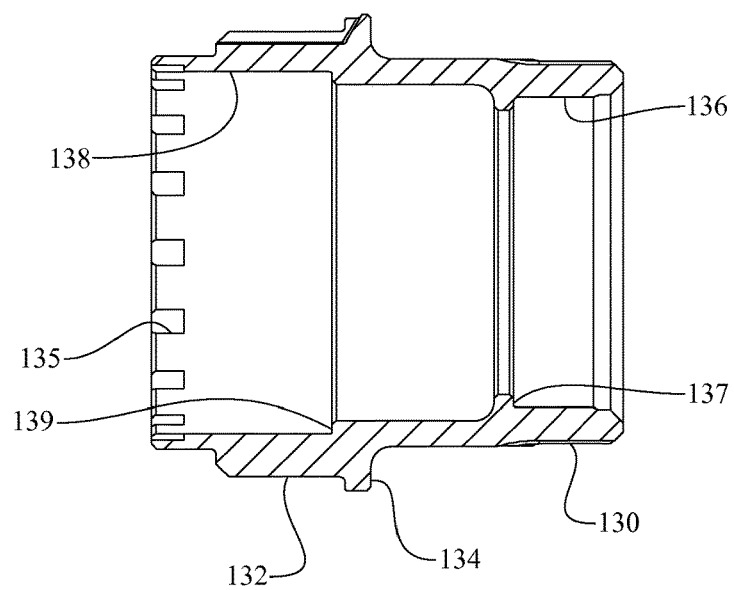
FIG. 6 is a cross-sectional view of the torque driver of FIG. 5.

Referring to FIGS. 5 and 6, in one embodiment the torque driver 140 can be a substantially hollow cylindrical body with a first end having a set of torsion plate engagement splines 130 and a second end having a set of sprocket engagement splines 132. In some embodiments, the torque driver 140 can include a sprocket support shoulder 134 located on the outer circumference of the cylindrical body and axially positioned between the torsion plate engagement splines 130 and the sprocket engagement splines 132. In other embodiments, the second end can have a standard bicycle freewheel thread to allow the coupling of a threaded freewheel or threaded sprocket. A first bearing bore 136 can be provided on the inner circumference of the cylindrical body in proximity to the first end. A first bearing support shoulder 137 can be arranged on the inner circumference of the cylindrical body in proximity to the first bearing bore 136. A second bearing bore 138 can be provided on the inner circumference of the cylindrical body in proximity to the sprocket engagement splines 132. A second bearing support shoulder 139 can be arranged on the inner circumference of the cylindrical body in proximity to the second bearing bore 138. In some embodiments, the torque driver 140 includes a number of service tool engagement splines 135 formed on the inner circumference of the cylindrical body. The service tool engagement splines 135 can be arranged in proximity to the sprocket engagement splines 132 and can generally be accessible to the exterior of the CVT 100.

Turning to FIGS. 7 and 8, in one embodiment the torsion plate 142 includes a splined inner bore 170 and a number of triangular extensions 172 extending radially from the splined inner bore 170. In some embodiments, the triangular extensions 172 are substantially axially aligned with a first end of the splined inner bore 170 so that the splined inner bore 170 and the triangular extensions 172 form a substantially flat face on the torsion plate 142. In other embodiments, the triangular extensions 172 extend from the splined inner bore 170 so that the radially outward end of the triangular extension 172 is angled relative to the splined inner bore 170 when viewed in the plane of the page of FIG. 8. In one embodiment, each of the triangular extensions 172 can be provided with a cutout 174. Each of the triangular extensions 172 can be provided with a fastening hole 176 positioned on a radially outward portion of the extension 172. The fastening holes 176 facilitate the coupling of the torsion plate 142 to the load cam ring 144. The splined inner bore 170 facilitates the coupling of the torsion plate 142 to the torque driver 140. The triangular extensions 172 provide a lightweight and torsionally stiff structure to the torsion plate 142. The torsion plate 142 can be made from steel, aluminum, magnesium, plastic, or other suitable material.

Figure 10:
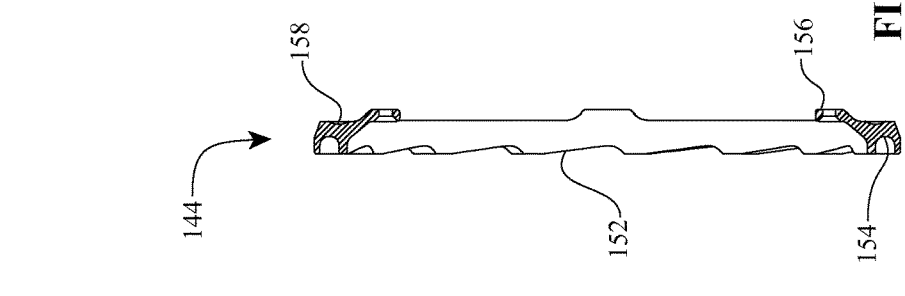
FIG. 10 is a cross-sectional view of the load cam ring of FIG. 9.
Figure 9:
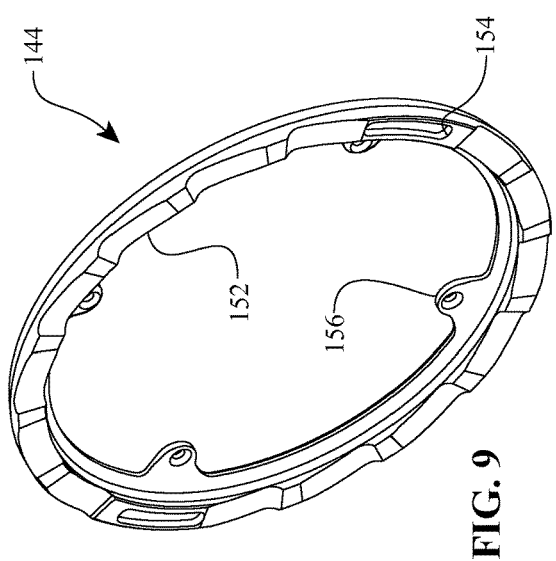
FIG. 9 is a perspective view of a load cam ring that can be used in the input subassembly of FIG. 4.

Turning to FIGS. 9 and 10, in one embodiment the load cam ring 144 is a substantially annular ring with a number of ramps 152 formed on a first side of the annular ring. The load cam ring 144 can include a set of preload spring grooves 154, which can be formed on the first side of the annular ring. In some embodiments, the load cam ring 144 can have a bearing support surface 158 formed on a second side of the annular ring that is oppositely located from the first side of the annular ring. In one embodiment, the load cam ring 144 can include a number of fastening lugs 156 arranged on the inner circumference of the annular ring. The fastening lugs 156 can be substantially axially aligned with the second side of the annular ring. In some embodiments, the fastening lugs 156 can be used to support an overmolded plastic torsion plate that is substantially similar to torsion plate 142.

Figure 11:
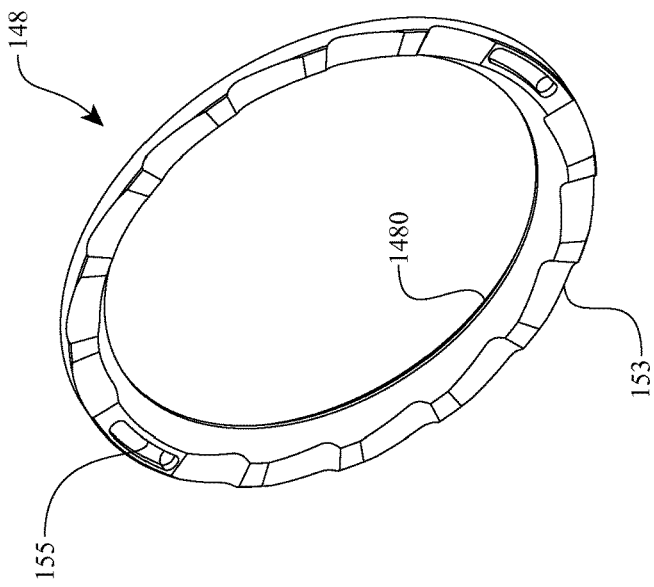
FIG. 11 is a perspective view of a traction ring that can be used in the input subassembly of FIG. 4.

Referring to FIG. 11, the traction ring 148 can be a generally annular ring having a number of ramps 153 formed on one side. The traction ring 148 can be provided with a traction contact surface 1480 on the inner circumference of the annular ring that is substantially opposite the side having ramps 153. The traction contact surface 1480 is configured to contact the planet subassembly 108. A number of preload spring grooves 155 can be formed on the annular ring. In one embodiment, the preload spring grooves 155 are formed on the side having the ramps 153. In the embodiment shown in FIGS. 2 and 3, the traction ring 145 is substantially similar to the traction ring 148.

Figure 12:
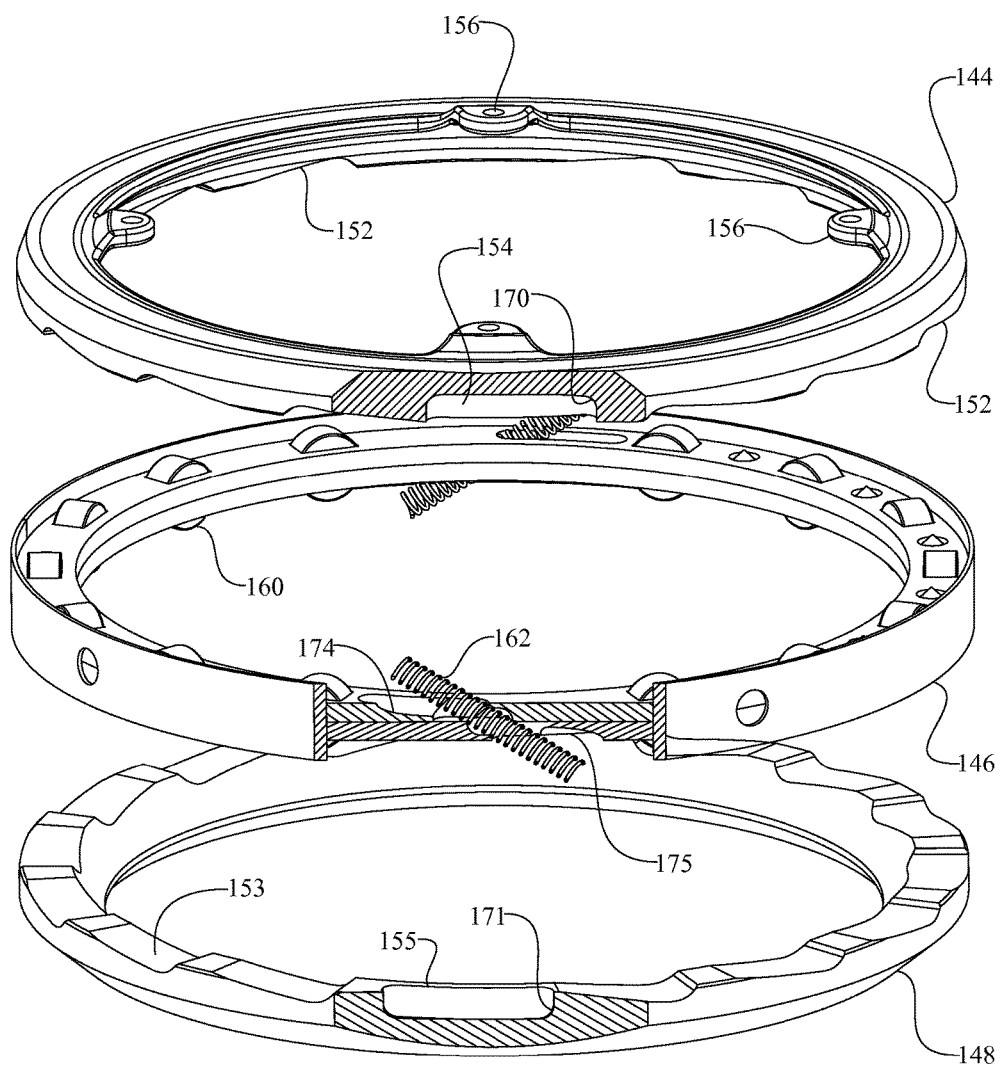
FIG. 12 is an exploded, perspective, cross-sectional view of certain components of the CVT of FIG. 2.
Figure 13:
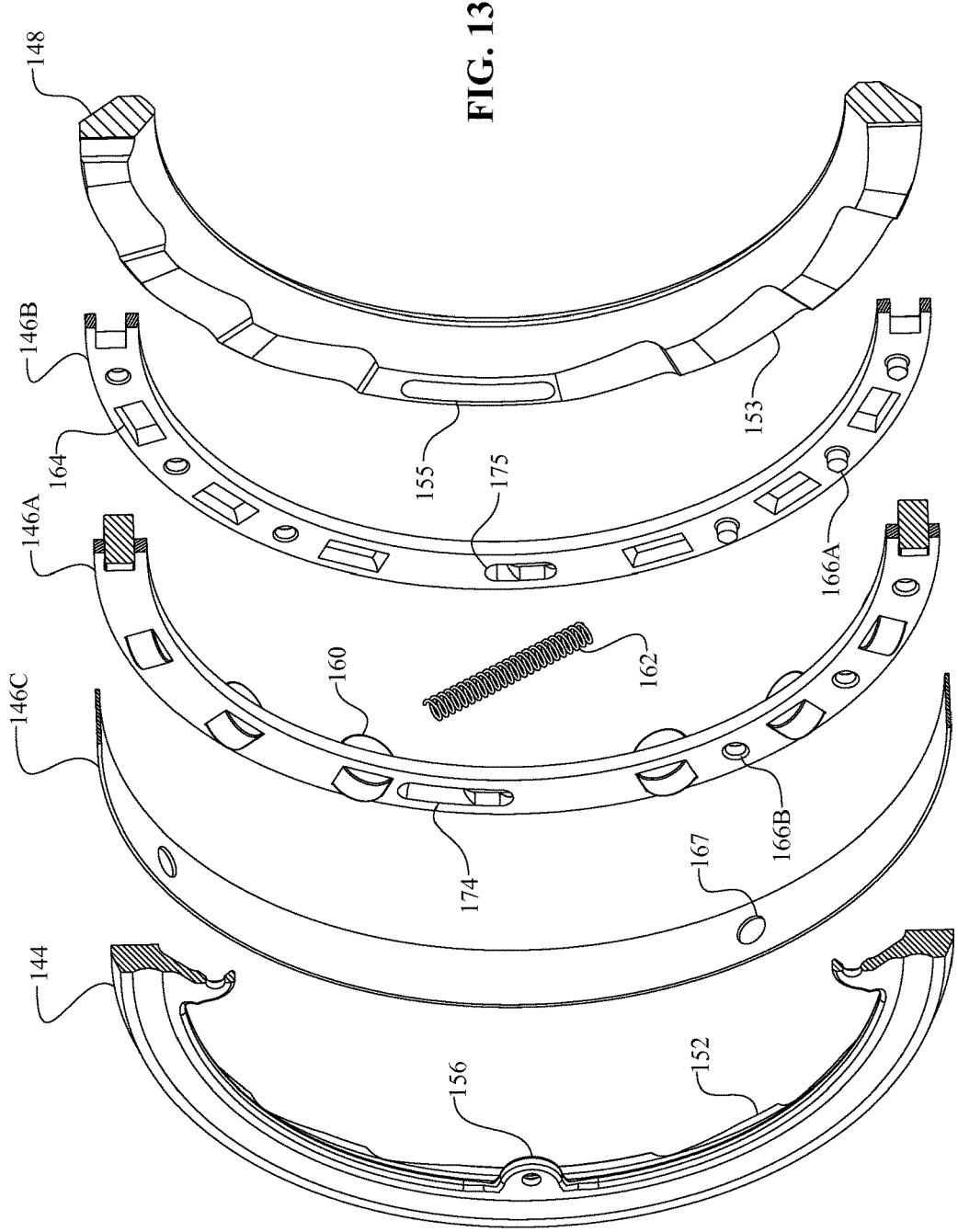
FIG. 13 is a second exploded, perspective, cross-sectional view of certain of the components of FIG. 12.
Figure 14:
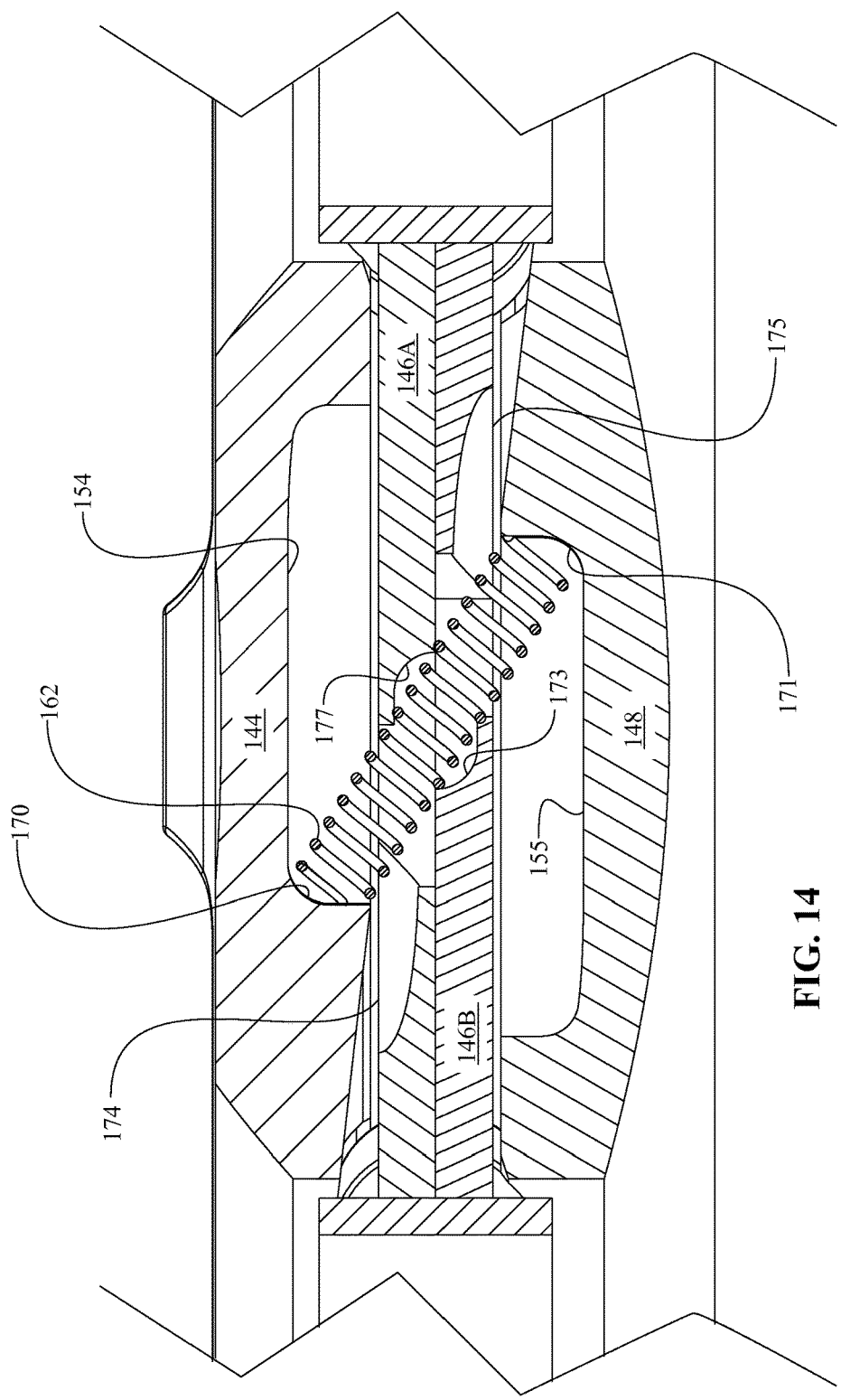
FIG. 14 is a partial cross-section view of the components shown in FIG. 12.

Referring now to FIGS. 12-14, in one embodiment, an axial force generator device includes, among other things, the load cam ring 144, the load cam roller retainer subassembly 146 and the traction ring 148. In one embodiment, the ramps 152 are arranged to contact a number of load cam rollers 160. The load cam rollers 160 are retained in the load cam roller retainer subassembly 146. A number of springs 162, for example two, can be retained in the load cam roller retainer subassembly 146 and can be arranged to simultaneously contact the load cam ring 144 and the traction ring 148. In the embodiment illustrated in FIG. 13, the load cam roller retainer subassembly 146 includes a first slotted ring 146A coupled to a second slotted ring 146B. In some embodiments, the first and second slotted rings 146A, 146B are received in a band 146C. The first slotted ring 146A and the second slotted ring 146B can be provided with slots 164. The slots 164 are configured to support the load cam rollers 160. The first slotted ring 146A and the second slotted ring 146B can be coupled together with, for example, a plurality of pegs 166A and bores 166B. In some embodiments, each of the slotted rings 146A and 146B have equally as many pegs 166A as bores 166B. The arrangement of the pegs 166A and the bores 166B around the face of the slotted rings 146A and 146B can be configured to accommodate various manufacturing methods, such as plastic injection molding. For example, the arrangement of the pegs 166A and the bores 166B can allow the slotted rings 146A and 146B to be substantially identical for manufacture while retaining features for alignment during assembly. In one embodiment, the pegs 166A are arranged around half the circumference of the slotted ring 146A while the bores 166B are arranged around the other half of the circumference. The arrangement of pegs 166A and 166B are substantially similar on slotted ring 146B, so that once assembled the slotted rings 146A and 146B are aligned when joined. In some embodiments, the slotted rings 146A and 146B are further retained around their outer circumference or periphery with the band 146C. The band 146C can be a generally annular ring made from, for example, steel or aluminum. An outer circumference of the band 146C can have a number of holes 167. The holes 167 are generally aligned with the slotted rings 146A and 146B. The holes 167 are configured to, among other things, axially retain and align the slotted rings 146A and 146B. In some embodiments, the slotted rings 146A and 146B can be coupled to the band 146C with standard fasteners (not shown) via fastening the holes 167. In other embodiments, the fastening holes 167 can receive mating features formed onto outer periphery of the slotted rings 146.

Still referring to FIGS. 12-14, a plurality of springs 162, for example two, are retained in load cam roller retainer subassembly 146 and are arranged in such a way that one end of the spring 162 couples to the load cam ring 144 and the other end of the spring 162 couples to the traction ring 148. The springs 162 can be generally arranged 180-degrees with respect to each other for configurations provided with two springs. In one embodiment, a middle portion of the spring 162 is retained in the load cam roller retainer subassembly 146. Shoulders 177 and 173 formed on the slotted rings 146A and 146B, respectively, can be provided to capture the middle portion of the spring 162. In some embodiments, the spring 162 can be a coil spring of the compression type. In other embodiments, the spring 162 can be a wire spring. In yet other embodiments, the spring 162 can be a flat spring. It is preferable that the ends of spring 162 have rounded or curved surfaces that have generally the same shape as reaction surfaces 170 and 171.

A preload spring groove 154 can be formed onto the load cam ring 144. Similarly, a groove 155 can be formed onto the traction ring 148. Once assembled, the preload spring grooves 154 and 155 aid to, among other things, retain the spring 162 and provide the reaction surfaces 170 and 171, respectively. Channels 174 and 175 can be formed into the slotted rings 146A and 146B to provide clearance for the spring 162.

Preferably, once assembled, the springs 162 are configured to apply a force on the load cam ring 144 and the traction ring 148 that engages the load cam rollers 160 with the load cam ring 144 and the traction ring 148. The load cam rollers 160 are positioned generally on the flat portion of the ramps 152 and 153. The interaction between the traction ring 148, the load cam ring 144, and the springs 162 causes the load cam rollers 160 to roll up the ramps 152 and 153 for some distance to produce a preload that ensures that a certain minimum level of clamping force will be available during operation of the CVT 100.

Passing now to FIGS. 15A-15B, a torsion plate 1420 can include a substantially disc-shaped body having a splined inner bore 1422 configured to couple to, for example, the torque driver 140. The torsion plate 1420 can be provided with a bearing support surface 1424 on the outer periphery of one side of the disc-shaped body, and the torsion plate 1420 can be provided with a set of engagement splines 1426 located on the outer periphery of a second side of the disc-shaped body. The engagement splines 1426 can be configured to engage a cam ring such as cam ring 144. In one embodiment, the torsion plate 1420 can include a number of structural ribs 1428 arranged on the disc-shaped body. The structural ribs 1428 can form a lattice or triangulated pattern that connects the outer periphery of the disc-shaped body to the splined inner bore 1422.

Figure 16A:
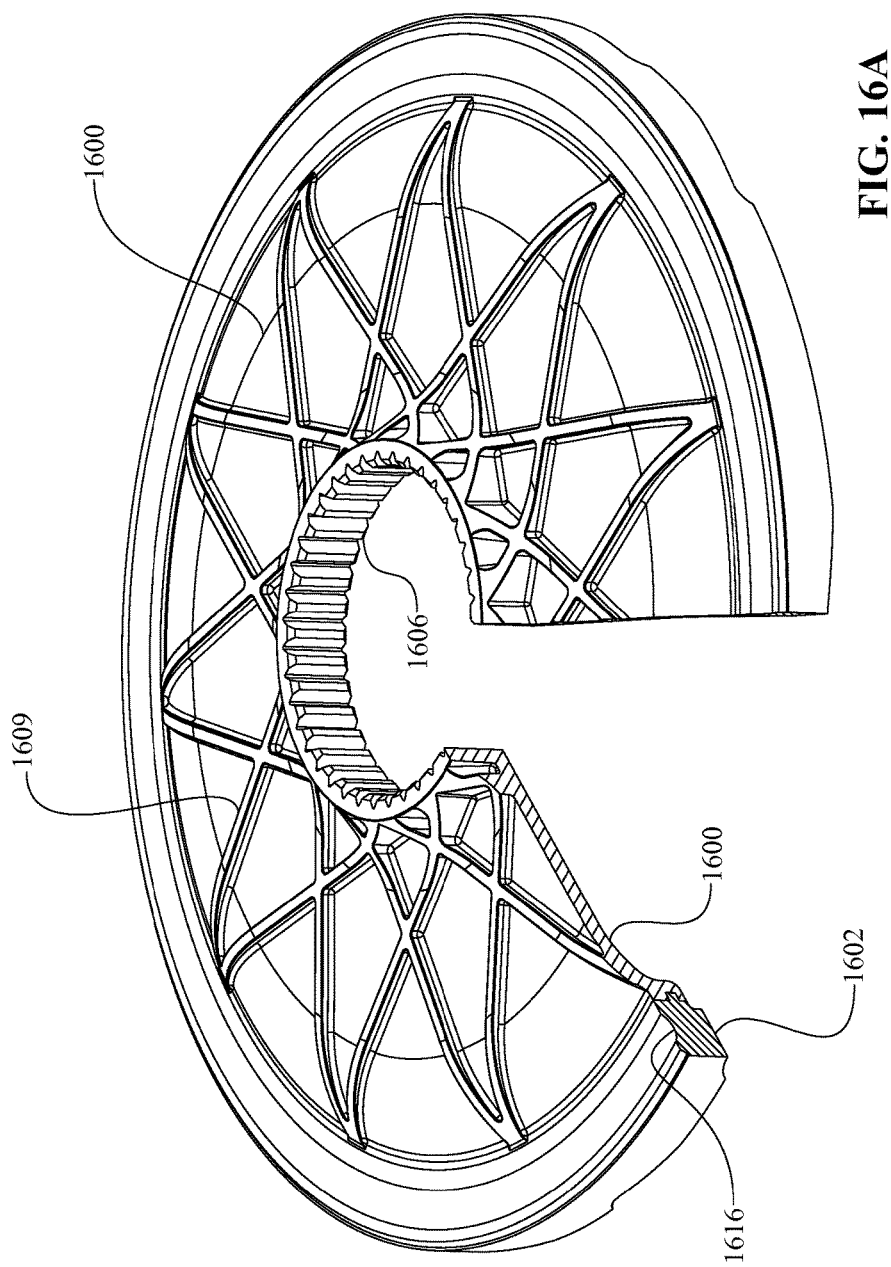
FIG. 16A is a cross-sectional perspective view of a torsion plate and traction ring that can be used with the CVT of FIG. 2.
Figure 16B:
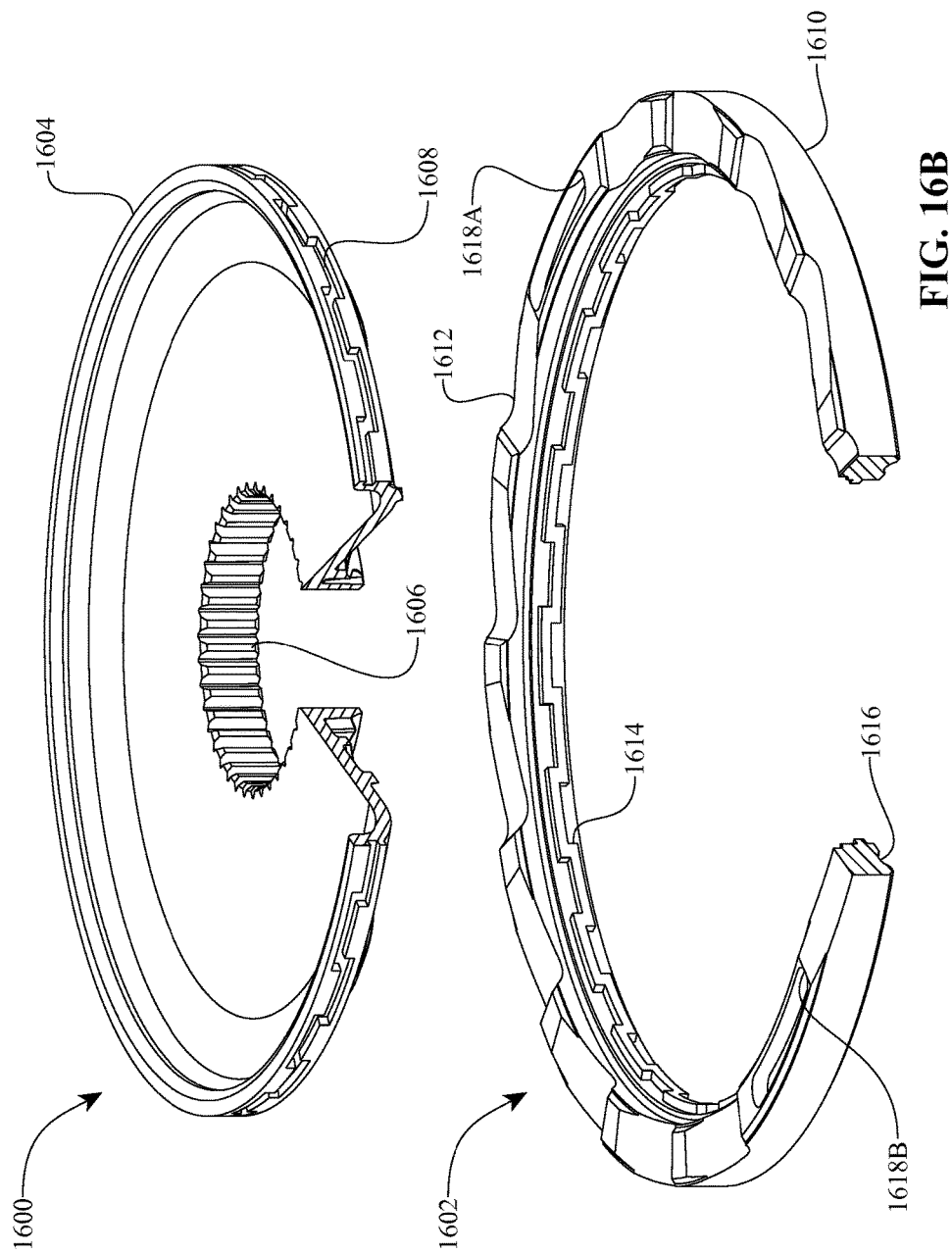
FIG. 16B is an exploded cross-sectional perspective view of the torsion plate and traction ring of FIG. 16A.

Referring to FIGS. 16A and 16B, a torsion plate 1600 can couple to a load cam ring 1602. The load cam ring 1602 and the torsion plate 1600 can generally be used in CVT 100 in a similar manner as the load cam ring 144 and the torsion plate 142. In one embodiment, the torsion plate 1600 can be a generally disc shaped body 1604 having a splined central bore 1606. The splined central bore 1606 can be configured to mate with the splines 130 of the torque driver 140, for example. An outer periphery of the disc shaped body 1604 can be provided with a number of splines 1608. In some embodiments, the torsion plate 1600 can include a number of structural ribs 1609 formed on a first side of the disc shaped body 1604. The structural ribs 1609 can extend radially outward from the splined central bore 1606 and can be configured in a substantially triangulated pattern, such as the pattern shown in FIG. 16A. Configuring the structural ribs 1609 in this way can, among other things, improve the torsional strength and stiffness to the torsion plate 1600.

The load cam ring 1602 can include a substantially annular ring 1610 having a number of ramps 1612 formed on a first face. The ramps 1612 can be substantially similar to the ramps 152. The inner circumference of the annular ring 1610 can be provided with a number of splines 1614 that can be adapted to mate with the splines 1608. In one embodiment, the torsion plate 1600 can be made of a plastic material that is formed over the load cam ring 1602. The splines 1608 and 1614 can be configured to rigidly couple the torsion plate 1600 to the traction ring 1602. In one embodiment, the annular ring 1610 can be provided with a bearing support surface 1616 that can be substantially similar to the bearing support surface 158. In some embodiments, the annular ring 1610 can include a number of preload spring grooves 1618 that are substantially similar to the preload spring grooves 155.

Figure 17:
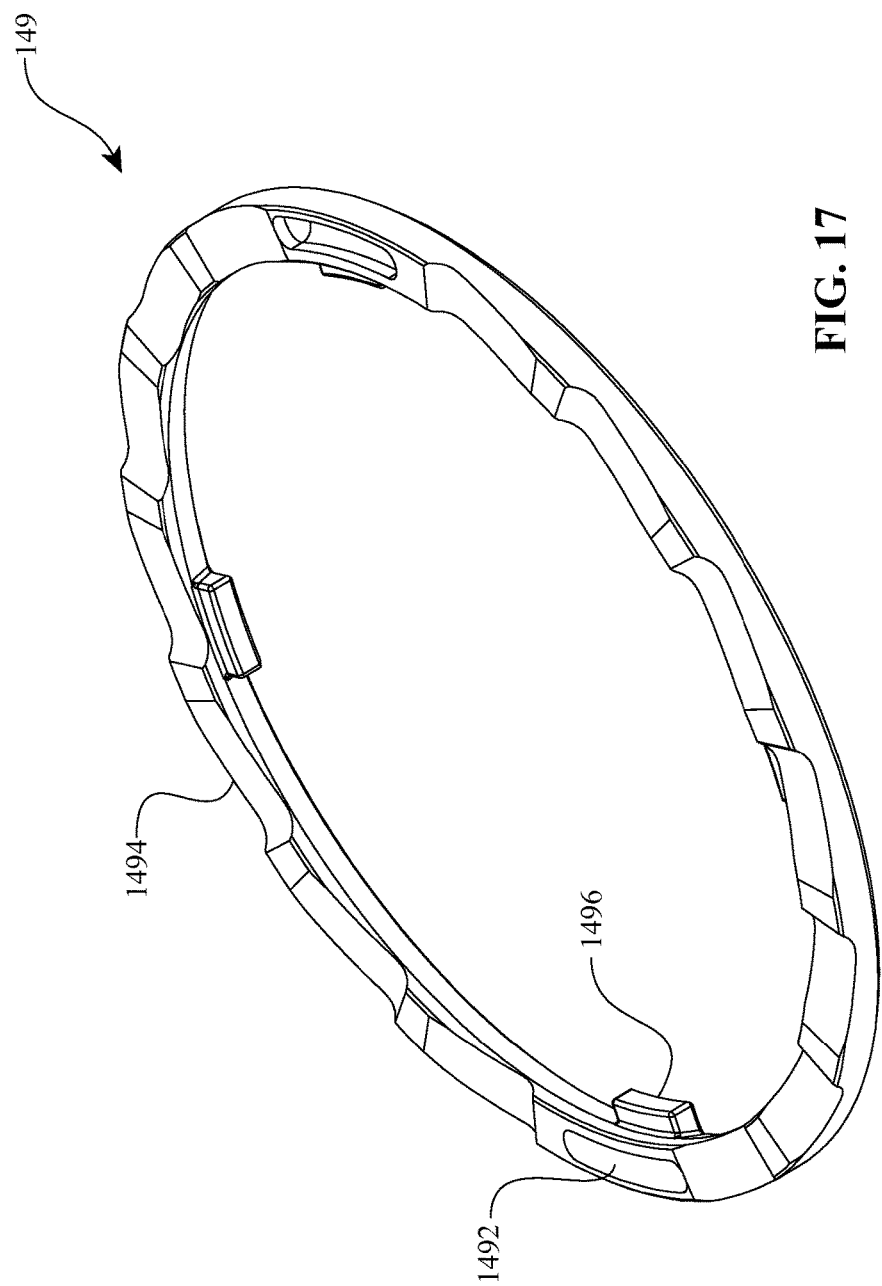
FIG. 17 is a perspective view of one embodiment of an output load cam that can be used with the CVT of FIG. 2.

Turning to FIG. 17, in one embodiment the output cam ring 149 can be a generally annular ring, substantially similar to the load cam ring 144. The output cam ring 149 can include a number of preload spring slots 1492 arranged substantially similar to the preload spring slots 154. The output cam ring 149 can also be provided with ramps 1494 that are substantially similar to ramps 152, and are configured to engage the load cam rollers 160. In one embodiment, the output cam ring 149 includes lugs 1496 arranged on the inner circumference of the annular ring. The lugs 1496 are preferably adapted to couple to a mating feature on the hub shell 102.

Figure 18:
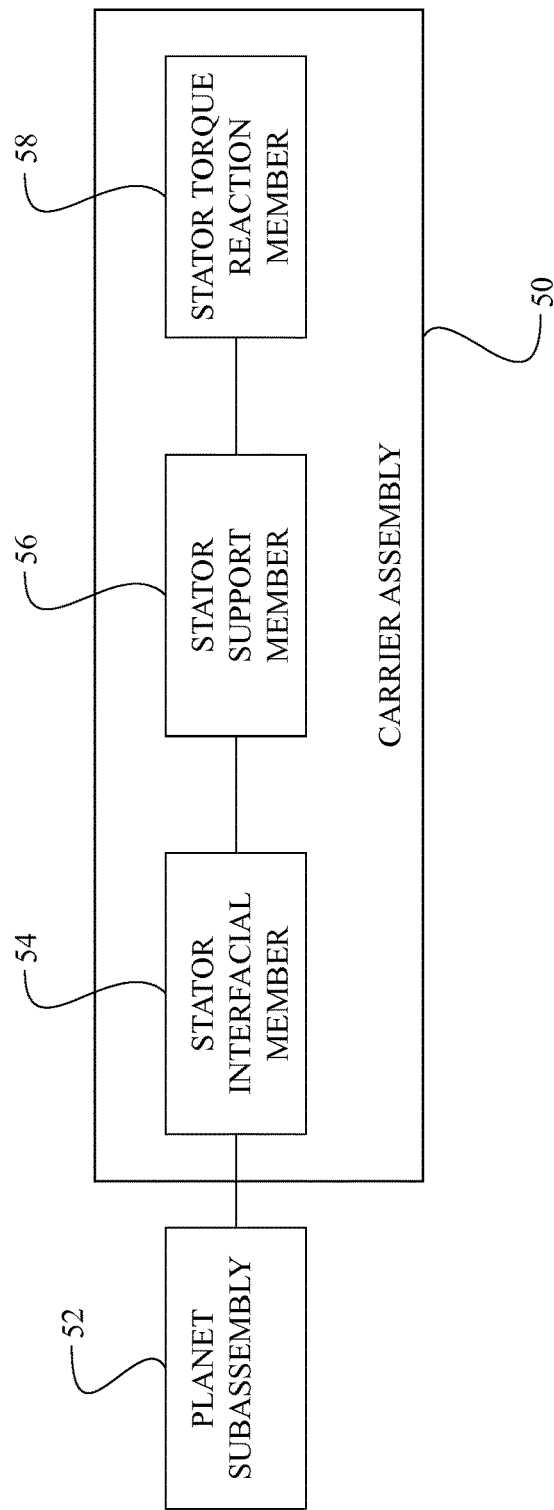
FIG. 18 is a block diagram showing one embodiment of a carrier assembly that can be used with the CVT of FIG. 2.

Referring now to the functional block diagram of FIG. 18, in one embodiment a carrier assembly 50 can be configured to couple to, and/or to support, a planet subassembly 52. The carrier assembly 50 can be functionally similar in some respects to the carrier assembly 101. The planet subassembly 52 can be functionally similar in some respects to the planet subassembly 108. The carrier assembly 50 includes a stator interfacial member 54 coupled to the stator support member 56. In one embodiment, the stator support member 56 is further coupled to a stator torque reaction member 58. The stator interfacial member 54 can be configured to provide a sliding interface between certain components of the planet subassembly 52 and the stator support member 56. In one embodiment, the stator interfacial member 54 is a component that attaches to the stator support member 56. In some embodiments, the stator interfacial member 54 is integral with the stator support member 56. In yet other embodiments, the stator interfacial member 54 is integral with the planet subassembly 52. The stator interfacial member 54 is preferably a low-friction interface and made from materials such as plastic, bronze, or polished metals.

The stator support member 56 can be configured to provide structural support for the carrier assembly 50, and the stator support member 56 can be adapted to react forces generated during operation of the CVT 100. The stator support member 56 positions and supports the planet subassembly 52. The stator torque reaction member 58 can be provided to transfer torque from the stator support member 56 to another component in, for example, the CVT 100 during operation of the CVT 100. In one embodiment, the stator torque reaction member 58 is a component that can be coupled to the stator support member 56 so that the stator torque reaction member 58 can be made from a different material than the stator support member 56. For example, the stator torque reaction member 58 can be made of steel and the stator support member 56 can be made of aluminum. It should be noted that the reference to steel and aluminum are exemplary only; in other embodiments, other materials can be used (such as, for example, plastics, alloys, ceramics, composites, etc.). In some embodiments, the stator torque reaction member 58 is integral with the stator support member 56. In yet other embodiments, the stator interfacial member 54, the stator support member 56, and the stator torque reaction member 58 can be one integral component.

Figure 19:
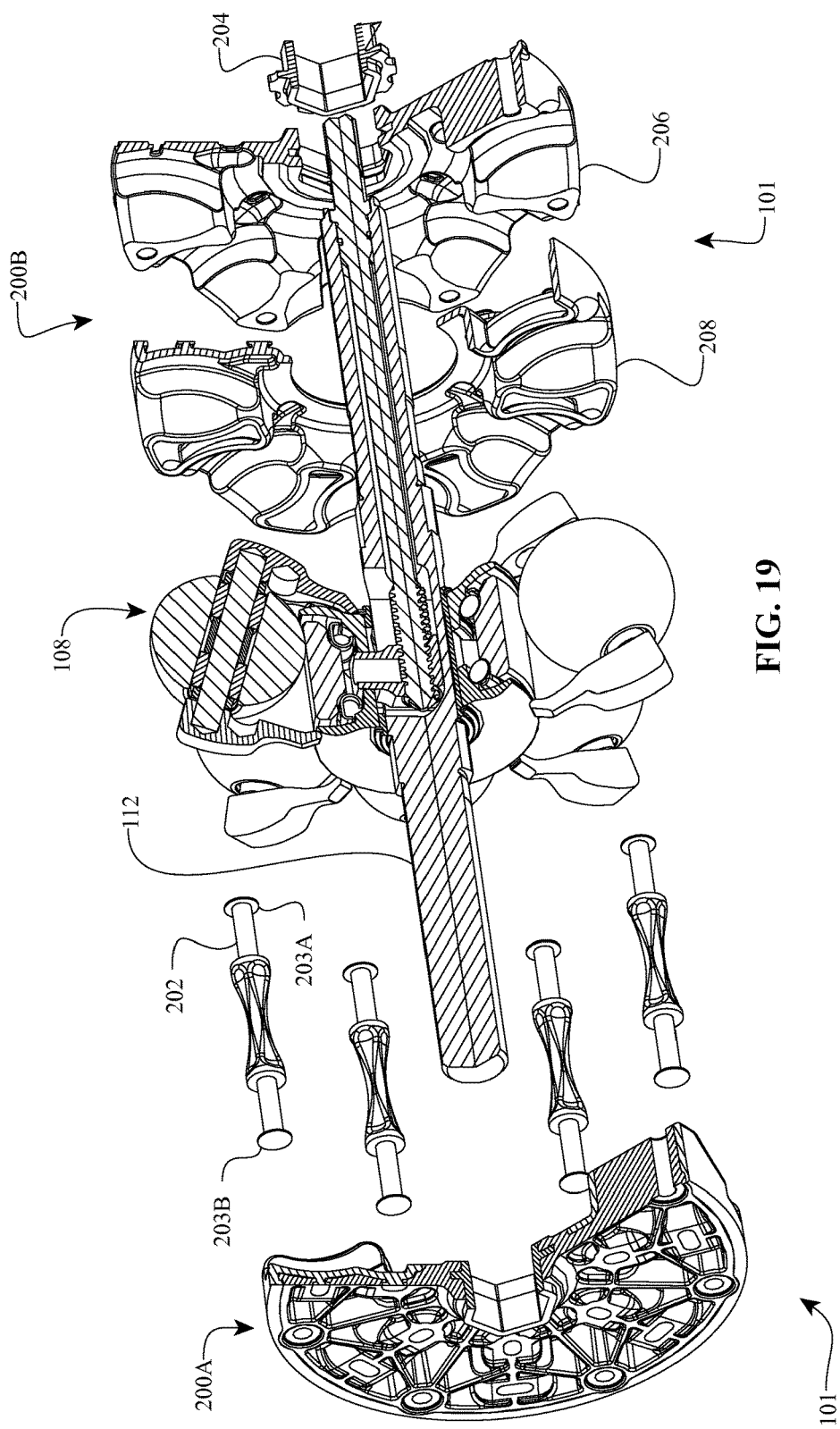
FIG. 19 is an exploded, partially-cross-sectioned, perspective view of the CVT of FIG. 2 employing an embodiment of a carrier assembly.
Figure 20:
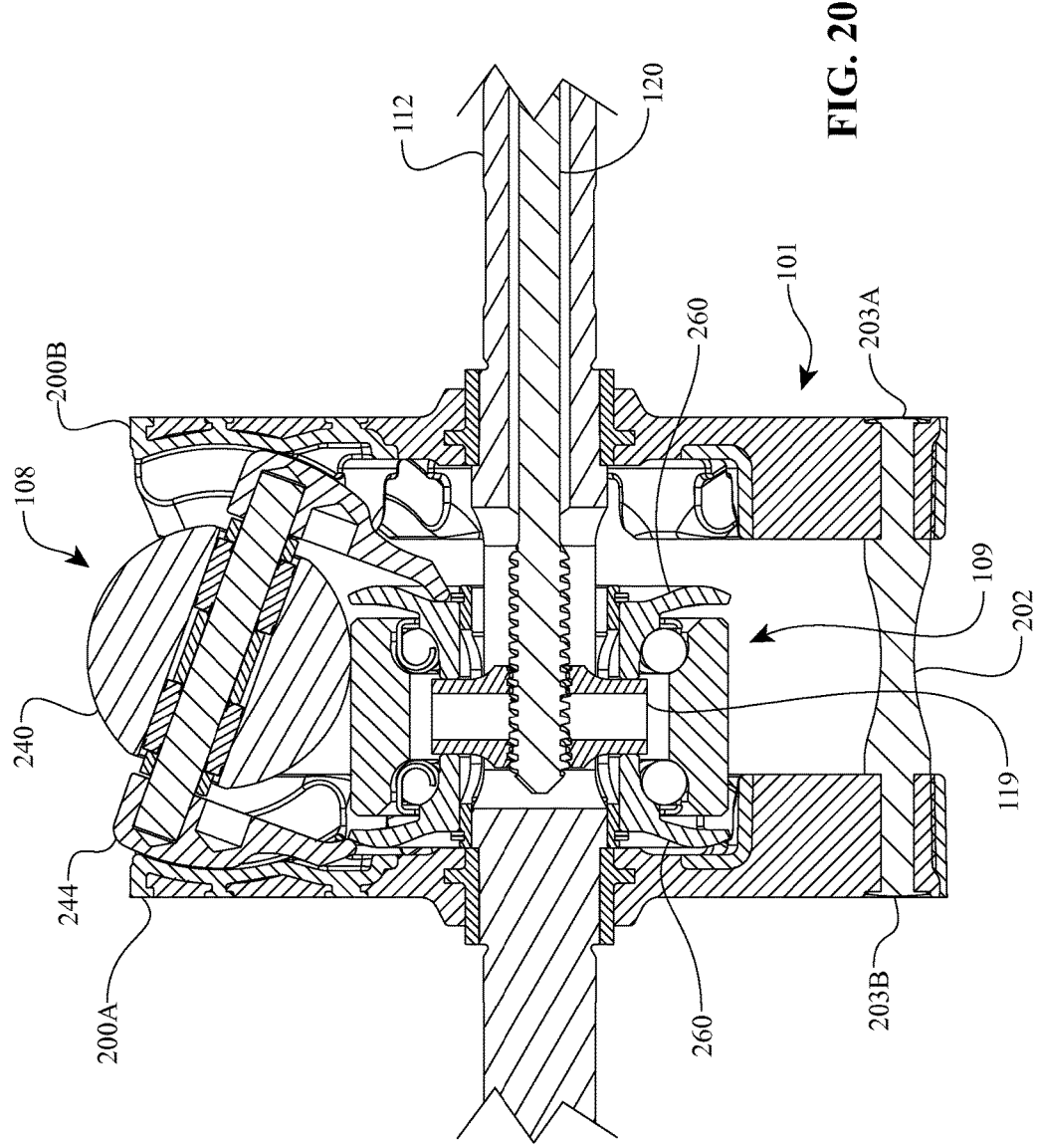
FIG. 20 is a cross-sectional view of the carrier assembly of FIG. 20.
Figure 21:
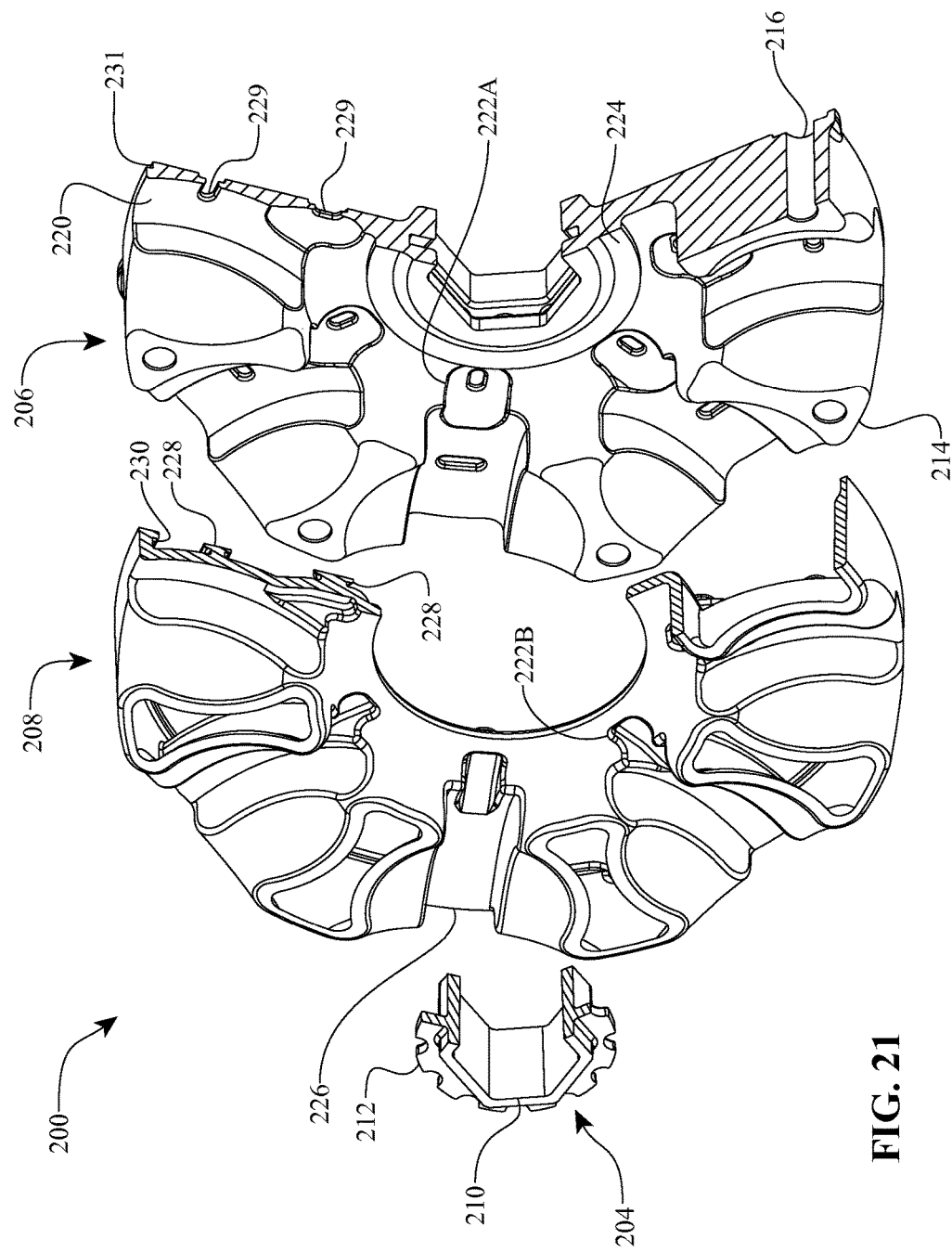
FIG. 21 is an exploded, partially cross-sectioned, perspective view of one embodiment of a stator subassembly that can be used with the carrier assembly of FIG. 20.
Figure 27:
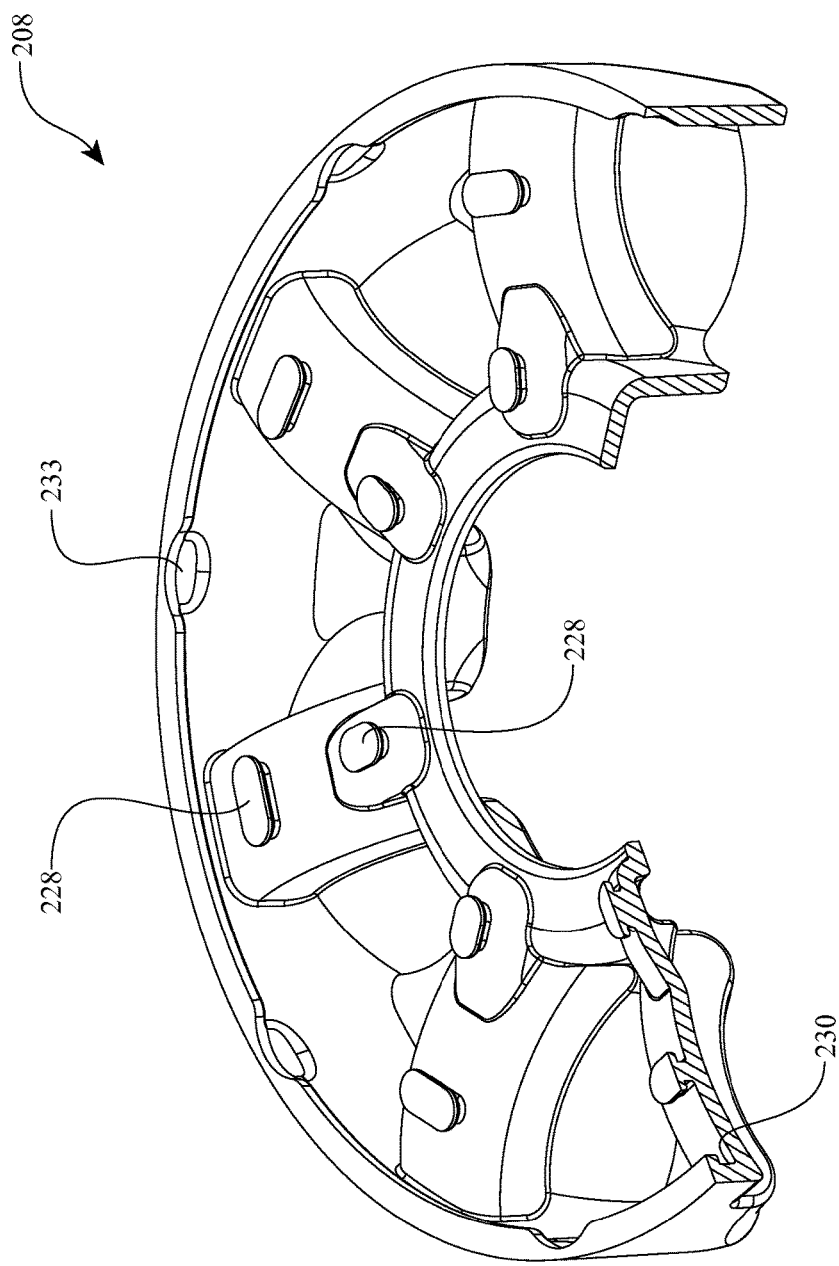
FIG. 27 is a partially cross-sectioned, perspective view of a stator interfacial member that can be used with the stator subassembly of FIG. 21.

Turning now to FIGS. 19 and 20, the carrier assembly 101 can include a first stator subassembly 200A coupled with a number of stator spacers 202 to a second stator subassembly 200B. The stator spacers 202 can be arranged angularly around the perimeter of the stator subassemblies 200. In one embodiment, the stator spacers 202 can be attached to the stator subassemblies 200 with common fasteners. In the embodiment shown in FIG. 20, the stator spacers 202 are orbit formed on stator spacer ends 203 for coupling the stator spacers 202 and the stator subassemblies 200. The carrier assembly 101 supports and facilitates a tilting of the rotational axis of balls 240 of the planet subassemblies 108. In some embodiments, the carrier assembly 101 is configured to couple to the main axle 112. In one embodiment, for example, the carrier assembly 101 is rigidly and non-rotatably coupled to the main axle 112.

Referring to FIGS. 21-27, the stator subassembly 200 can include a stator torque reaction insert 204, a stator support member 206, and a stator interfacial member 208. In one embodiment, the stator torque reaction insert 204 can be rigidly attached to the stator support member 206, and the stator interfacial member 208 can be attached to the stator support member 206.

The stator torque reaction insert 204 facilitates the coupling of the carrier assembly 101 to the main axle 112. In one embodiment, the stator torque reaction insert 204 includes a number of torque reaction shoulders 210 that are adapted to engage mating surfaces on the main axle 112. The stator torque reaction insert 204 prevents, among other things, rotation of the stator subassembly 200 with respect to the main axle 112. In one embodiment, the stator torque reaction insert 204 has six torque reaction shoulders 210 that form a hexagonal body. A number of locking splines 212 can be provided on the periphery of the hexagonal body. The locking splines 212 can facilitate the rigid attachment of the stator torque reaction insert 204 to the stator support member 206.

In one embodiment, the stator support member 206 includes a substantially disc-shaped body having an inner bore adapted to couple to the stator torque reaction insert 204. In some embodiments, the stator support member 206 has an inner bore having a hexagonal shape. The stator support member 206 can be provided with a number of spacer support extensions 214 arranged angularly on a first face of the disc-shaped body about the longitudinal axis of the CVT 100. The stator support extensions 214 are preferably positioned angularly about the longitudinal axis of the CVT 100 and, for example, can be placed angularly between the planet subassemblies 108 in the CVT 100. In one embodiment, each of the spacer support extensions 214 includes a stator spacer support hole 216. In some embodiments, the stator spacer support holes 216 are arranged on a radially outward periphery of the stator support extensions 214. In one embodiment, each of the stator spacer support holes 216 can be provided with a stator spacer end relief 217 (see FIG. 25, for example). The stator spacer end relief 217 substantially surrounds the stator spacer support hole 216. Once assembled, the stator spacer end 203 is substantially enclosed in the stator spacer end relief 217. The arrangement of stator spacers 200 on the outward periphery of the stator support extensions 214 maximizes torsional stiffness of the carrier assembly 101. The stator support member 206 can be provided with a number of structural ribs 218 arranged on a face of the disc-shaped body. The structural ribs 218 provide strength and stiffness to the disc-shaped body. The stator support member 206 provides structural support to the carrier assembly 101 for reacting forces generated during the operation of, for example, the CVT 100.

Referring to FIGS. 21-27, the stator support member 206 can be further provided with a number of guide support slots 220. The guide support slots 220 are substantially arranged between the spacer support extensions 214 around the disc-shaped body and extend radially outward from the inner bore. The number of guide support slots 220 provided on the stator support member 206 generally, though not necessarily, corresponds to the number of planet subassemblies provided in the CVT 100. Each of the guide support slots 220 can be provided with a leg clearance relief 222A positioned on a radially inward portion of the guide support slot 220. The leg clearance reliefs 222A provide clearance for certain components of the planet subassembly 108 during operation of the CVT 100. In some embodiments, the stator support member 206 can include a piloting shoulder 224 located radially inward of the guide support slots 220 and spacer support extensions 214. The piloting shoulder 224 facilitates alignment of the stator support member 206 to the stator interfacial member 208. In some embodiments, the stator support member 206 can have a uniform material thickness throughout the component, which aides manufacturing processes such as casting or forging.

In one embodiment, the stator interfacial member 208 is a substantially disc-shaped body having an inner bore. The stator interfacial member 208 can be provided with a number of sliding guide slots 226 arranged angularly about a longitudinal axis of the disc-shaped body. The disc-shaped body can include a number of interlocking tabs 228 formed on one side. The interlocking tabs 228 are configured to mate with a number of interlocking holes 229 on the stator support member 206. In some embodiments, a number of leg clearance reliefs 222B are formed toward the inner periphery of the guide slots 226. The stator interfacial member 208 can be provided with a capture ring 230 formed on the outer periphery of the disc-shaped body. The capture ring 230 is preferably formed on the side of the disc-shaped body with the interlocking tabs 228. The capture ring 230 can couple to a capture shoulder 231 formed on the stator support member 206. The interlocking tabs 228 and capture ring 230 facilitate a rigid coupling between the stator interfacial member 208 and the stator support member 206. A number of capture extensions 232 (see FIG. 26) can be provided on the outer periphery of the stator support member 206. The capture extensions 232 are generally concentric with the capture shoulder 231 and are configured to couple to capture cavities 233 (FIG. 27) of the stator interfacial member 208. In one embodiment, the stator interfacial member 208 can be a plastic component, and can be pressed onto the stator support member 206 so that the capture ring 230 and the interlocking tabs 228 engage the corresponding mating capture shoulder 231 and the interlocking holes 229. In some embodiments, the stator interfacial member 208 can be plastic injection molded onto the stator support member 206. The stator interfacial member 208 facilitates a low friction, sliding coupling between the carrier assembly 101 and the planet subassemblies 108.

Figures 28, 29:
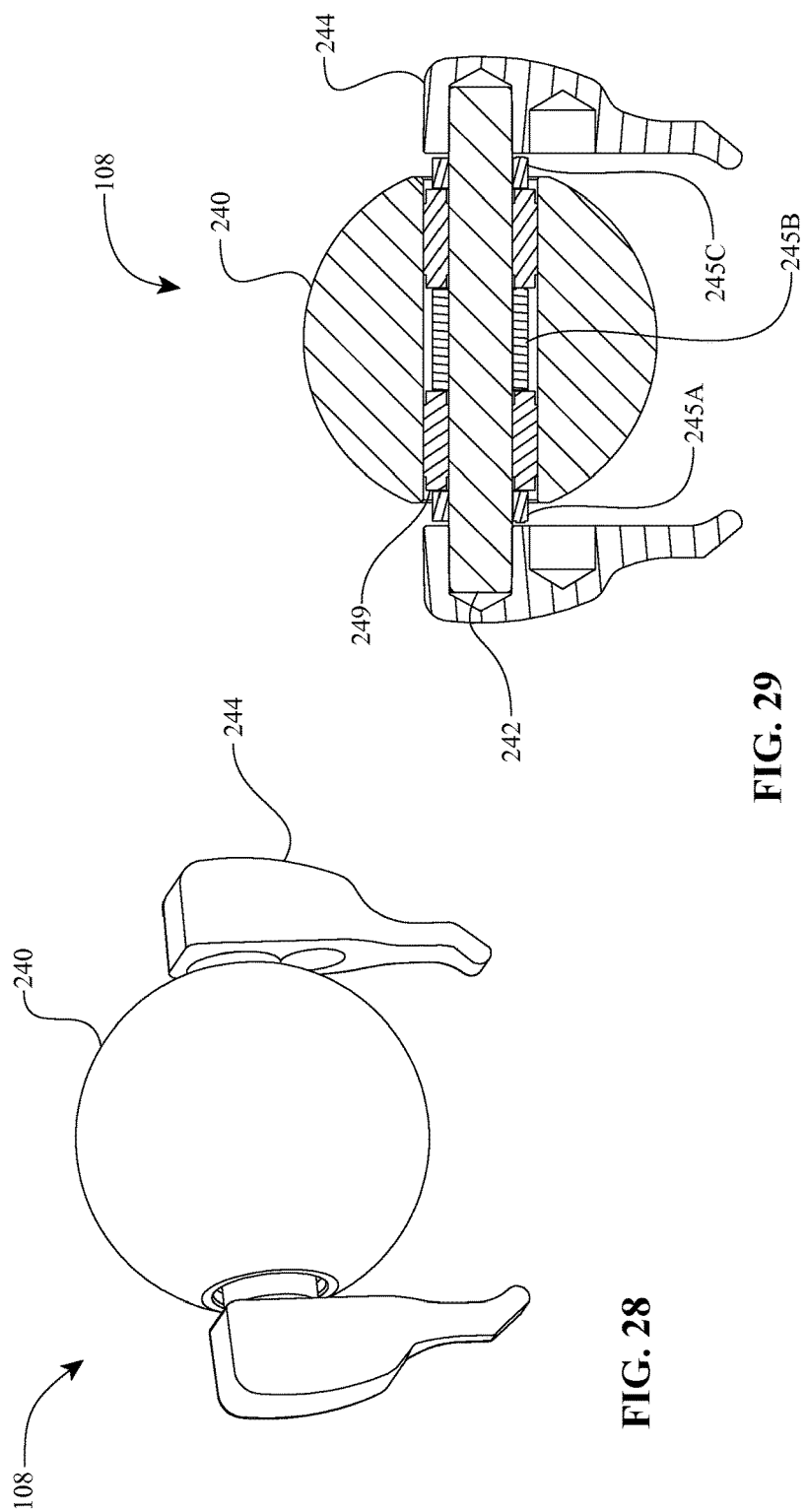
FIG. 28 is a perspective view of one embodiment of a planet subassembly that can be used in the CVT of FIG. 2.
FIG. 29 is a cross-sectional view of the planet subassembly of FIG. 28.

Turning now to FIGS. 28-29, the planet subassembly 108 can include a substantially spherical ball 240, a ball axle 242, and at least one leg 244. The ball 240 can be provided with a central bore. The ball 240 is supported on the ball axle 242 with ball support bearings 249 arranged in the central bore and positioned with spacers 245A, 245B, and 245C. In other embodiments, the spacers 245A, 245B, and 245C can be integral with the ball support bearings 249. The ball axle 242 can be supported on one end with one leg 244 and on a second end with another leg 244. In some embodiments, the leg 244 can be pressed onto the ball axle 242 so that there is no relative motion between the leg 244 and the ball axle 242 during operation of the CVT 100. The legs 244 can be configured to act as levers to pivot the ball axle 242 about the center of the ball 240.

Figure 31:
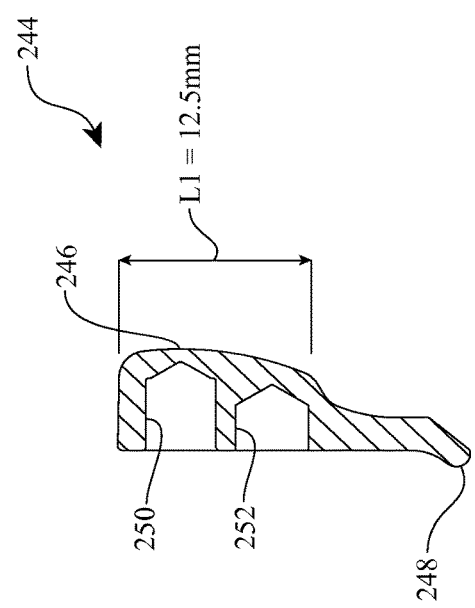
FIG. 31 is a cross-sectional view of the leg of FIG. 30.
Figure 32:
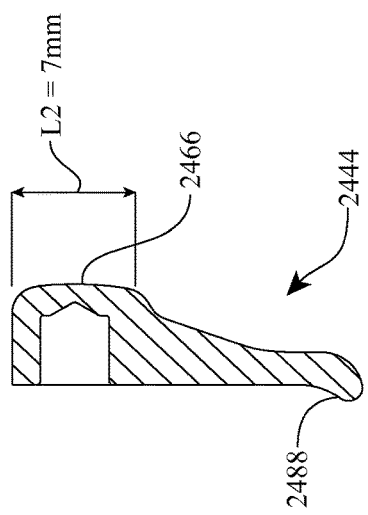
FIG. 32 is a cross-sectional view of one embodiment of a leg that can be used with the planet subassembly of FIG. 28.
Figure 30:
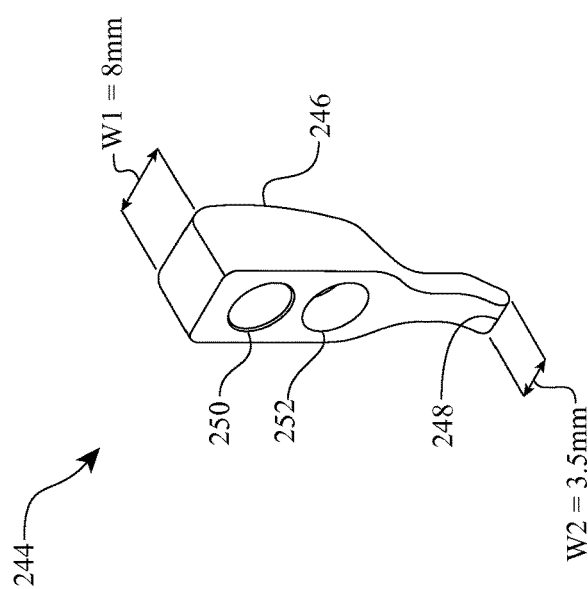
FIG. 30 is a perspective view of one embodiment of a leg that can be used with the planet subassembly of FIG. 28.

Referring to FIGS. 30-32, in one embodiment the leg 244 includes a sliding interface 246 and a shift cam guide end 248. The leg 244 can be provided with a ball axle support bore 250. In some embodiments, the leg 244 can include a hole 252. The hole 252 can serve to, among other things, reduce the weight of the leg 244. In one embodiment, the sliding interface 246 can have a length L1 of about 12.5 mm and a width W1 of about 8 mm. In some embodiments, a leg 2444 can be substantially similar in function to the leg 244. The leg 2444 can be provided with a sliding interface 2466 that can be of a length L2 that can be about 7 mm, for example. The shift cam guide end 2488 can have a width w2, which is generally about 3.5 mm. The shift cam guide ends 248 and 2488 are preferably adapted to slide on the shift cams 260 (see FIG. 20, for example). The sliding interfaces 246 and 2466 are preferably adapted to slide in the carrier assembly 101. In some embodiments, the sliding interfaces 246 and 2466 have curved profiles as shown in the plane of the page of FIG. 31 or FIG. 32. Each of the curved profiles of the sliding interfaces 246 and 2466 are typically conformal to a mating surface of the carrier assembly 101. The legs 244 or 2444 are preferably adapted to transfer forces from the planet subassembly 108 to the carrier assembly 101.

Figure 33:
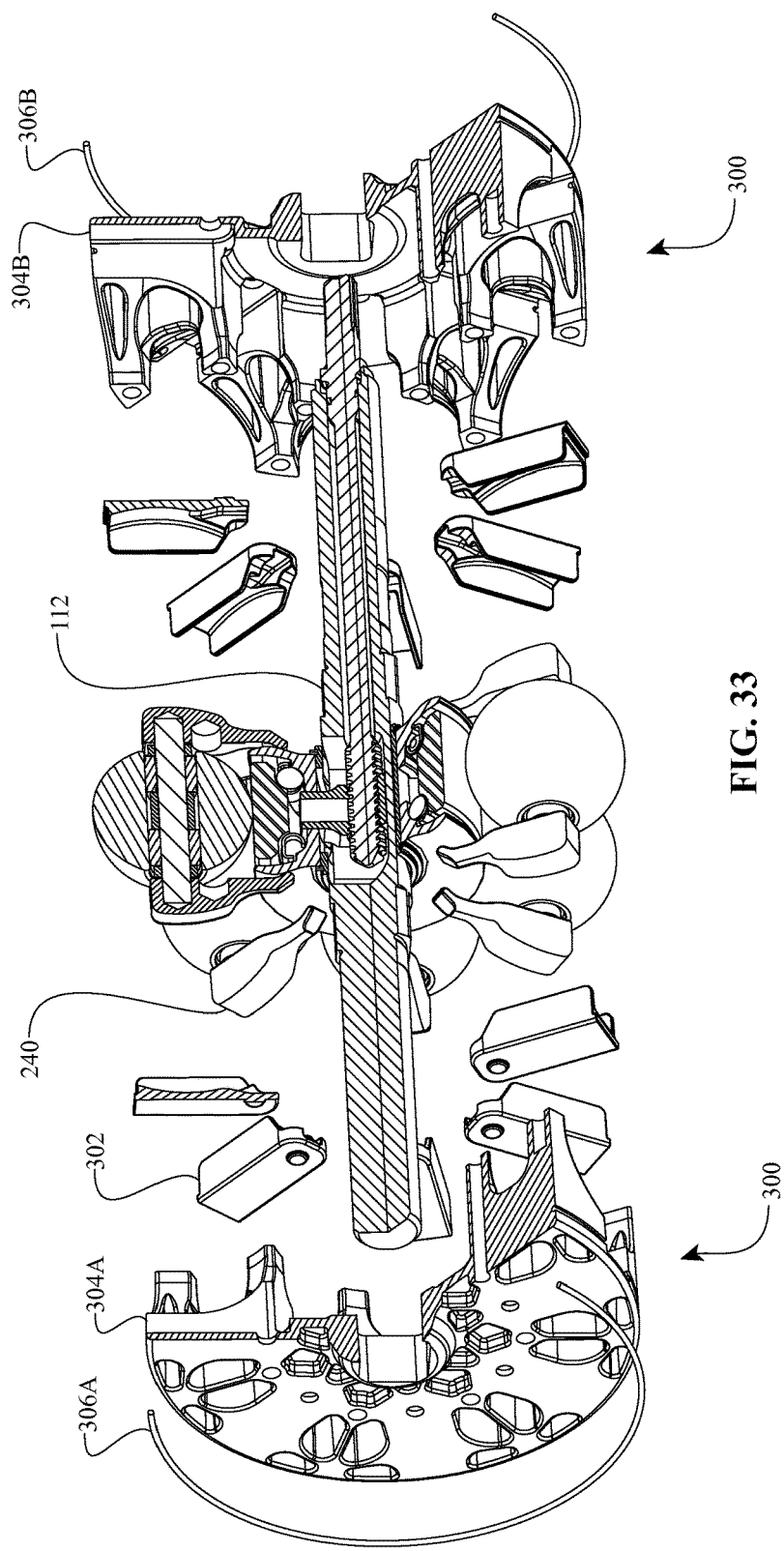
FIG. 33 is an exploded, partially cross-sectioned, perspective view of an embodiment of a carrier assembly that can be used with the CVT of FIG. 2.
Figure 34:
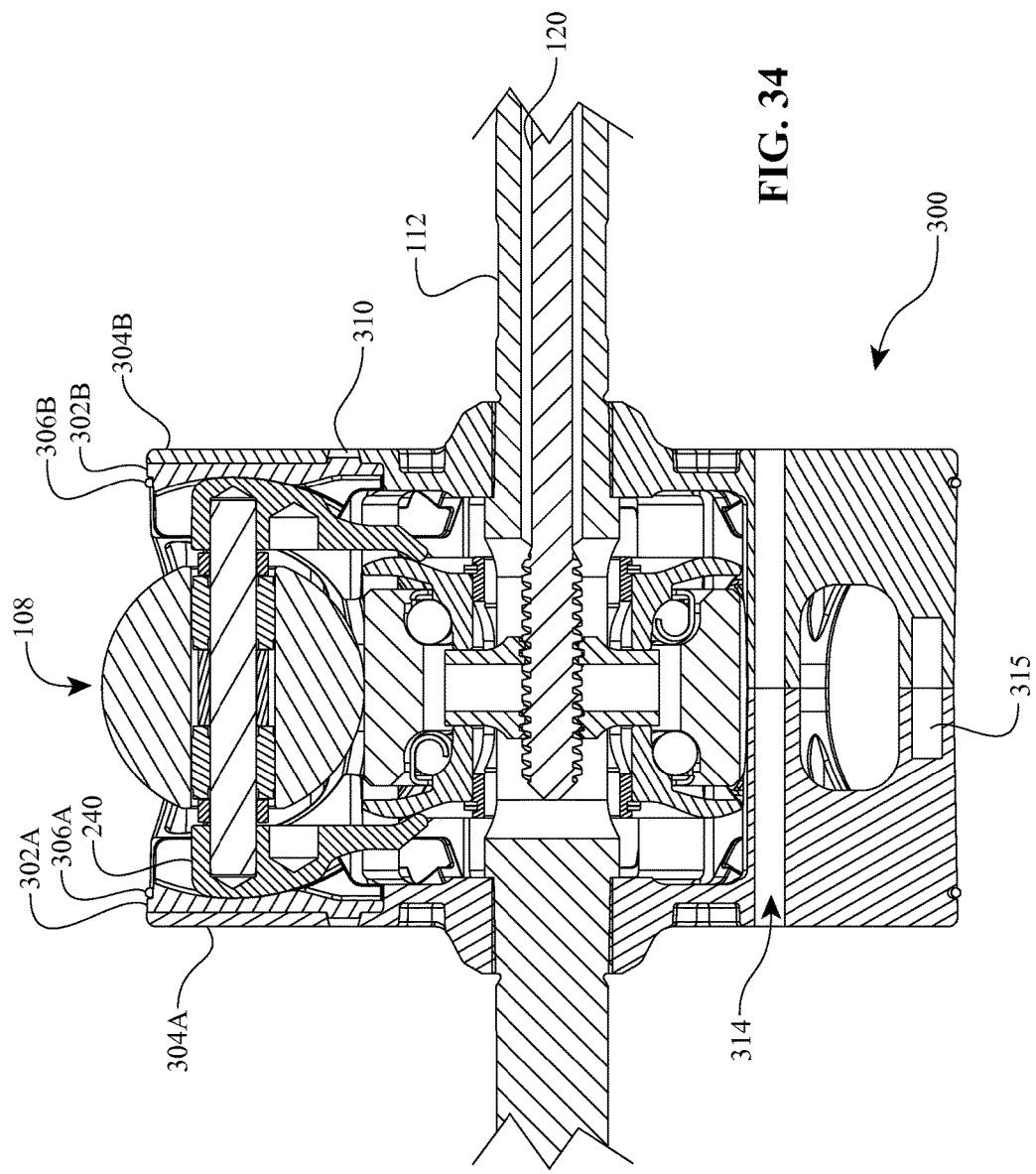
FIG. 34 is a cross-sectional view of the carrier assembly of FIG. 33.
Figures 35, 36:
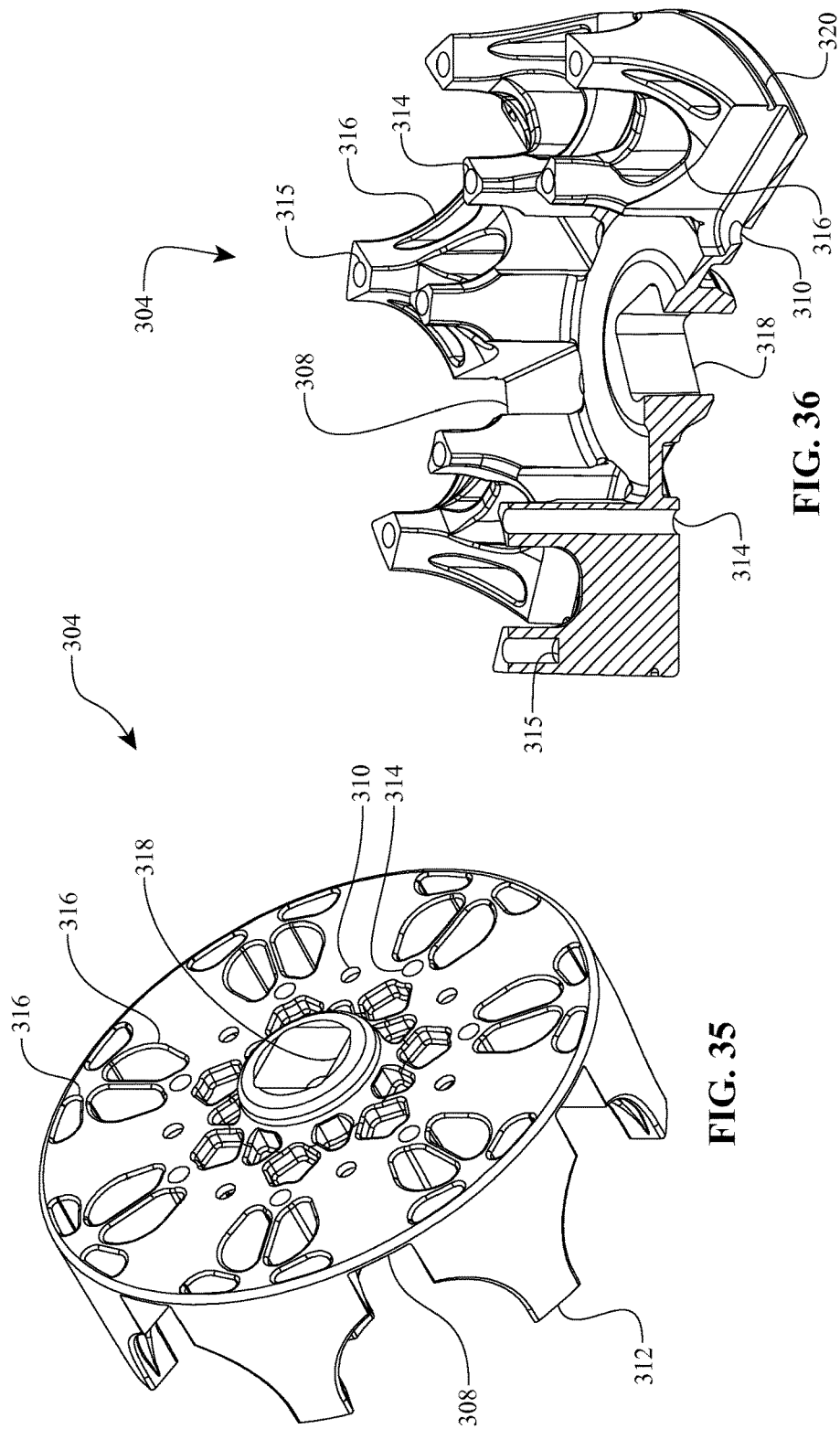
FIG. 35 is a perspective view of one embodiment of a stator support member that can be used with the carrier assembly of FIG. 33.
FIG. 36 is a partially cross-sectioned, perspective view of the stator support member of FIG. 35.

Passing now to FIGS. 33-34, an alternative carrier assembly 300 includes a number of stator interfacial inserts 302 supported in a stator support member 304. The stator interfacial inserts 302 are slidingly coupled to legs 240 of the planet subassemblies 108. The carrier assembly 300 includes a retaining ring 306 configured to couple the stator interfacial inserts 302 to the stator support member 304. In one embodiment, the carrier assembly 300 includes two stator support members 304 rigidly coupled together. Preferably, each leg 240 of the planet subassemblies 108 is provided with a corresponding stator interfacial insert 302. It should be readily apparent to a person having ordinary skill in the relevant technology that the carrier assembly 300 is substantially similar in function to the carrier assembly 101.

Referring to FIGS. 35-38, the stator support member 304 can be a generally cylindrical body having a central bore. The stator support member 304 can include a number of insert support slots 308. The insert support slots 308 can be arranged angularly about, and extend radially from, the central bore of the cylindrical body. Preferably, though not necessarily, the stator support member 304 has at least one insert support slot 308 for each stator interfacial insert 302. Each of the insert support slots 308 can have a tab engagement hole 310 formed on a radially inward portion of the insert support slot 308. The tab engagement hole 310 can be configured to couple to a mating feature on the stator interfacial insert 302. The stator support member 304 can be provided with a number of support extensions 312. Each of the stator support extensions 312 includes a fastening hole 314 and a dowel pin hole 315; each hole is configured to receive a fastener and a dowel pin, respectively. In one embodiment, the fastening hole 314 is arranged radially inward of the dowel pin hole 315. The stator support member 304 can be provided with a number of cutouts 316 formed on one end of the cylindrical body. Preferably, the cutouts 316 reduce the weight of the stator support member 304 while retaining the strength and stiffness of the component. In one embodiment, the stator support member 304 can have a number of torque reaction shoulders 318 formed on the inner bore. The torque reaction shoulders 318 can be adapted to mate with corresponding shoulders on the main axle 112. In some embodiments, the torque reaction shoulders 318 form a square bore. In one embodiment, the stator support member 304 is provided with a retaining ring groove 320 that is configured to couple to the retaining ring 306.

Turning now to FIGS. 39-42, the stator interfacial insert 302 can be a generally rectangular body having a back 322 with at least two side extensions 324 attached to the back 322. A stator interlock tab 326 can be formed on the back 322. In one embodiment, the stator interlock tab 326 can be substantially circular and extend from the back 322. The stator interlock tab 326 can be configured to couple to the tab engagement hole 310 on the stator support member 304. In one embodiment, the stator interfacial insert 302 includes a retaining shoulder 328 formed on an end of the back 322 at a distal location from the stator interlock tab 326. The retaining shoulder 328 is configured to couple to the retaining ring 306. In other embodiments, a stator interfacial insert 303 is not provided with a retaining shoulder such as the retaining should 328, but can share many other similar elements with the stator interfacial insert 302.

The stator interfacial insert 302 can be provided with a sliding guide surface 330 formed between the two side extensions 324. The sliding guide surface 330 is preferably adapted to couple to a leg 240 of the planet subassembly 108. In one embodiment, the sliding guide surface 330 has a leg clearance recess 332 formed on an end of the rectangular body in proximity to the stator interlock tab 326. The stator interfacial insert 302 preferably is made from a low-friction material with sufficient compressive strength. For example, the stator interfacial insert 302 can be made out of a variety of plastics that can include Fortron 1342L4, Nylon 6/6 resin, Vespel, Rulon, PEEK, Delrin or other materials. The materials listed here are merely examples and are not intended to be an exhaustive list of acceptable materials as many different types of materials can be used in the embodiments disclosed herein.

Figure 44:
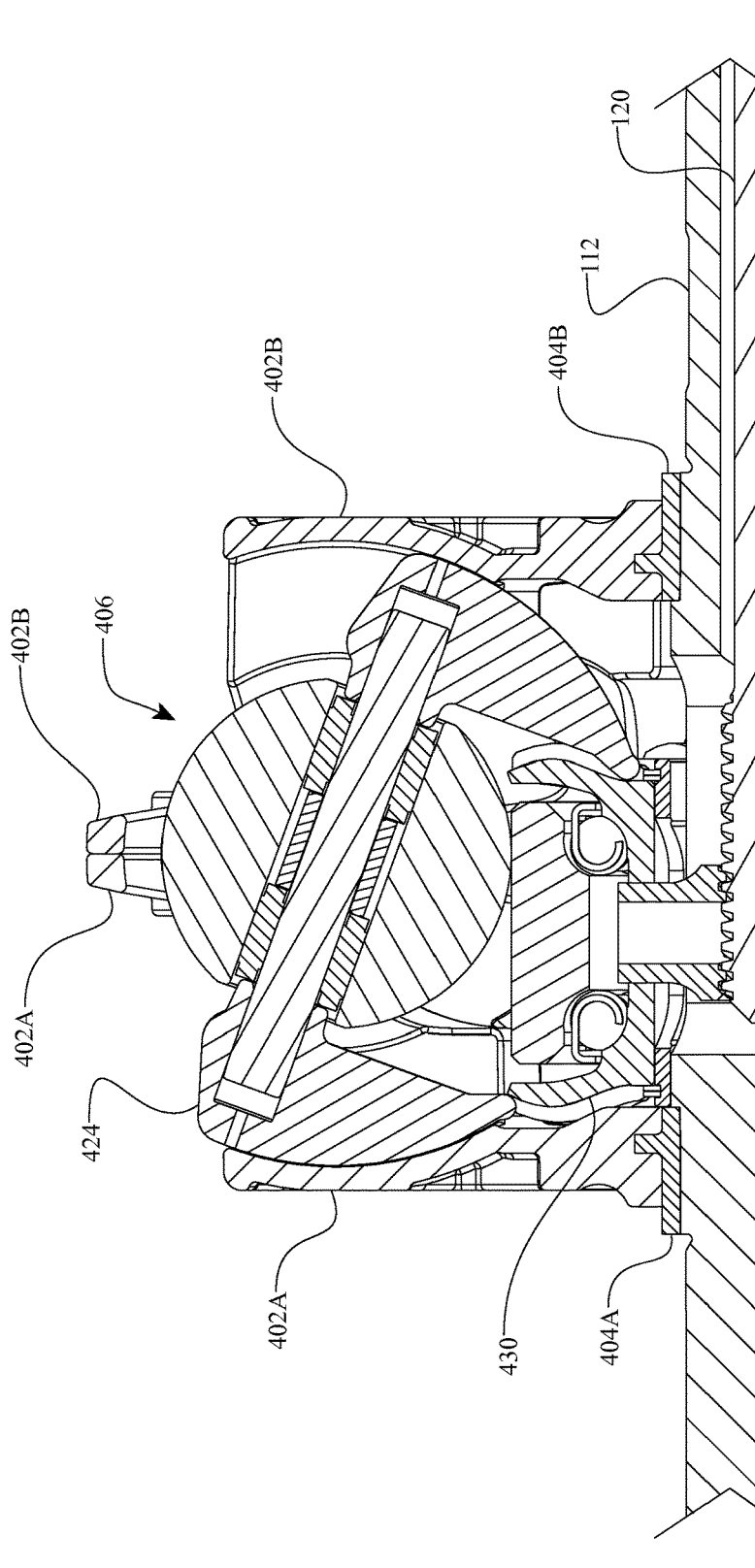
FIG. 44 is a cross-sectional view of the carrier assembly of FIG. 43.
Figure 51:
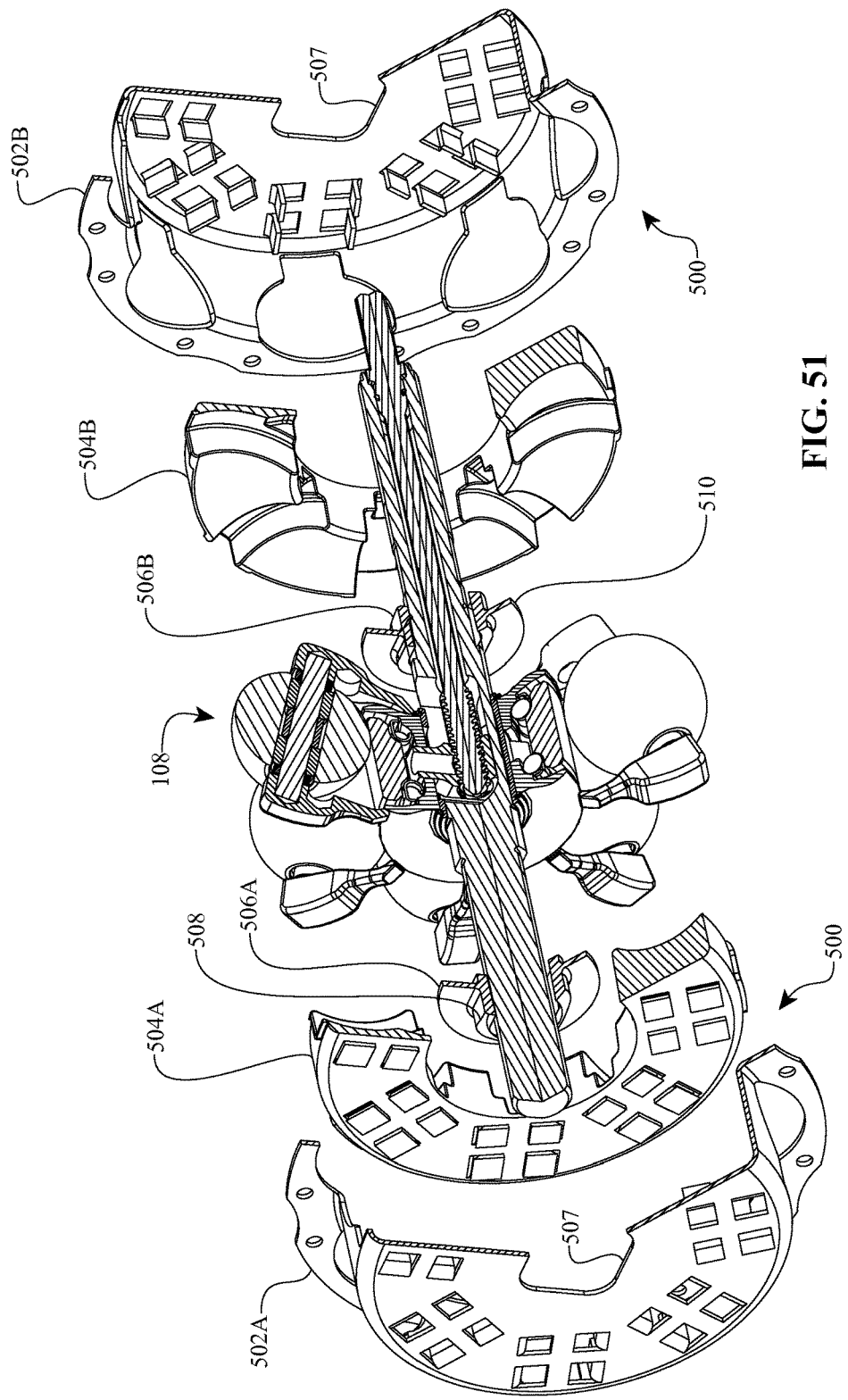
FIG. 51 is a partially cross-sectioned, exploded, perspective view of an embodiment of a carrier assembly that can be used in the CVT of FIG. 2.

Passing now to FIGS. 43-44, in one embodiment a carrier assembly 400 includes a stator support member 402 coupled a stator torque reaction insert 404, which can be substantially similar to the stator torque reaction insert 204. The stator support member 402 is adapted to slidingly couple to a number of planet subassemblies 406. Preferably, the carrier assembly 400 includes two stator support members 402 coupled to each other with common screw fasteners, rivets, or welds.

Referring to FIGS. 45-46, in one embodiment the stator support member 402 is a substantially bowl-shaped body having a central bore. The stator support member 402 can include a fastening flange 410 having a number of fastening holes 411. The fastening flange 410 can be arranged on the outer periphery of the bowl-shaped body. A number of guide support slots 412 can be formed on the interior of the bowl-shaped body. The stator support member 402 can be provided with a number of ball clearance cutouts 414 configured to substantially surround each of the planet subassemblies 406. The stator support member 402 can include a number of torque reaction shoulders 416 formed on the central bore of the bowl-shaped body. In one embodiment, the torque reaction shoulders 416 form a hexagonal pattern. The torque reaction shoulders 416 can be adapted to couple to the stator torque reaction insert 404. The stator support member 402 can be provided with a number of structural ribs 418 arranged on the bottom of the bowl-shaped body. The structural ribs provide strength and stiffness to the stator support member 402.

Referring to FIGS. 47 and 48, in one embodiment the planet subassembly 406 includes a ball 420, a ball axle 422, and a leg 424. The ball 420 has a bore and is supported on the ball axle 422 with support bearings 426. In one embodiment, the support bearings 426 are positioned in on the ball axle 422 with at least one spacer 428. The leg 424 can be pressed onto an end of the ball axle 422. Each end of the ball axle 422 is coupled to a leg 424. In one embodiment, the leg 424 includes a sliding interface guide 421, a shift cam engagement surface 423, and a bearing support extension 425 surrounding a ball axle bore 427. In some embodiments, the leg 424 can include a press relief hole 429 arranged concentric with the ball axle bore 427. The sliding interface guide 421 can have a curved profile when viewed in the plane of the page of FIG. 48. The sliding interface guide 421 is preferably substantially conformal with the guide support slots 412 so that the forces transferred from the leg 424 to the stator support member 402 are distributed over a large surface area of contact between the leg 424 and the stator support member 402. This arrangement minimizes stress and wear on the contacting components.

Turning to FIGS. 49-50, in one embodiment a shift cam 430 includes a number of leg contact surfaces 432. The leg contact surfaces 432 can have a profile that is substantially convex when viewed in the plane of the page in FIG. 50, and the profile can be substantially flat when viewed in the plane of the cross-section in FIG. 49. The substantially flat profile facilitates a line contact between the leg 424 and the shift cam 430. The line contact is preferable for minimizing wear and stress on the leg 424 and the shift cam 430. In one embodiment, the shift cam 430 includes a number of alignment extensions 436. The alignment extensions 436 are arranged on each side of each of the leg contact surfaces 432, so that the leg 424 is substantially flanked by the alignment extensions 436 when assembled. In some embodiments, the shift cam 430 is provided with a bearing race 438 that is adapted to support a bearing for facilitating the coupling of the shift cam 430 to, for example, the idler assembly 109.

The shift cam 430 can also be provided with a shift nut engagement shoulder 440 that extends axially from the leg contact surfaces 432. The shift nut engagement shoulder 440 surrounds a hollow bore 442, which is configured to provide clearance to the main axle 112, for example. The shift nut engagement shoulder 440 can couple to the shift nut 119, for example.

Passing now to FIGS. 51-56, in one embodiment a carrier assembly 500 can include a stator support member 502 coupled to a stator interfacial member 504. A stator torque reaction insert 506 can be coupled to the inner bore of the stator support member 502. The stator support member 502 can be provided with a number of torque reaction shoulders 507 (see FIG. 53, for example). The torque reaction shoulders 507 are configured to engage a number of mating torque reaction shoulders 508 provided on the stator torque reaction insert 506. In one embodiment, the stator torque reaction insert 506 includes a piloting flange 510 that extends radially from the torque reaction shoulders 508. The piloting flange 510 is adapted to align and couple to the inner diameter of the stator interfacial member 504. In some embodiments, the piloting flange 510 can include a number of holes (not shown) configured to receive fasteners, such as rivets, to facilitate the coupling of the piloting flange 510 to the stator support member 502. In other embodiments, the piloting flange 510 can be welded to the stator support member 502. In yet other embodiments, the piloting flange 510 can be configured to couple to the stator support member 502 via the stator interfacial member 504. For example, the stator interfacial member 504 can be made of plastic, which can be formed around the piloting flange 510 and the stator support member 502 in such a way as to facilitate the coupling of the piloting flange 510 to the stator support member 502.

Figure 54:
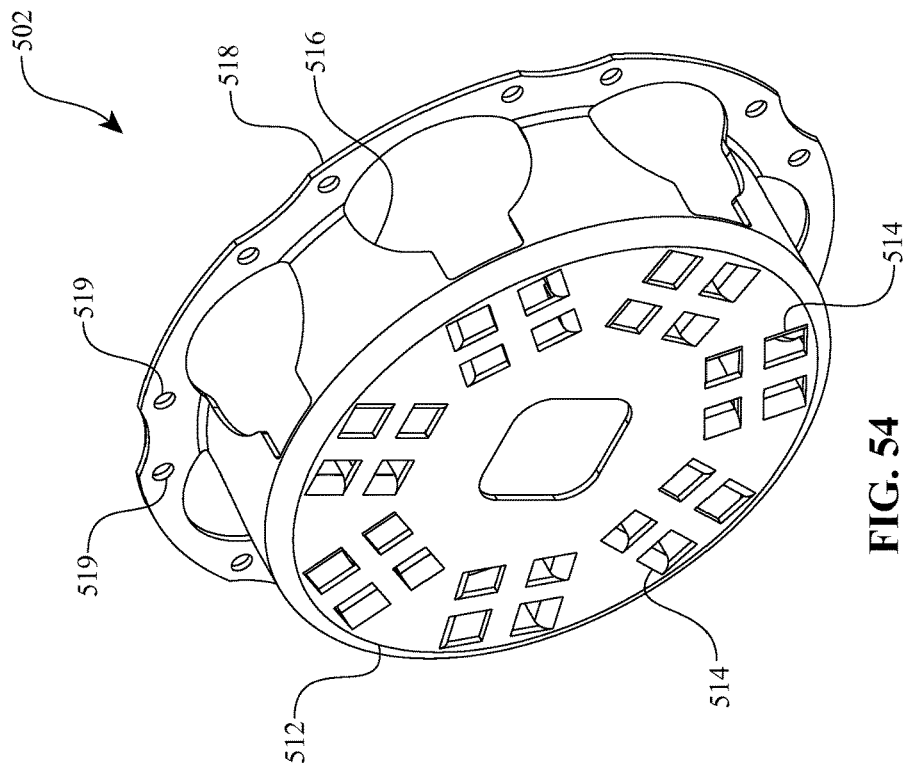
FIG. 54 is a second perspective view of the stator support member of FIG. 53.
Figure 53:
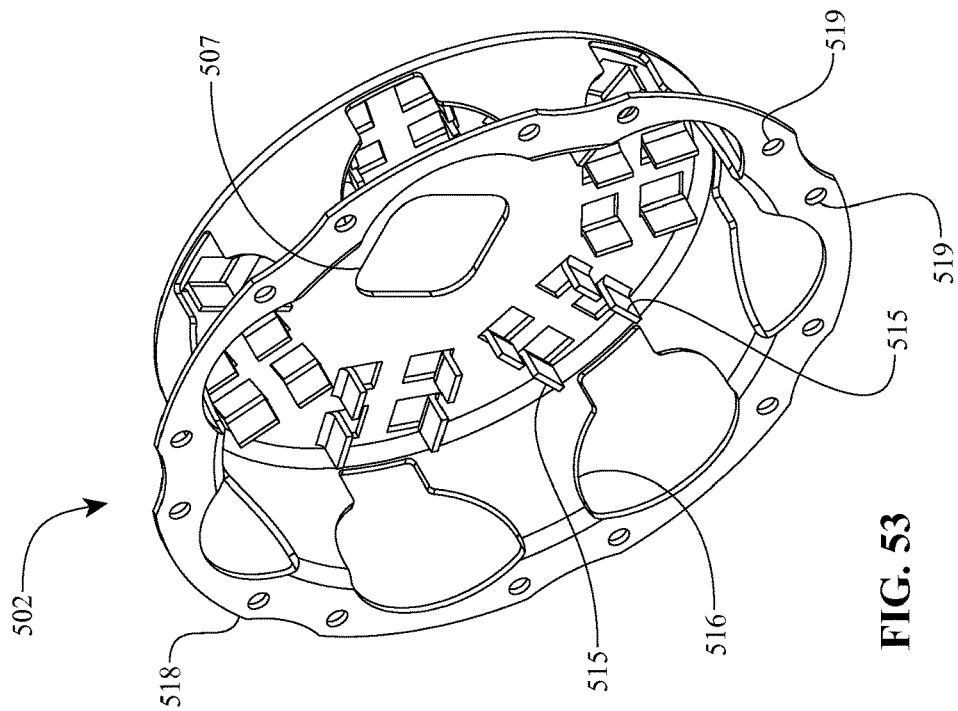
FIG. 53 is a perspective view of a stator support member that can be used in the carrier assembly of FIG. 51.
Figure 57:
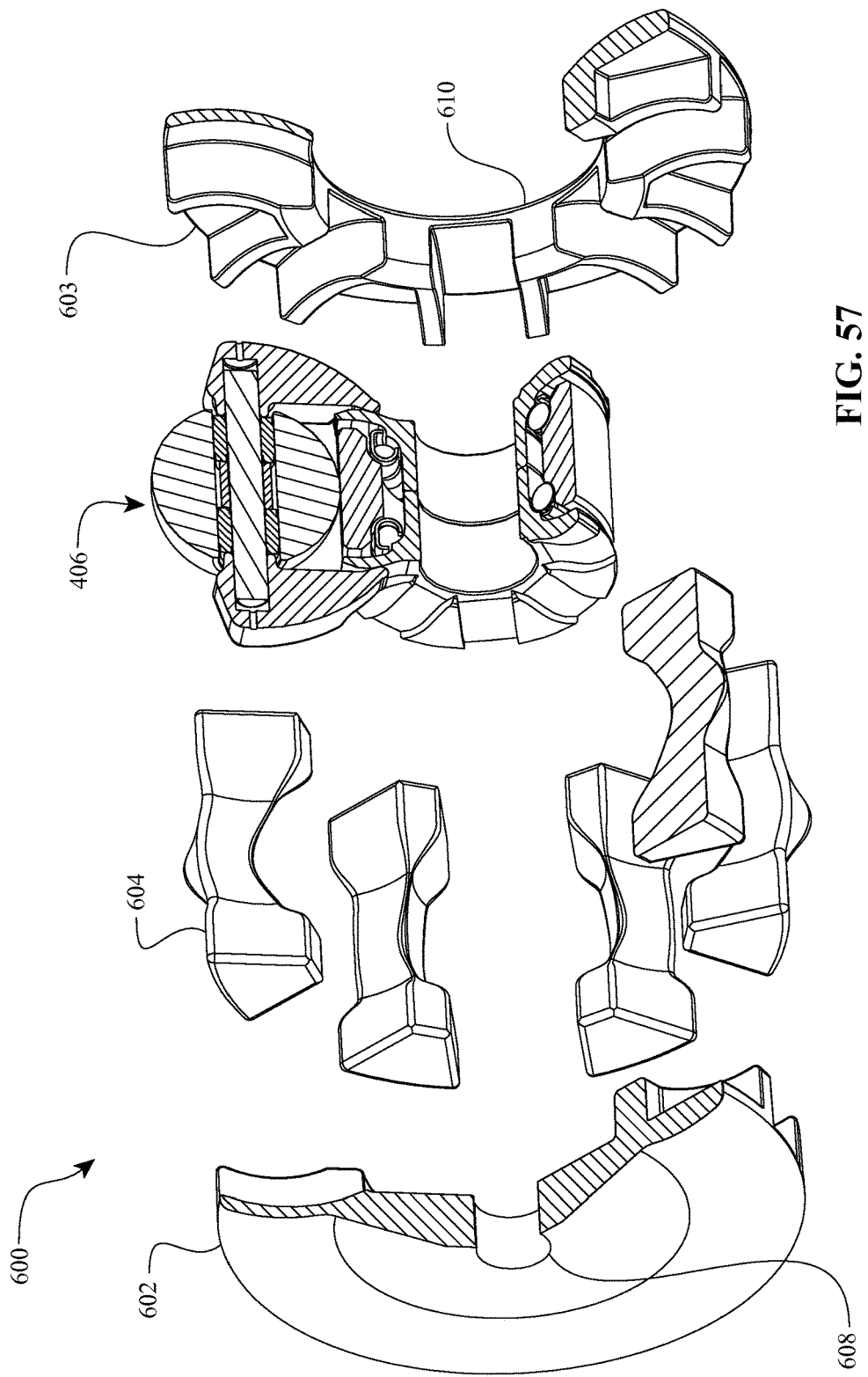
FIG. 57 is a partially cross-sectioned, exploded, perspective view of an embodiment of a carrier assembly that can be used in the CVT of FIG. 2.

Referring now specifically to FIGS. 53-54, the stator support member 502 can be a generally bowl shaped body having a bottom face 512. In one embodiment, the torque reaction shoulders 507 are formed on the bottom face 512. It should be readily apparent that the torque reaction shoulders 507 can be, in some embodiments, knurls or splines (not shown) configured to facilitate the coupling of the stator support member 502 to, for example, the main axle 112. A number of interlock cavities 514 can be provided on the bottom face 512. The interlock cavities 514 are adapted to couple to mating features located on the stator interfacial member 504. In the embodiment shown in FIGS. 53 and 54, the interlock cavities 514 are arranged in groups of four interlock cavities 514 per planet assembly 108, and the groups of interlock cavities 514 are distributed angularly about the torque reaction shoulders 507 on the bottom face BF. In one embodiment, each of the interlock cavities 514 has a corresponding tab 515 that extends from the interlock cavity 514 towards the interior of the bowl shaped body. The tabs 515 are configured to align and couple to mating features of the stator interfacial member 504. The stator support member 502 can also be provided with a number of ball clearance cavities 516 formed on the outer periphery of the bowl shaped body. The number of ball clearance cavities 516 preferably, though not necessarily, corresponds to the number of planet subassemblies 108 provided in, for example, the CVT 100. The stator support member 502 can include a fastening flange 518 located on the outer periphery of the bowl-shaped body. The fastening flange 518 can have a number of fastening holes 519. In one embodiment, the stator support member 502 can be a stamped sheet metal component. Once assembled, carrier 500 can include two stator support members 502 coupled together at the respective fastening flange 518 with common screw fasteners or rivets.

Referring to now specifically to FIGS. 55 and 56, the stator interfacial member 504 can include a disk shaped body having an inner bore. In one embodiment, the disc shaped body has a number of guide slots 520 arranged angularly about the inner bore so that each of the guide slots 520 extends radially from the inner bore to an outer periphery of the disc shaped body. In some embodiments, the guide slots 520 have a conformal profile configured to couple to the legs 240 of the planet assembly 108. The stator interfacial member 504 can include a number of interlock tabs 522 configured to mate with the interlock cavities 514 and tabs 515 of the stator support member 502. In one embodiment, interlock tabs 522 can be arranged in groups of four interlock tabs 522 located at each guide slot 520. For example, each of the guide slots 520 can be flanked on each side by at least two interlock tabs 522. In some embodiments, at least one interlock tab 522 is arranged on either side of the guide slot 520. The stator interfacial member 504 can be provided with a number of leg clearance slots 524. The leg clearance slots 524 are generally formed on the inner circumference of the disk shaped body and the leg clearance slots 524 are substantially aligned angularly with the guide slots 520. In some embodiments, the stator interfacial member 504 can include a number of stator support member extensions 526 that are configured to engage the stator support member 502. The stator support member extensions 526 are preferably substantially aligned with, and extend from, the guide slots 520.

Referring now to FIGS. 57-62, in one embodiment a carrier assembly 600 can include a first stator support member 602 coupled to a second stator support member 603 via a number of stator spacers 604. The carrier assembly 600 can be adapted to cooperate with planet subassemblies 406. The first stator support member 602 can be a generally disk-shaped body having a central bore 608. The central bore 608 is configured to couple to, for example, the main axle 112. In one embodiment, the main axle 112 is welded to the first stator support member 602, for example. In other embodiments, the main axle 112 can be coupled to the first stator support member 602 via torque reaction shoulders that are substantially similar to torque reaction shoulders 210 (see FIG. 21, for example) and the torque reaction shoulders 318 (see FIG. 35, for example).

Still referring to FIGS. 57-62, the second stator support member 603 can be a generally disc-shaped body having a central bore 610. The central bore 610 is configured to provide clearance between the disc-shaped body and the main axle 112. In one embodiment, the radial clearance between the disc-shaped body and the main axle 112 is large enough to allow the idler assembly 109, for example, to be removed from the main axle 112 while the second stator support member 603 and the first stator support member 602 remain assembled. The radial clearance between the second stator support member 603 and the main axle 112 facilitates, among other things, angular alignment between the first and second stator support members 602 and 603 that is independent from the alignment of the main axle 112 to the second stator support member 603, thereby simplifying assembly of the carrier 600 and the main axle 112.

In one embodiment, the first stator support member 602 is provided with a number of support extensions 612 and a number of guide slots 614 interposed between the support extensions 612. The guide slots 614 are arranged angularly about, and extend radially from, the central bore 608. The planet assemblies 406 are adapted to slide in the guide slots 614. The support extensions 612 substantially define the perimeter structure for a number of stator spacer cavities 616. Each of the stator spacer cavities 616 is adapted to receive an end of the stator spacer 604. The end of the stator spacer 604 can attach to the stator spacer cavity 616 with common screw fasteners, press fit, or other suitable fastening means. Similarly, the second stator support member 603 can be provided with the support extensions 612. The support extensions 612 form sides for the guide slots 614. The guide slots 614 are arranged angularly about, and extend radially from, the central bore 610. The support extensions 612 substantially define the perimeter structure for a number of stator spacer cavities 616.

In one embodiment, the stator spacer 604 includes ends 620 and 622 connected by a clearance neck 624. The clearance neck 624 is preferably configured to maximize torsional stiffness of the stator spacers 604 while maintaining adequate clearance between the planet subassemblies 406. In one embodiment, the clearance neck 624 has a substantially diamond shaped cross-section 626 at the midpoint of the body while the ends 620 and 622 are substantially triangular in cross-section, when viewed in the plane of the page of FIG. 62.

Figure 63:
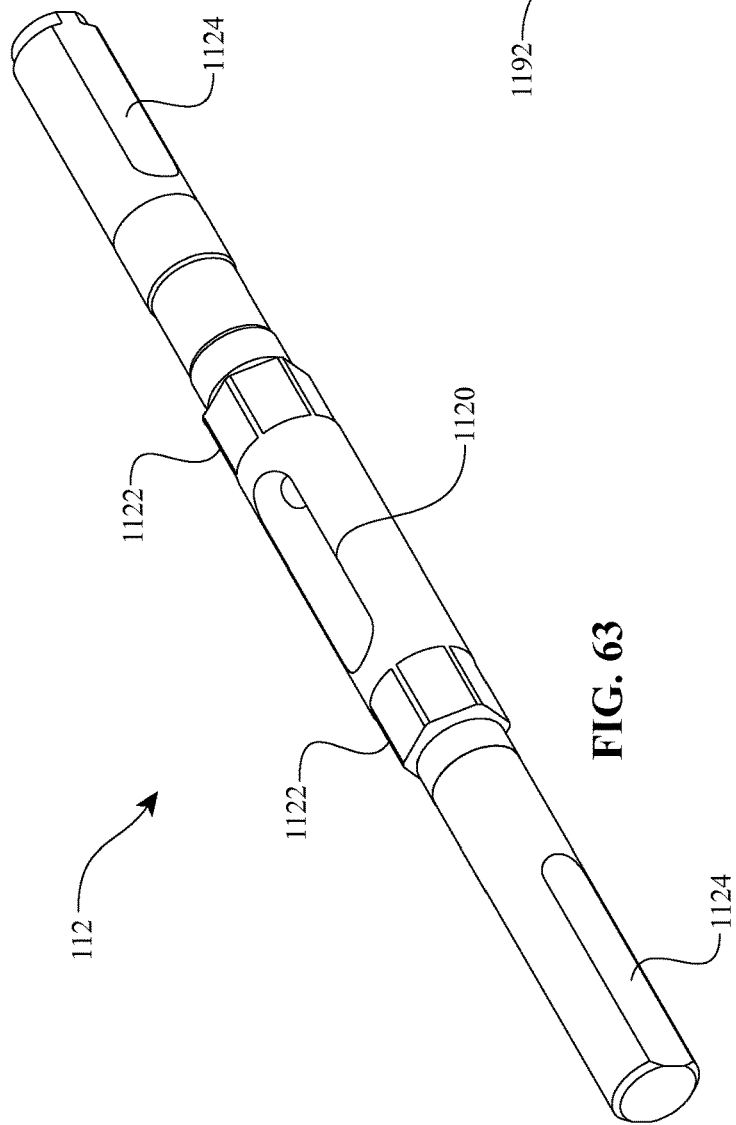
FIG. 63 is a perspective view of an embodiment of a main axle that can be used in the CVT of FIG. 2.

Turning to FIG. 63, in one embodiment the main axle 112 can include a substantially elongated body with a shift nut clearance slot 1120 arranged in a middle portion of the elongated body. The shift nut clearance slot 1120 is an opening in the elongated body that is aligned axially in the elongated body. The shift nut clearance slot 1120 has a first axial end and a second axial end. A number of torque reaction shoulders 1122 can be formed in proximity to each axial end. In one embodiment, six torque reaction shoulders 1122 are formed at the first axial end, and six torque reaction shoulders 1122 are formed at the second axial end. In some embodiments, only four torque reaction shoulders 1122 are formed at each axial end. In other embodiments, as few as one torque reaction shoulder 1122. In yet other embodiments, the torque reaction shoulders 1122 can be a knurled surface. The torque reaction shoulders 1122 are configured to couple to, for example, the carrier assembly 101. The main axle 112 can also include frame support flats 1124 on each end of the elongated body. The frame support flats 1124 are configured to couple to, for example, dropouts 3 (see FIG. 1, for example).

Figure 64:
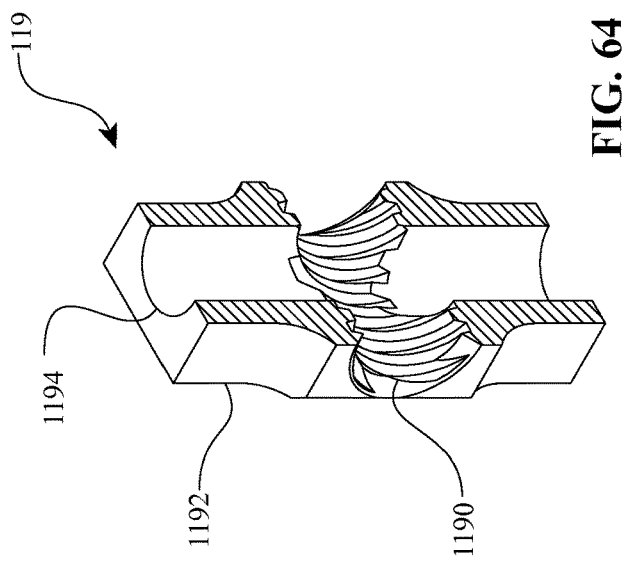
FIG. 64 is a partially cross-sectioned, perspective view of a shift nut that can be used in the CVT of FIG. 2.

Referring to FIG. 64 now, a shift nut 119 can include a threaded bore 1190 configured to couple to the shift rod 120, for example. The shift nut 119 can include at least two shift cam engagement faces 1192 that extend from the threaded bore 1190. The shift cam engagement faces 1192 can be substantially flat surfaces that are configured to couple to, for example, the shift cam 430. In one embodiment, the shift nut 119 can be provided with a bore 1194 that intersects the threaded bore 1190. The bore 1194 can, among other things, reduce the weight of the shift nut 119.

Passing now to FIGS. 65A-66, in one embodiment an idler assembly 700 includes an idler 702, a first and a second shift cam 704 and 706 operably coupled to the idler with a bearing 705. In some embodiments, the bearing 705 has a flexible cage 707 that can be manipulated during assembly. In other embodiments, the bearing 705 can consist of two bearings that have independent cages. The idler assembly 700 can be coupled to, for example, the shift rod 120 with a first and a second shift nut 708A and 708B. The shift nuts 708 can be arranged in the shift nut clearance slot 1120 of the main axle 112 and couple to shift nut engagement shoulders 710 formed on the shift cams 704 and 706. The shift nut 708 can be provided with a threaded bore 712 adapted to couple to a threaded portion of the shift rod 720. The shift nut 708 can be configured to axially translate with a rotation of the shift rod 120, and thereby axially translating the idler assembly 700. In one embodiment, the shift nut 708 is provided with a shift cam engagement shoulder 714 formed on a first end. The shift cam engagement shoulder 714 is configured to mate with the shift nut engagement shoulders 710. The shift cam engagement shoulder 714 extends radially in one direction from the threaded bore 712 and is aligned axially with the first end of the body of the shift nut 708. In some embodiments, the shift nut 708 is provided with a set of flats 716.

During assembly, the first and the second shift nuts 708 are placed in the shift nut clearance slot 1120 and positioned to allow the idler assembly 700 to be placed onto the main axle 112. In some embodiments, the first and the second shift nuts 708 are one integral component. Once the idler assembly 700 is placed onto the main axle 112, the shift rod 120 is threaded into the first shift nut 708A, which aligns the threaded bore 712 with the longitudinal axis of the transmission and facilitates the engagement of the shift cam engagement shoulder 714 with the shift nut engagement shoulder 710. The second shift nut 708B is threaded onto the shift rod 120 and couples to the second shift cam 706. Once assembled, the two shift nuts 708 axially guide the idler assembly 700. The shift nuts 708 allow the idler assembly 700 to be removed from the main axle 112 without disassembly of the idler assembly 700.

Turning to FIGS. 67-69, one embodiment of the hub shell 102 will be described. The hub shell 102 can include a first spoke flange 6700A and a second spoke flange 6700B arranged on the outer periphery of the hub shell 102. The first and the second spoke flanges 6700 are provided with a number of spoke fastening holes 6702 to facilitate the coupling of the CVT 100 to a wheel of a bicycle, for example. The hub shell 102 can include a number of brake adapter splines 6704 formed on an exterior surface of the hub shell 102. The brake adapter splines 6704 are encircled with a set of threads 6706. The threads 6706 are configured to mate with a brake adapter ring 7300 (see FIG. 3, for example). A second set of threads 6708 are provided on an end opposite the brake adapter splines 6704. The second set of threads 6708 are configured to mate with the hub shell cover 104. The hub shell 102 can be provided with an interior face 6710 having a central bore concentric with the brake adapter splines 6704. The central bore can include a seal bore 6712, a bearing bore 6714, and a snap ring groove 6716. Preferably, the seal bore 6712 is positioned axially outward of the bearing bore 6714. The seal bore 6712 is configured to support, for example, an axle seal. The bearing bore 6714 is configured to support, for example, a bearing. The interior face 6710 can be provided with a set of splines 6718 configured to mate with the output cam ring 149, for example.

Referring to FIGS. 70-72 now, one embodiment of the hub cover 104 includes a disc-shaped body 7000 having a central bore 7002, an exterior face 7004, and an interior face 7006. The interior face 7006 is preferably arranged facing the interior of the CVT 100, and the exterior face 7004 is preferably arranged facing the exterior of the CVT 100. In some embodiments, the hub cover 104 is arranged on the input side of the CVT 100. The hub cover 104 includes a threaded outer periphery 7008 configured to mate with the hub shell 102. The central bore 7002 can be provided with a bearing support surface 7010 and a seal support bore 7012. The bearing support surface 7010 and the seal support bore 7012 are coaxial with the main axle 112. The interior face 7006 can be provided with a thrust reaction surface 7014 configured to support, for example, a thrust bearing of the CVT 100. The hub cover 104 can be provided with a set of stiffening ribs 7016 extending radially from the central bore 7002 on the interior face 7006. In some embodiments, the hub cover 104 includes a set of tool engagement splines 7018 arranged on the exterior face 7004 and surrounding the central bore 7002. The tool engagement splines 7018 facilitate, among other things, the coupling of the hub cover 104 to the hub shell 102.

Passing to FIGS. 73-74, in one embodiment a brake adapter ring 7300 can be a generally annular ring having a threaded perimeter 7302. A first exterior face of the annular ring can include a number of tool engagement holes 7304 configured to facilitate the coupling of the brake adapter ring 7300 to, for example, the hub shell 102. The brake adapter ring 7300 can be provided with a locking chamfer 7306 formed on the inner circumference of the annular ring. In some embodiments, the diameter of the annular ring is in the range of 1.25 to 3.25 inches.

Figure 76:
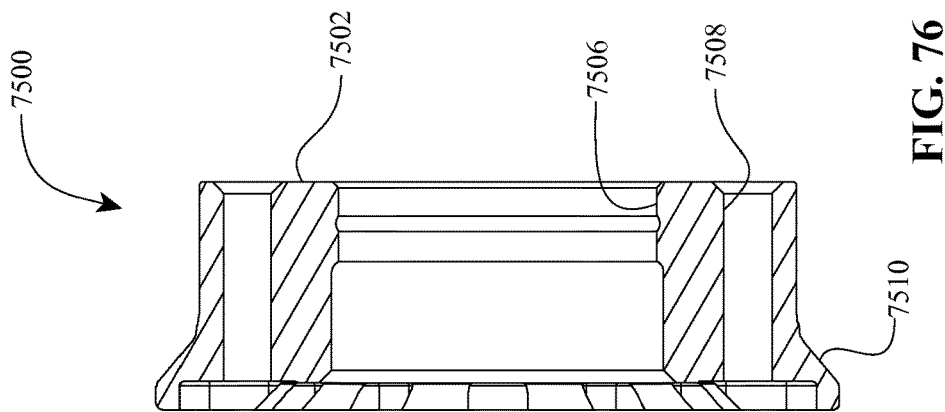
FIG. 76 is a cross-section of the disc brake adapter of FIG. 75.
Figure 75:
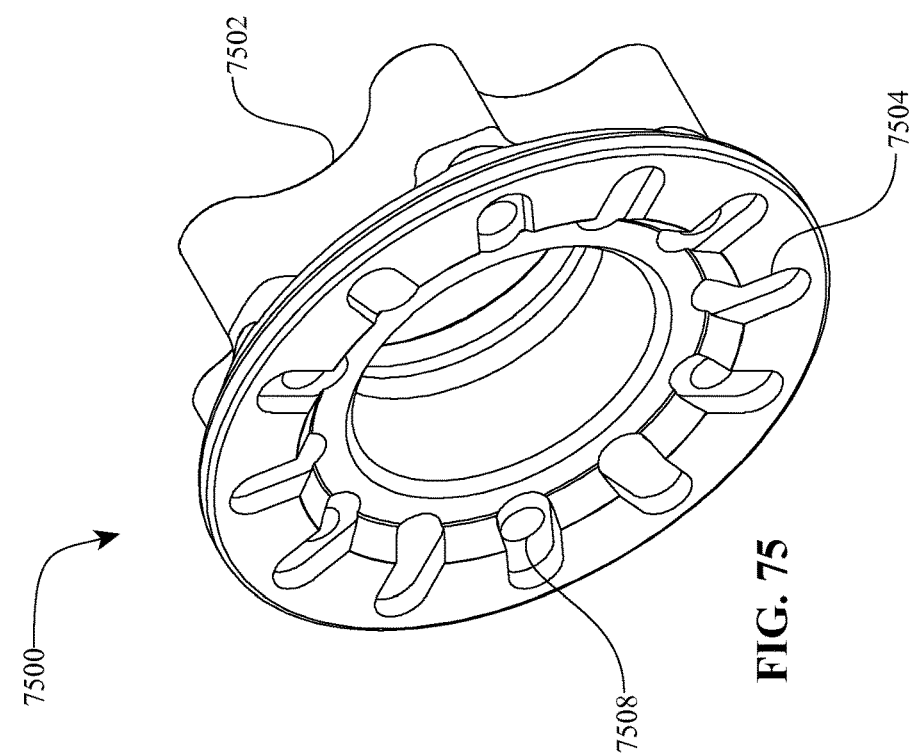
FIG. 75 is a perspective view of an embodiment of a disc brake adapter that can be used with the CVT of FIG. 2.

Referring to FIGS. 75-76 now, in one embodiment a disc brake adapter 7500 includes a brake alignment surface 7502 and a number of torque reaction splines 7504. The brake alignment surface 7502 is substantially configured to mate with a standard disc brake for a bicycle. The torque reaction splines 7504 are configured to mate with the brake adapter splines 6704 of the hub shell 102 (see FIG. 67, for example). The disc brake adapter 7500 can be provided with a seal support surface 7506 that is configured to couple to a seal of the CVT 100. A number of brake fastening holes 7508 can be provided on the disc brake adapter 7500. The disc brake adapter 7500 can include a locking chamfer 7510 configured to engage the brake adapter ring 7300. The engagement of the locking chamfer 7510 with the locking chamfer 7306 provides a rigid coupling between the disc brake adapter 7500 and the hub shell 102.

Figure 78:
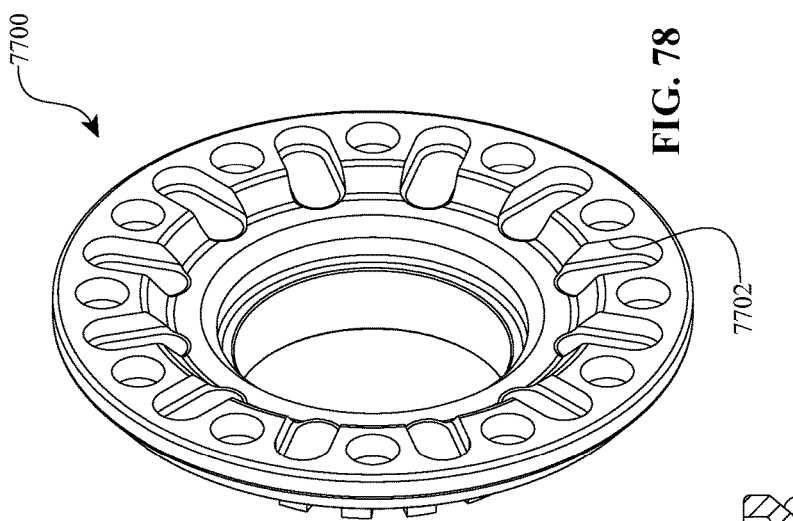
FIG. 78 is a second perspective view of the roller brake adapter of FIG. 77.
Figure 79:
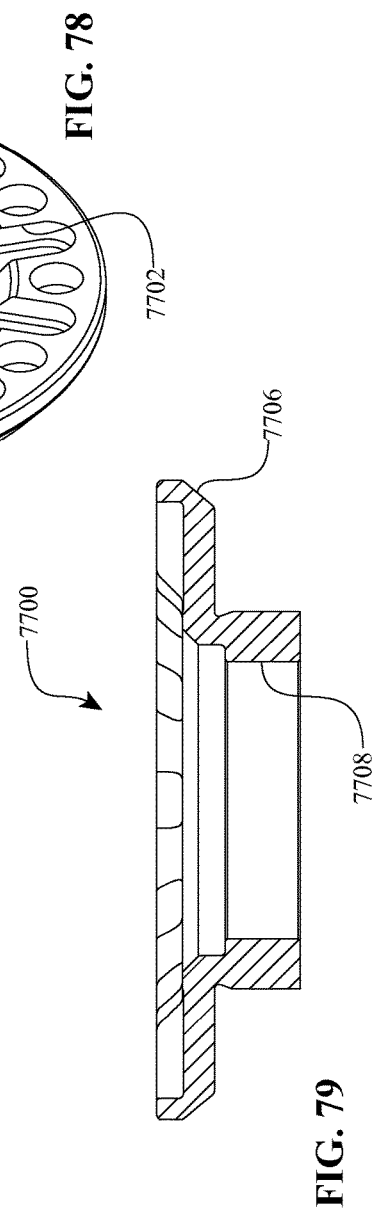
FIG. 79 is a cross-sectional view of the roller brake adapter of FIG. 77.
Figure 77:
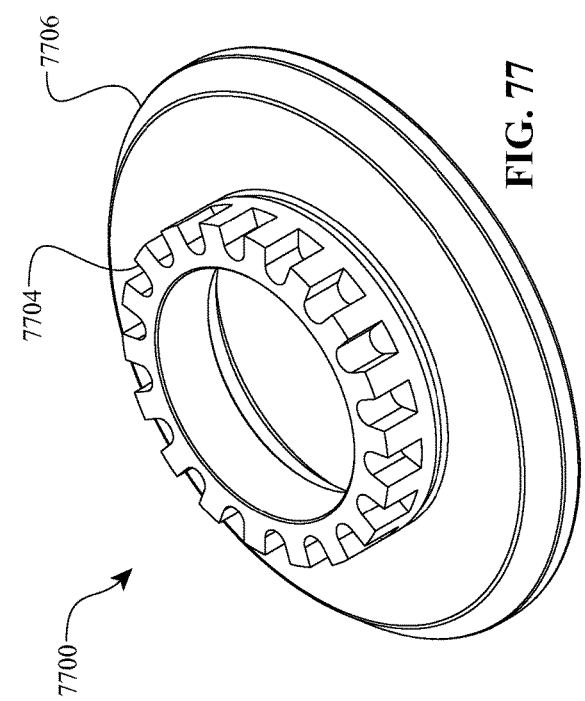
FIG. 77 is a perspective view of an embodiment of a roller brake adapter that can be used with the CVT of FIG. 2.

Referring now to FIGS. 77-79, in one embodiment a roller brake adapter 7700 can include a number of torque reaction splines 7702 that are substantially similar to torque reaction splines 7504, and are configured to couple to the brake adapter splines 6704 of the hub shell 102. The roller brake adapter 7700 can be provided with a splined extension 7704 that is configured to couple to a standard roller brake of a bicycle. The roller brake adapter 7700 can include a locking chamfer 7706 that is substantially similar to the locking chamfer 7510, and is adapted to engage the locking chamfer 7306 of the brake adapter ring 7300. The roller brake adapter 7700 can also be provided with a seal support surface 7708 that is configured to couple to a seal of the CVT 100. Once assembled, the roller brake adapter 7700 can be coupled to, for example, the CVT 100 at substantially the same location on the hub shell 102 as the disc brake adapter 7500. The engagement of the locking chamfer 7706 with the locking chamfer 7306 provides a rigid coupling between the roller brake adapter 7700 and the hub shell 102. In one embodiment, the brake adapter kit 106 can include the brake adapter ring 7300 and the disc brake adapter 7500. In other embodiments, the brake adapter kit 106 can include the brake adapter ring 7300 and the roller brake adapter 7700.

Figure 80:
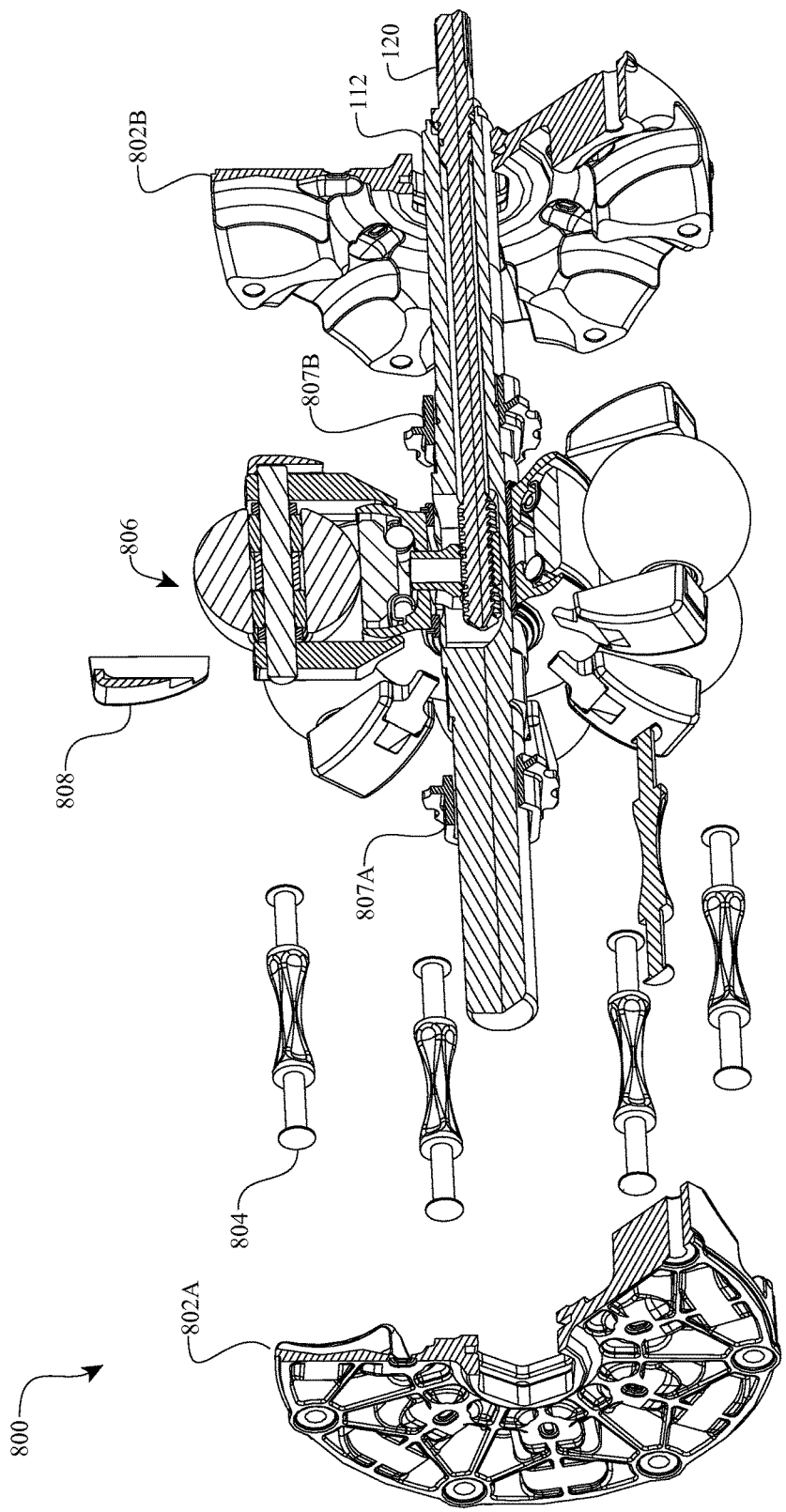
FIG. 80 is a partially cross-sectioned, exploded, perspective view of an embodiment of a carrier assembly that can be used with the CVT of FIG. 2.
Figure 81:
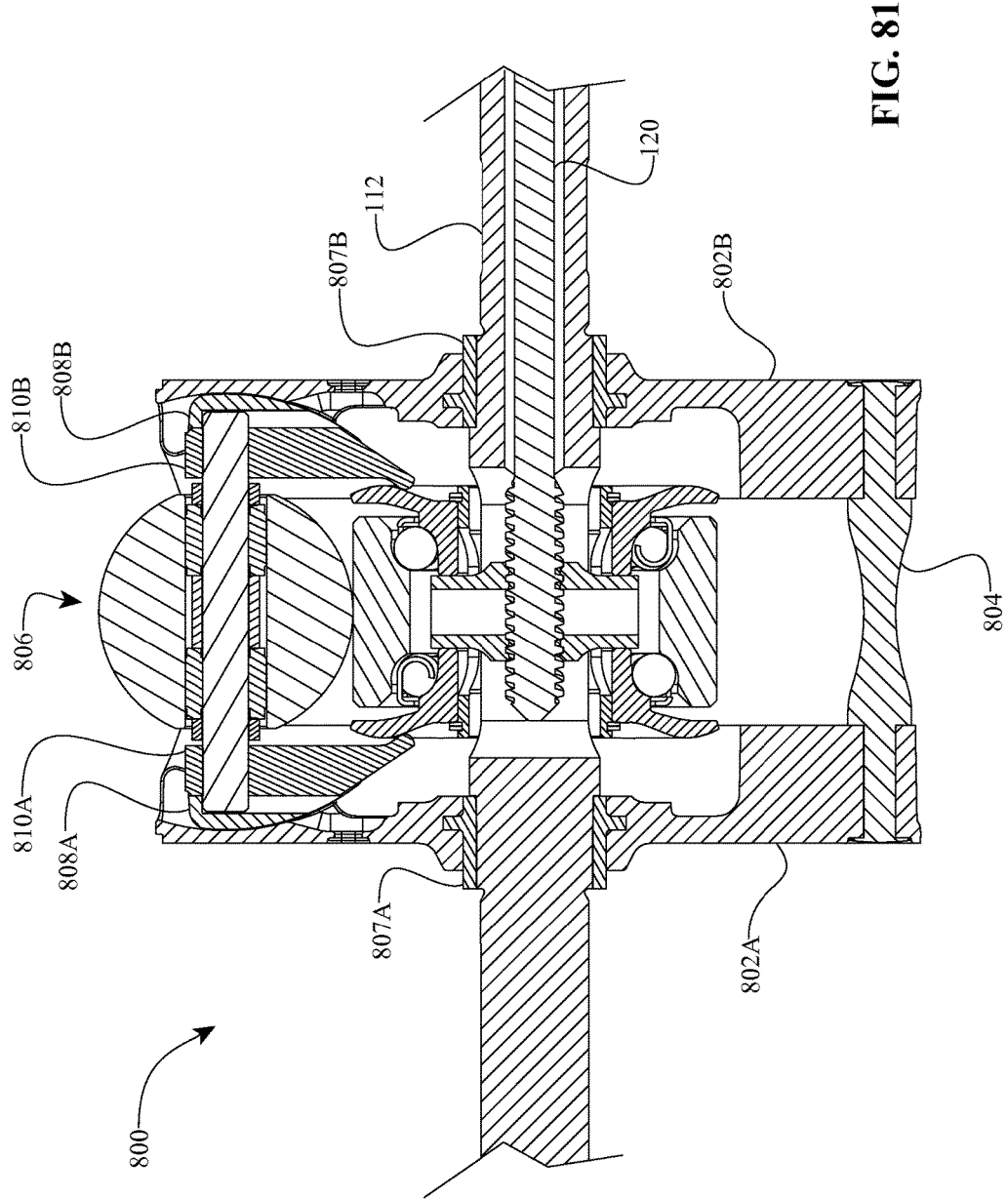
FIG. 81 is a cross-sectional view of the carrier assembly of FIG. 80.

Turning now to FIGS. 80 and 81, in one embodiment a carrier assembly 800 can include a first stator support member 802A coupled with a number of stator spacers 804 to a second stator support member 802B. The stator spacers 804 can be arranged angularly around the perimeter of the stator support members 802. In one embodiment, the stator support members 802 and the stator spacers 804 are substantially similar in function to the stator subassemblies 200 and the stator spacers 202. The carrier assembly 800 supports and facilitates a tilting of the rotational axis of a number of planet subassemblies 806. In some embodiments, the stator support member 802 can be coupled to a stator torque reaction insert 807 that is substantially similar to the stator torque reaction insert 204, for example. In other embodiments, the stator support member 802 is coupled directly to the main axle 112.

Figure 83:
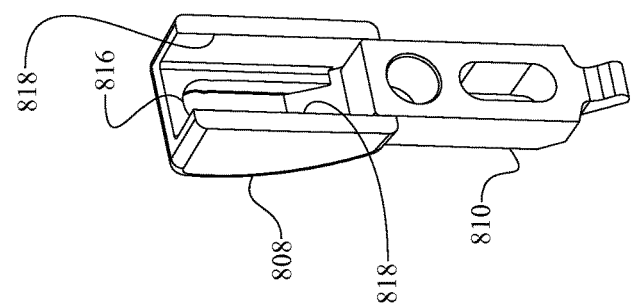
FIG. 83 is an exploded, perspective view of certain components of the planet subassembly of FIG. 82.
Figure 82:
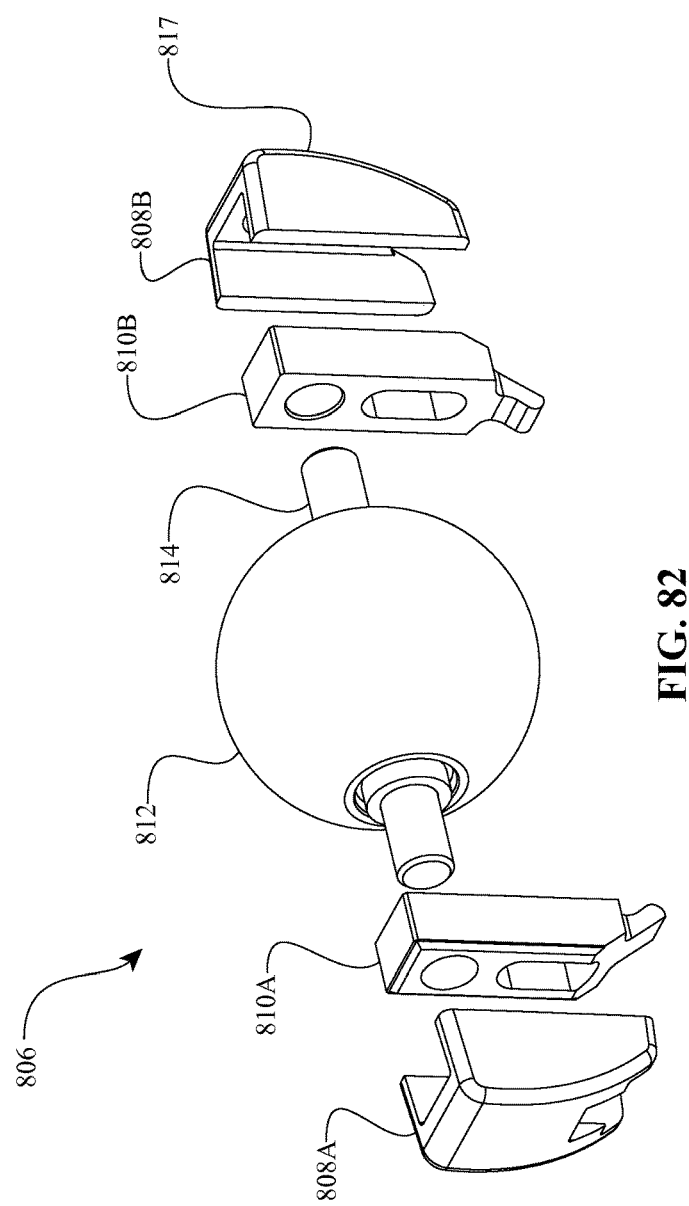
FIG. 82 is an exploded, perspective view of an embodiment of a planet subassembly that can be used with the carrier assembly of FIG. 80.

Turning to FIGS. 82 and 83, and still referring to FIGS. 80 and 81, in one embodiment, the planet subassembly 806 includes a first stator interfacial cap 808A coupled to a first leg 810A. The planet subassembly 806 includes a ball 812 configured to rotate about a planet axle 814. In one embodiment, the planet axle 814 is supported in the first leg 810A and in a second leg 810B. The second leg 810B can be coupled to a second stator interfacial cap 808B. Typically, each of the stator interfacial caps 808 are provided with a planet axle relief 816 that is configured to provide clearance between the planet axle 814 and the stator interfacial cap 808. The stator interfacial cap 808 preferably includes a sliding interface surface 817 that is configured to contact the stator support member 802. In one embodiment, the sliding interface surface 817 has a curved profile when viewed in the plane of the page of FIG. 81. The sliding interface surface 817 is substantially similar in certain functional aspects to the sliding interface guides 421. In some embodiments, the stator interfacial cap 808 includes sides 818 that extend from the sliding interface surface 817. The sides 818 can be arranged to substantially flank the leg 810. In some embodiments, the stator interfacial caps 808 are made of a plastic or other low-friction material. The legs 810 can be made of steel, for example. The stator interfacial cap 808 can be formed or assembled onto the legs 810 via a plastic molding process, for example. Once assembled, the stator interfacial cap 808A and the leg 810 can be substantially similar in certain functional aspects to the leg 244, 2444, or 424, for example. In some embodiments, the leg 810 can be adapted to couple to the shift cam 260 or 430, for example.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as anyone claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. An axial force generator for a continuously variable transmission (CVT), comprising:
   a traction ring having a first side for contact with a plurality of spherical planets and a second side having a plurality of ramps;

a load cam roller retaining assembly for supporting a plurality of load cam rollers; and an output cam ring having a first side having a plurality of ramps.

2. The axial force generator of claim 1, further comprising a spring having a first end coupled to the traction ring and a second end coupled to the output cam ring, wherein the spring biases the plurality of load cam rollers up the plurality of ramps on the traction ring and the plurality of ramps on the output cam ring.

3. The axial force generator of claim 1, wherein the plurality of ramps on the traction ring comprises an angled portion and a substantially flat portion, whereby axial force increases as the plurality of load cam rollers move up the angled portion on the plurality of ramps on the traction ring and whereby axial force remains constant when the load cam rollers are in contact with the substantially flat portion of the plurality of ramps on the traction ring.

4. The axial force generator of claim 1, wherein the output cam ring comprises a plurality of lugs for coupling to a hub shell.

5. The axial force generator of claim 4, wherein the load cam ring and the traction ring each further comprises a spring groove for retaining a portion of one of a plurality of springs.

6. An axial force generation system comprising:
an input axial force generator comprising
a load cam ring for receiving power into the CVT, the load cam ring having a first plurality of ramps,
a load cam roller retaining assembly for supporting a first plurality of load cam rollers, and
a first traction ring having a first side for contact with a plurality of spherical planets and a second side having a second plurality of ramps; and
an output axial force generator comprising
a second traction ring positioned on an opposite side of the plurality of spherical planets, the second traction ring having a first side for contact with the plurality of spherical planets and a second side having a third plurality of ramps,
a load cam roller retaining assembly for supporting a second plurality of load cam rollers, and
an output cam ring having a first side having a fourth plurality of ramps.

7. The axial force generation system of claim 6, wherein the load cam ring is coupled to a torsion plate.

8. The axial force generation system of claim 6, wherein the output cam ring is coupled to a hub shell.

9. A method for assembling an axial force generator for a continuously variable transmission (CVT), comprising:
positioning a first traction ring on a first side of a plurality of spherical planets, the first traction ring having a first plurality of ramps oriented at a first angle;
positioning a second traction ring on a second side of the plurality of traction planets opposite the first traction ring, the second traction ring having a second plurality of ramps oriented at a second angle;
positioning a first load cam roller retaining assembly having a first plurality of load cam rollers in contact with the first plurality of ramps on the first traction ring;
positioning a load cam ring for receiving power in to the CVT, the load cam ring having a third plurality of ramps oriented at a third angle;
positioning a second load cam roller retaining assembly having a second plurality of load cam rollers in contact with the second plurality of ramps on the second traction ring; and
positioning an output cam ring for transmitting power out of the CVT, the output cam ring having a fourth plurality of ramps oriented at a fourth angle.

10. The method for assembling an axial force generator of claim 9, further comprising positioning a first end of a spring in the load cam ring and a second end of the spring in the first traction ring.

11. The method for assembling an axial force generator of claim 9, wherein the first angle is the same as one of the second angle, the third angle, and the fourth angle.

12. The method for assembling an axial force generator of claim 9, wherein the first traction ring is coupled to a torsion plate.

13. The method for assembling an axial force generator of claim 9, wherein the second traction ring is coupled to a hub shell.

* * * * *